United States Patent [19]
Fierkens et al.
[11] Patent Number: 4,877,387
[45] Date of Patent: Oct. 31, 1989

[54] AUTOMATIC CONTINUOUSLY CYCLEABLE MOLDING SYSTEM

[75] Inventors: Richardus H. J. Fierkens, Herwen; Ireneus J. T. M. Pas, Rozendaal, both of Netherlands

[73] Assignee: ASM Fico Tooling, b.v., Herwen, Netherlands

[21] Appl. No.: 798,677

[22] Filed: Nov. 15, 1985

Related U.S. Application Data

[62] Division of Ser. No. 586,855, Mar. 6, 1984, Pat. No. 4,575,328.

[51] Int. Cl.[4] ........ B29C 39/04; B29C 39/10

[52] U.S. Cl. ........ 425/116; 249/83; 425/120; 425/127; 425/184; 425/185; 425/186; 425/195; 425/572; 425/575; 425/589; 425/126.1; 425/129.1

[58] Field of Search ........ 425/126 R, 116, 117, 425/121, 123, 261, 572, 589, 594, 575, 185, 186, 190, 193, 275, 184, 195

[56] References Cited

U.S. PATENT DOCUMENTS

| | | | |
|---|---|---|---|
| 3,151,359 | 10/1964 | Campbell et al. | 425/123 |
| 3,507,004 | 4/1970 | Taleff | 425/117 |
| 3,941,532 | 3/1976 | Fennessy et al. | 425/117 |
| 3,973,888 | 8/1976 | Hehl | 425/126 R |
| 4,003,544 | 1/1977 | Bliven et al. | 425/121 |
| 4,133,621 | 1/1979 | Plocher et al. | 425/116 |
| 4,144,010 | 3/1979 | Fenner | 425/126 R |
| 4,332,537 | 6/1982 | Slepcevic | 425/126 R |
| 4,442,056 | 4/1984 | Slepcevic | 425/127 |
| 4,480,975 | 11/1984 | Plummer et al. | 425/116 |
| 4,599,062 | 7/1986 | Konishi | 425/111 |

FOREIGN PATENT DOCUMENTS

| | | | |
|---|---|---|---|
| 2114366 | 11/1972 | Fed. Rep. of Germany | 425/126 R |
| 2425493 | 12/1975 | Fed. Rep. of Germany | 425/126 R |
| 0105332 | 6/1982 | Japan | 425/121 |
| 0048316 | 3/1985 | Japan | 425/126 R |

*Primary Examiner*—Willard E. Hoag
*Attorney, Agent, or Firm*—Harry M. Weiss & Associates

[57] ABSTRACT

An automatic continuously cycleable molding system wherein a plurality of mold sets are transported in predetermined timed cycles through a series of work stations wherein the various molding, curing and workpiece handling operations are accomplished, and wherein the mold sets are recirculatingly moved through the system for repeated usage.

3 Claims, 22 Drawing Sheets

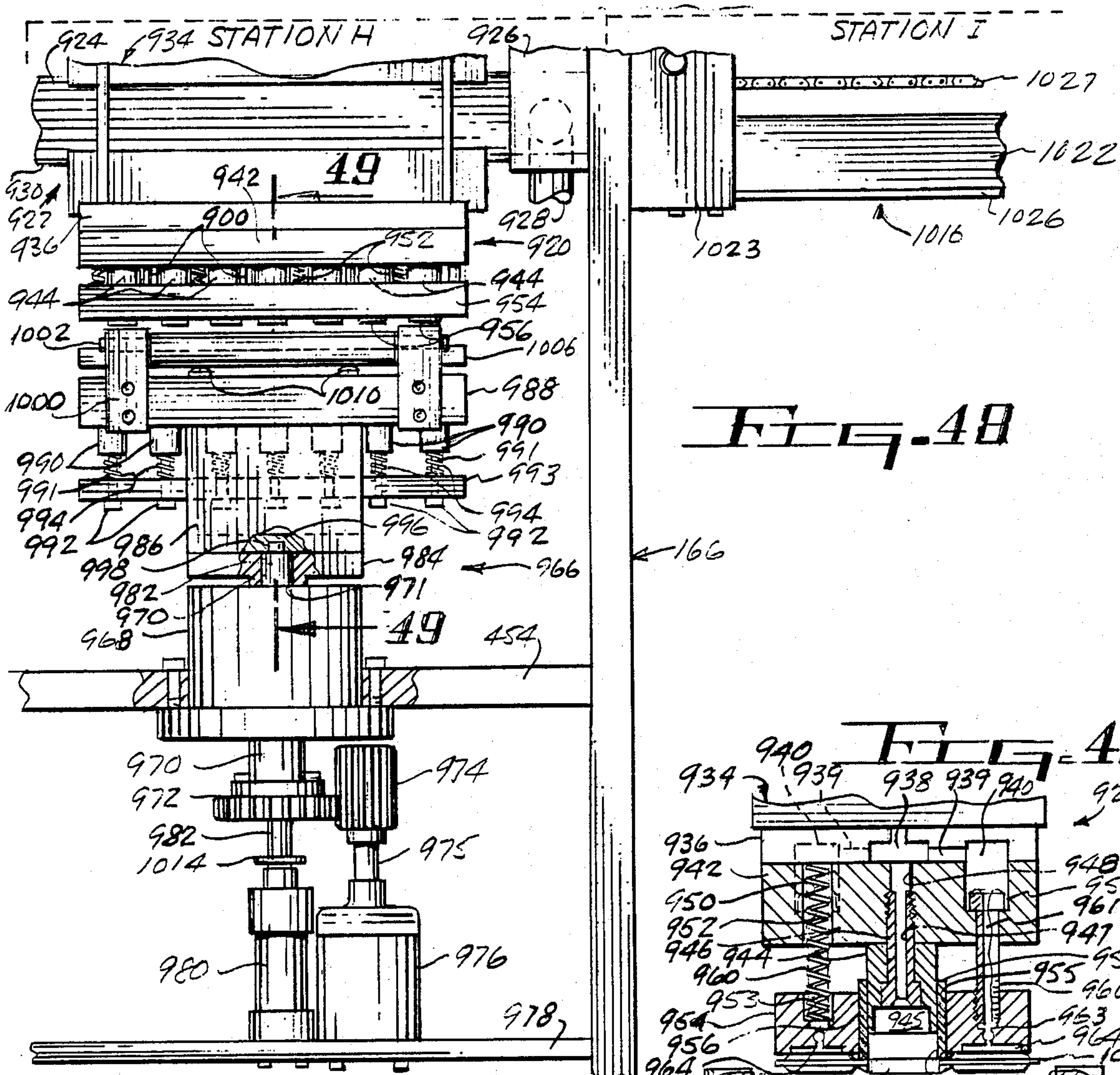
Fig-48
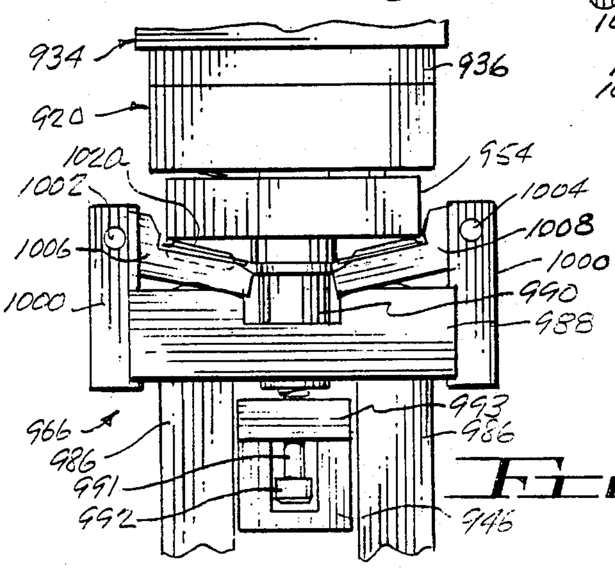
Fig-50
Fig-49
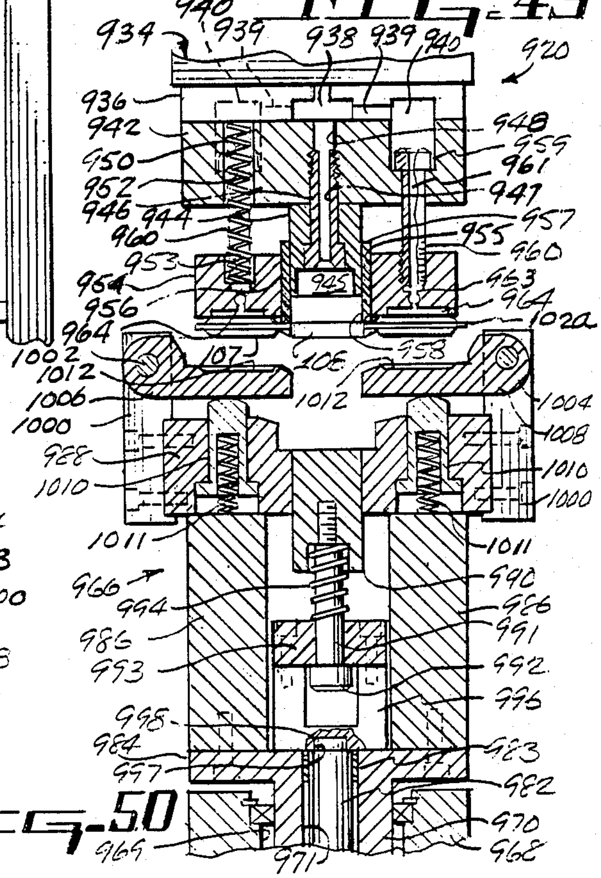

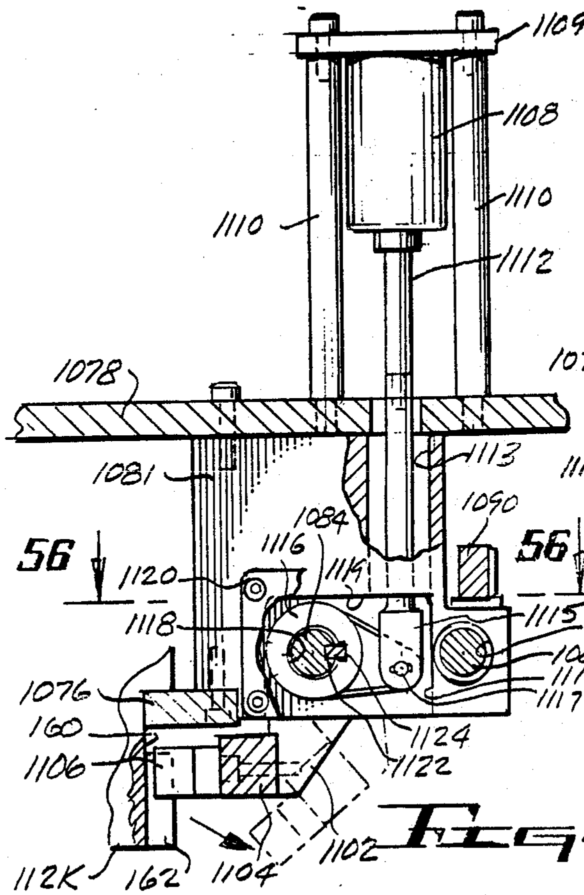
Fig-55
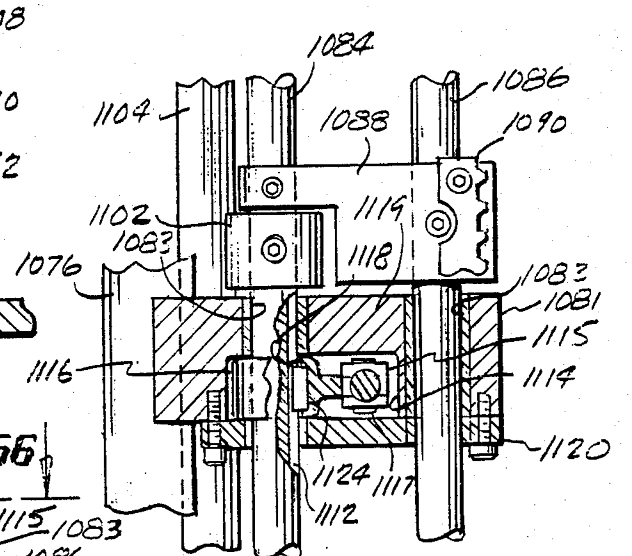
Fig-56
Fig-57
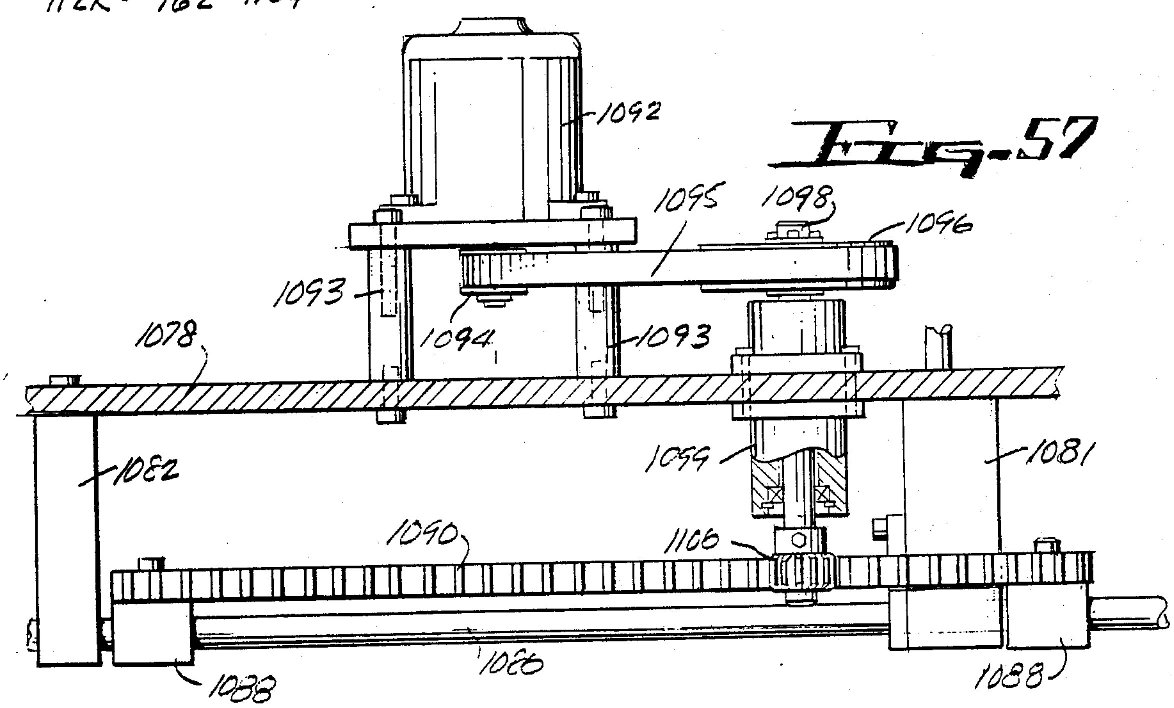

AUTOMATIC CONTINUOUSLY CYCLEABLE MOLDING SYSTEM

This is a Division of application Ser. No. 586,855, filed March 6, 1984 now U.S. Pat. No. 4,575,328.

BACKGROUND OF THE INVENTION

1. Field of the Invention

This invention relates in general to molding equipment and, more particularly, to an automatic continuously cycleable molding system which is ideally suited for encapsulation of electronic components and to a molding method therefor.

2. Description of the Prior Art

In molding equipment in general and in electronic component encapsulating equipment in particular, it has long been a practice to complete the entire molding cycle in a single, or at the most, two or three workstations. This type of prior art operation can be described as a batch operation in that one batch of parts is completed before another is started, or in some of the more sophisticated operations, there may be some overlapping of the various operations in successive batches.

In a typical prior art system for encapsulating integrated circuits, a plurality of such circuits are linearly arranged in a single workpiece, which is referred to as a leadframe. The premanufactured leadframes, which are to have the integrated circuits thereon encapsulated, are loaded into a bottom mold with the number of leadframes in a single batch being determined by mold size and the capacity of the particular molding equipment being used. The bottom mold is supported in the molding equipment, and after the leadframes are placed in the bottom mold, a top mold is moved into place atop the bottom mold. Some means is provided within the molding equipment to heat the molds to the proper temperature, and subsequently cool them for curing purposes. The heated molds are clamped together by the molding equipment and when the temperature is right, molding material, such as epoxy in pellet form, is placed in the mold set by being dropped into bores formed in the top mold of the mold set. Plungers are then inserted into the bores of the top mold on top of the epoxy pellets, and a pressurizing force is exerted on the plungers. The combination of the plunger force and the temperature causes the epoxy pellets to liquify and flow in the mold set to the cavities provided therein which determine the configuration and locations of the molded bodies which encapsulate the integrated circuits. Upon completion of this liquification and flow of the epoxy, the mold set is cooled to induce curing and subsequent thereto, the plungers are pulled from the mold set, the mold set is unclamped, and the top mold is lifted from the bottom mold. The leadframes are then removed from the bottom mold and carried to further equipment for degating, and otherwise operating on them to finish fabrication of the electronic circuit packages. The molds are then cleaned, if necessary, reheated and then they are ready for use in the next batch.

A rather substantial part of the above described typical prior art molding operation is accomplished by hand or under direct control of an operator or operators who determine timing and initiate the starting of the various operations. The need for operator participation is, of course, expensive, but the major problem is related directly to the limited production capability of such batch type operations. The need, for example, to continuously and repeatedly heat and cool the mold sets is very time consuming, and, of course, limits production.

Therefore, a need exists for a new and improved automatic continuously cycleable molding system which overcomes some of the problems and shortcomings of the prior art.

SUMMARY OF THE INVENTION

In accordance with the present invention, a new and improved fully automatic continuously cycling molding system is disclosed which includes a plurality of mold sets which are continuously transported through a multiplicity of in-line work stations wherein the various molding operations are continuously occurring in predetermined controlled timed intervals.

The system may include a first work station for bringing the leadframes, or other workpieces, into the system and unloading them from suitable magazines into a mechanism which arranges them in a proper orientation for placement into a heated bottom mold in the second station. The properly oriented leadframes are transported and placed in the bottom mold by a special conveyor means. The bottom mold is then transported to a third station wherein a preheated top mold is assembled on the bottom mold to form a mold set. The mold set is then transported to a fourth station wherein the mold set is clamped together, the molding materials are placed in the mold set and the needed force applied to the plungers which are removably carried in the top molds. When the molding has been accomplished in this fourth station, the mold set is transported to a fifth station for cooling and the resulting curing. The mold set is then transported to a sixth station wherein the top mold is disassembled from the bottom mold and the bottom mold is transported to a seventh station wherein the encapsulated leadframes are removed from the bottom mold. The encapsulated leadframes are moved to an eighth station wherein they are degated and then moved into a ninth station where they are loaded into magazines and removed from the system. Further stations are provided for recirculating the bottom molds and the top molds, cleaning them and returning them to the proper stations of the system for continuous reuse.

Even though the above description of the system of the present invention was presented as a sequentially occurring series of steps, it is to be understood that the system is intended to operate in the manner wherein each of the steps is repeatedly and simultaneously being accomplished in each of the work stations. Therefore, finished products are being produced by the system in a virtually continuous manner.

Accordingly, it is an object of the present invention to provide a new and improved automatic continuously cycleable molding system.

Another object of the present invention is to provide a new and improved automatic continuously cycleable molding system which is ideally suited for production of encapsulated electronic components.

Another object of the present invention is to provide a new and improved automatic continuously cycleable molding system which includes a multiplicity of in-line work stations wherein the various operations of a molding process are continuously and repeatedly occurring.

Another object of the present invention is to provide a new and improved automatic continuously cycleable molding system which includes a multiplicity of in-line work stations wherein the various operations of a molding process are continuously and repeatedly occurring in predetermined time cycles to eliminate the prior art problems relating to production delays resulting from the continuing and repeated heating and subsequent cooling of the molds.

Still another object of the present invention is to provide a new and improved automatic continuously cycleable molding system of the above described character wherein a multiplicity of mold sets are transported through the various in-line work stations wherein the steps of the molding operation are accomplished along with other workpiece input and output functions.

Yet another object of the present invention is to provide a new and improved automatic continuously cycleable molding system of the above described type wherein additional work stations are provided for cleaning, inspecting, and recirculation of the mold sets for continuous and repeated use thereof within the system, with these additional work stations operating in the same predetermined timed cycles.

The foregoing objects of the present invention, as well as the invention itself, may be more fully understood from the following description when read in conjunction with the accompanying drawings.

BRIEF DESCRIPTION OF THE DRAWINGS

FIG. 48 is a side elevational view which is partially broken away to show the various features of station H.

FIG. 49 is a fragmentary sectional view taken along the line 49—49 of FIG. 48.

FIG. 50 is a fragmentary elevational view of the mechanisms shown in FIG. 49 and showing a different operational position of the mechanism.

FIG. 55 is an enlarged fragmentary sectional view taken along the line 55—55 of FIG. 53.

FIG. 56 is a fragmentary sectional view taken along the line 56—56 of FIG. 55.

FIG. 57 is an enlarged fragmentary sectional view taken along the line 57—57 of FIG. 53.

DESCRIPTION OF THE PREFERRED EMBODIMENTS

Figure 1:
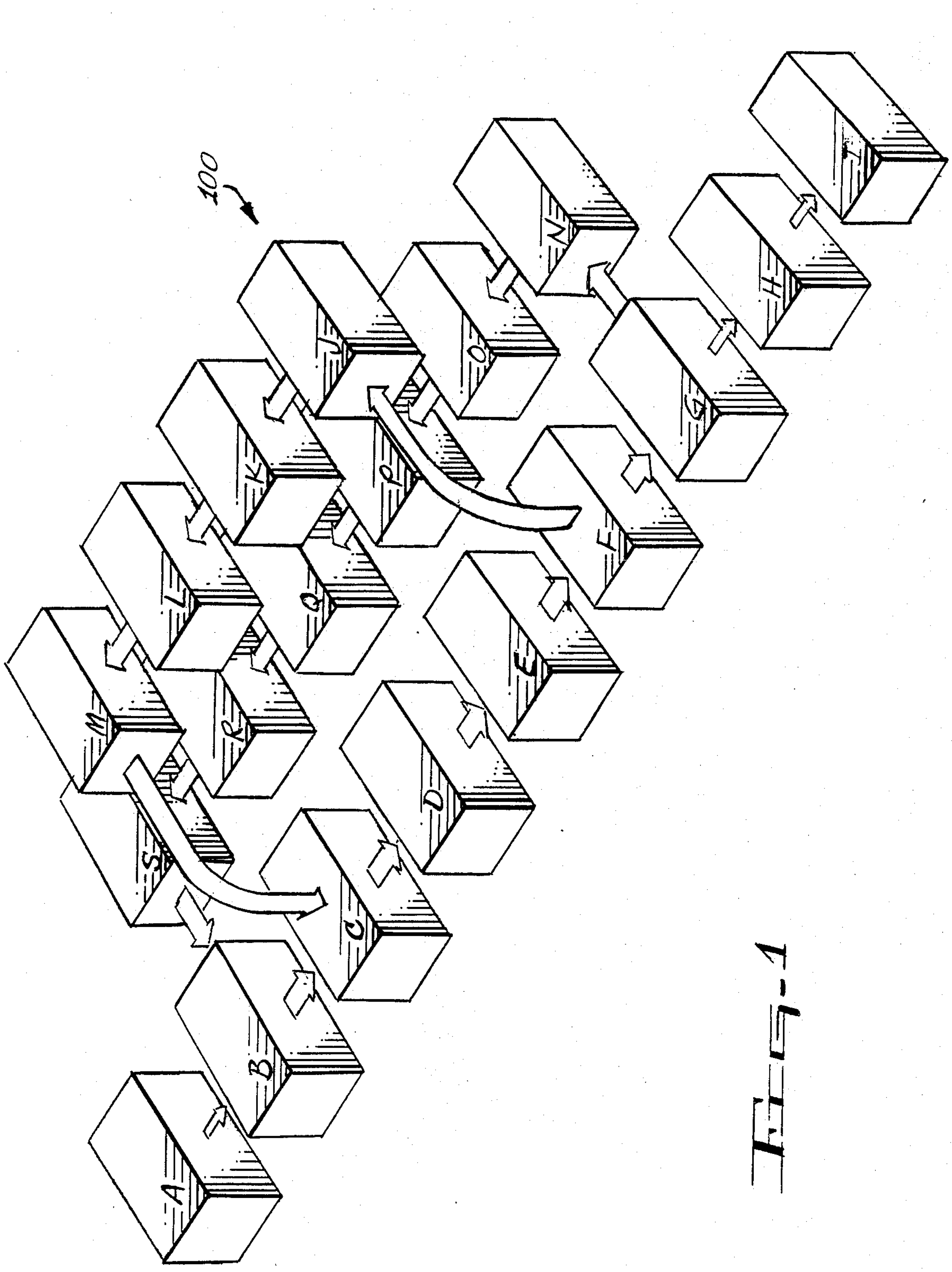
FIG. 1 is a perspective block diagram illustrating the various stations of the molding system of the present invention.

Referring more particularly to the drawings, FIG. 1 is a block diagram which identifies the various stations of the molding system 100 of the present invention. The various stations of the molding system 100 will now be identified and briefly described, and the complete detailed descriptions of the mechanisms and operations of those stations will hereinafter be described in detail.

Station A is the workpiece handling station of the molding system 100 and includes mechanisms for bringing workpiece containing magazines into the system, unloading the workpieces from the magazines, arranging them in a desired position, and moving them into station B.

Station B is the bottom mold loading station which has a heated bottom mold disposed therein for receiving the workpieces from station A, and a portion of a mold set transport sub-system which moves the bottom mold to station C.

Station C is a mold assembly station and includes means for lowering a heated top mold into place atop the bottom mold, and has part of the mold set transport sub-system therein which moves the assembled top and bottom molds, i.e., the mold set into station D.

Station D is the molding station which includes means for inserting molding material into the molds, clamping them together and applying pressure internally on the molds which, in conjunction with the heat, performs the desired molding operations on the workpieces contained in the mold set. A part of the mold set transport sub-system is located in this station and has means for providing a clamping pressure on the molds and moving them to station E.

Station E is the curing station which has means for maintaining continued clamping pressure on the molds during the curing that occurs in this station and a portion of the mold set transport sub-system which moves the molds to station F.

Station F is the mold disassembly station which raises the top mold off of the bottom mold and has a part of the mold set transport system therein for transporting the bottom mold to station G.

Station G is the bottom mold unloading station wherein the molded workpieces are removed from the bottom mold and transported to station H.

Station H is the degating station wherein the culls and gates are removed from the molded workpieces in preparation for movement to station I.

Station I is the finished product handling station wherein the completed products are deposited in finished product magazines and station I contains mechanisms for carrying the magazines out of the system.

In station F, which is the mold disassembly station as described above, means is provided for transporting the raised top mold to an elevated and laterally offset top mold recirculation transport sub-system, which moves the top molds through stations J, K, L and M. Station J receives the top molds from station F. Stations K and L are used for cleaning of the top molds, if necessary, and station M has means for returning the heated and cleaned top molds to the top mold lowering mechanism of the mold assembly station C.

When the bottom mold is unloaded in station G, as hereinbefore described, the bottom mold is transported by a mechanism provided in station N to a laterally offset bottom mold recirculating transport sub-system which includes stations N, O, P, Q, R and S. Stations N, O, P, Q, R and S have the bottom mold recirculating transport sub-system therein for moving the molds through those stations wherein the temperature of the molds is returned to a proper molding temperature and is maintained, and they are cleaned, if necessary, and station R includes means for returning the heated and cleaned bottom molds to the bottom mold loading station B.

As hereinbefore mentioned, the molding system 100 of the present invention may be employed for performing various molding, or encapsulating operations on various types of workpieces. However, the system 100 is particularly well suited for handling various configurations of a particular type of workpiece, and performing a particular encapsulation operation thereon. Thus, for completeness of the disclosure, and to facilitate understanding of the system 100, an exemplary configuration of the particular workpiece 102 is shown in the fragmentary perspective view of FIG. 2, and the nearly finished resultant product of the system 100 is shown at 102*a* in the fragmentary prespective view of FIG. 3.

Figure 2:
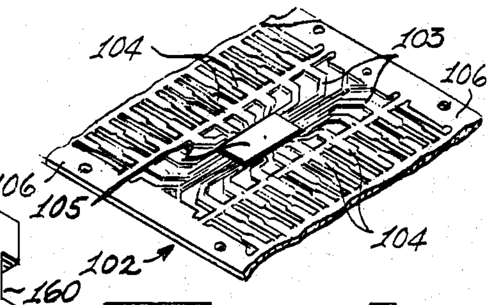
FIG. 2 is a fragmentary perspective view of a particular type of workpiece which is well suited for being subjected to the molding operations of the system of the present invention.

The workpiece 102 shown in FIG. 2 is of the type generally referred to as a leadframe in the art, and is an elongated strip of thin gage metal having a high degree of electrical conductivity. The leadframe 102 is stamped, or otherwise formed to provide an array of leads 103 and contacts, or pins 104, for a discrete integrated circuit chip 105 which is bonded to the array so as to be in electrically conductive contact with the leads and pins of the array. In FIG. 2, one complete array is shown with fragmentary portions of adjacent linearly arranged arrays on opposite ends thereof. Therefore, it will be understood that the leadframe 102 consists of a plurality of such arrays, one for each integrated circuit chip 105. The plural arrays are interconnected, to facilitate handling, by an opposed pair of longitudinally extending side rails 106. After the leadframes are processed in the system 100, the side rails 106 are removed, and other cutting operations are performed thereon so that each processed leadframe 102*a* produces a plurality of integrated circuit packages which, in the illustrated embodiment, are of the type commonly referred to as dual-in-line packages.

In the preferred embodiment of the present invention, a pair of the leadframes 102 are simultaneously processed in a side-by-side relationship, and when removed from the bottom mold in station G, the leadframes 102*a* have an encapsulating body 107 for each of the integrated circuit chips 105 and their associated leads 103, and the pins 104 extend from the bodies. The side-by-side pair of leadframes 102*a* are interconnected at this stage of the processing by a cull 108 and by gates 109 which are formed when the encapsulating material is caused to flow during formation of the encapsulating bodies 107.

Figure 4:
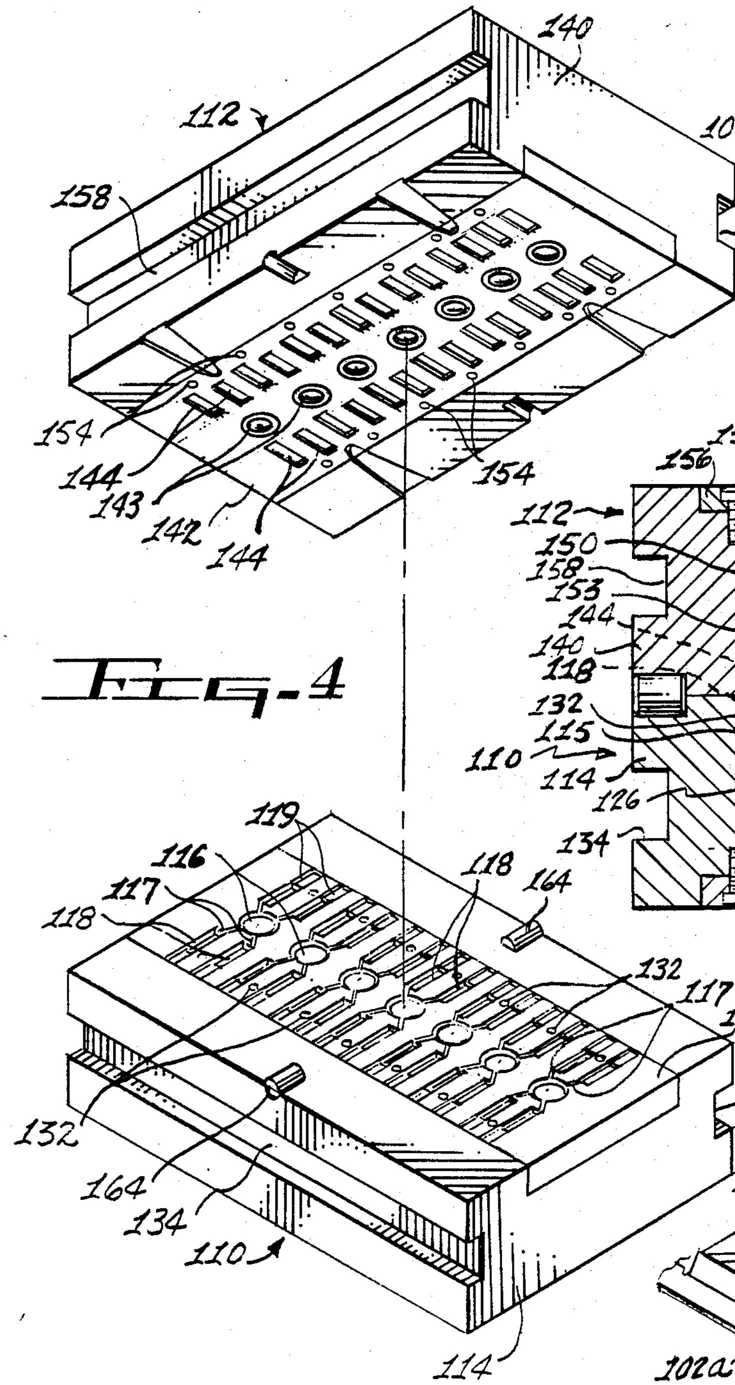
FIG. 4 is a perspective exploded view of a mold set which is used in the system to perform the molding operations on the workpieces shown in FIGS. 2 and 3.
Figure 5:
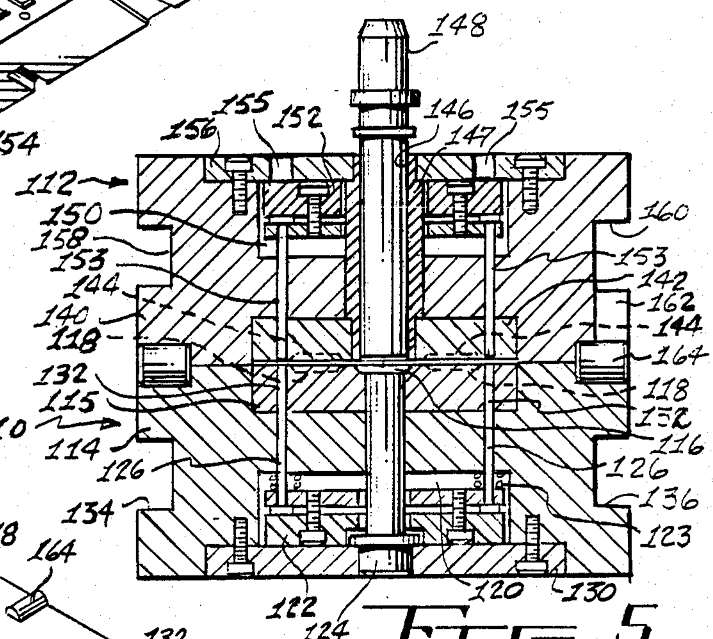
FIG. 5 is a transverse sectional view taken through the assembled mold set shown in FIG. 4.

FIGS. 4 and 5 show the bottom mold 110 and the top mold 112 which cooperate to accomplish the encapsulating process on the leadframes 102 in the system 100, as will hereinafter be described in detail. The molds 110 and 112 are fabricated and operate in a manner well known in the art. Therefore, the molds will be briefly described herein only in sufficient detail to facilitate understanding of the present invention, and to point out the modifications that are accomplished on those molds to make them operate within the system 100.

The bottom mold 110 includes a mold base 114 having the bottom die 115 mounted in the upper surface thereof in the manner well known in the art, such as by bolts (not shown). The die 115 is machined or otherwise formed to define a centrally aligned row of material receiving cavities 116 each having four runners 117 extending therefrom into communication with the inside edges of four different upwardly opening recesses 118. The recesses 118 lie in longitudinally extending rows on opposite sides of the cavities 116 and each recess has a vent passage 119 extending from its opposite edge.

A chamber 120 is formed in the mold base 114 below the die 115 and an ejector plate 122 is moveably mounted therein and is biased downwardly by the springs 123. The ejector plate 122 has a plurality of thermally conductive pins 124, one for each material receiving cavity 116 and each pin 124 has an oppositely disposed pair of auxiliary ejector pins 126. Each central pin 124 has an upwardly extending end which forms the bottom surface of its respective one of the material receiving cavities 116, and a downwardly extending end which extends through the retainer plate 130 which holds the ejector plate 122 in the chamber 120. Each of the auxiliary ejector pins 126 extends upwardly from the ejector plate 122 through a bore 132 provided in the mold base 114 and the die 115. By applying heat to the lower ends of the central pins 124, heat is directly transferred to the area adjacent to the cavity to heat the epoxy. In this manner, the pins 126 will move upwardly to eject the product being molded from the bottom mold 110. More specifically, the pins 126 will push the culls 108 out of the cavities 116, and the pins 126 will press against the side rails 106 of the leadframes 102*a*.

The bottom mold 110, in addition to the above described features, has a longitudinally extending pair of grooves 134 and 136 formed in the opposite side surfaces of the mold base 114. The grooves 134 and 136 are employed for moving and clamping operations in the system 100 as will become apparent as this description progresses.

The top mold 112 is provided with a mold base 140 having the upper die 142 mounted in the lower surface thereof. The upper die 142 is formed with a centrally extending row of openings 143, each of which is disposed to align with a different one of the material receiving cavities 116 when the top and bottom molds 110 and 112 are positioned as shown in FIG. 5. The die 142 is also provided with a plurality of downwardly opening recesses 144 which lie in rows on opposite sides of the opening 143. Each of the recesses 144 align with a different one of the recesses 118 of the bottom mold 110 when the molds are assembled as shown in FIG. 5.

As shown in FIG. 5, each of the openings 143 (one shown) is defined by the lower end of a bore 146 formed in a sleeve 147 and a plunger 148 is demountably carried in the bore of the sleeve and is slidably movable therein as will hereinafter be described.

A chamber 150 is formed in the mold base 140 above the die 142 and an ejector plate 152 is movably mounted therein. The ejector plate 152 is provided with two spaced apart rows of ejector pins 153 (two shown) which extend downwardly through bores formed in the mold base 140 and the die 142, and open as at 154 on the downwardly facing surface of the die 142. When the top mold 112 is placed atop the bottom mold 110 during molding operations in the system 100, the ejector pins 153 will hold the ejector plate 152 in the upwardly disposed position shown in FIG. 5. When the molds 110 and 112 are separated to remove the encapsulated leadframes 102*a* (FIG. 3), the ejector plate 152 is moved downwardly by a force exerted thereon through openings 155 provided in the retainer plate 156 which holds the ejector plate 152 in the chamber 150. When the ejector plate 152 is moved down in this manner, the ejector pins 153 will also move downwardly to eject the product being molded from the top mold 112. More specifically, the ejector pins 153 will push against the side rails 106 of the lead-frames 102*a*.

Similar to the bottom mold 110, the top mold 112 is provided with a longitudinally extending pair of grooves 158 and 160 in the opposite side surfaces thereof for moving and clamping operations in the system 100. The mold base 140 is also provided with a centrally located slot 162 which extends centrally from the groove 160, with the slot being employed for top mold moving purposes in the system 100.

As is customary in the art, the top and bottom molds 110 and 112 are provided with registration means, such as the pins 164, to insure that proper alignment and registration of the molds is achieved when they are assembled.

Figure 3:
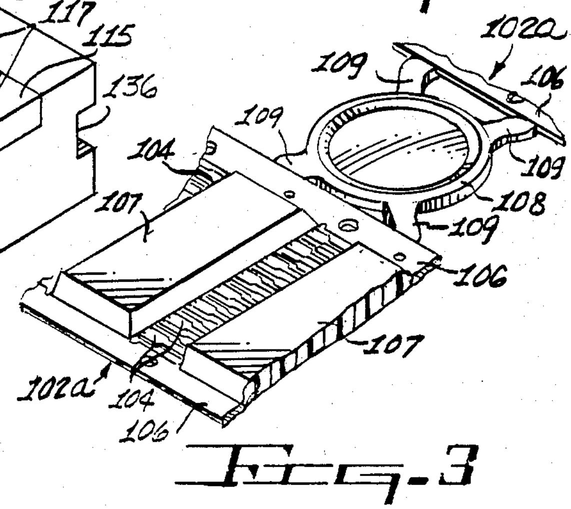
FIG. 3 is a fragmentary view similar to FIG. 2 and showing the workpiece as it would appear after being partially processed by the molding system of the present invention.

In use, a pair of the leadframes 102 (FIG. 2) are placed in side-by-side relationship on the bottom mold 110, so that they overlay different rows of the recesses 118 with each chip 105 being disposed over a different one of the recesses. The top mold 112 is then placed atop the bottom mold 110 in the manner shown in FIG. 5, so that each chip 105 of the leadframes lies within the space defined by different aligned recesses 118 and 144 of the bottom and top molds, respectively. The molds 110 and 112 are then clamped together and the plungers 148 are removed and pellets (not shown) of suitable molding material, such as epoxy, are dropped into the bores 146 of the top mold 112 and fall into the material receiving cavities 116 of the bottom mold 110. The plungers 148 are then reinserted into the bores 146, and a downwardly exerted force is applied to the plungers. This force, in addition to the heat of the mold, changes the state of the pellets (not shown) from the solid state to a fluid state and the force of the plungers 148 causes the fluid encapsulating material to flow through the runners 117 into the spaces defined by the recesses 118 and 144. Upon subsequent cooling, the fluid materials will return to the solid state and the leadframes 102*a* will be encapsulated as shown in FIG. 3.

Before proceeding with the detailed description of the various stations A through S of the molding system 100, it is to be understood that the system is supported and the various stations are interconnected by a suitable frame which is identified generally by the reference numeral 166, but is not shown in its entirety for clarity reasons. Instead, various structural elements and portions of the frame 166 are shown in the various figures of the drawings. It will also be understood that the system 100 is enclosed by a suitable skin which includes panels, access doors, thermal insulation, and the like, none of which is shown for clarity reasons.

As hereinbefore mentioned, station A contains mechanisms for the input of the magazines which contain the workpieces that are to be encapsulated into the system 100, and unloading the workpieces. The mechanisms used for accomplishing this first function of station A are shown in FIGS. 6, 7, 8 and 9 of the drawings.

Figure 7:
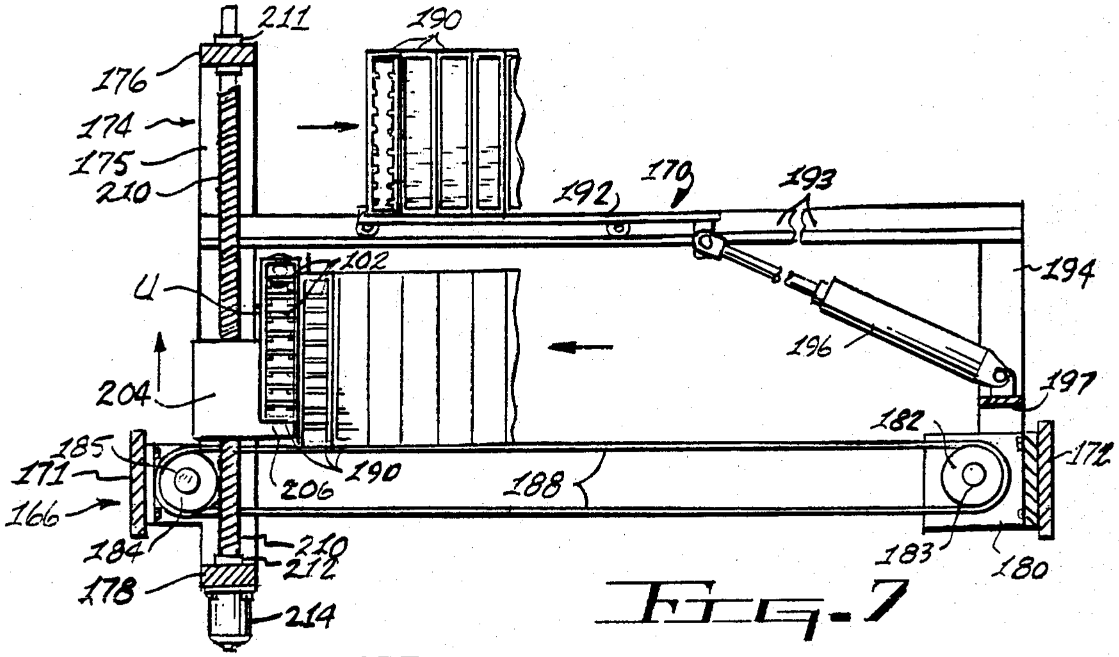
FIG. 7 is a sectional view taken along the line 7—7 of FIG. 6.
Figure 6:
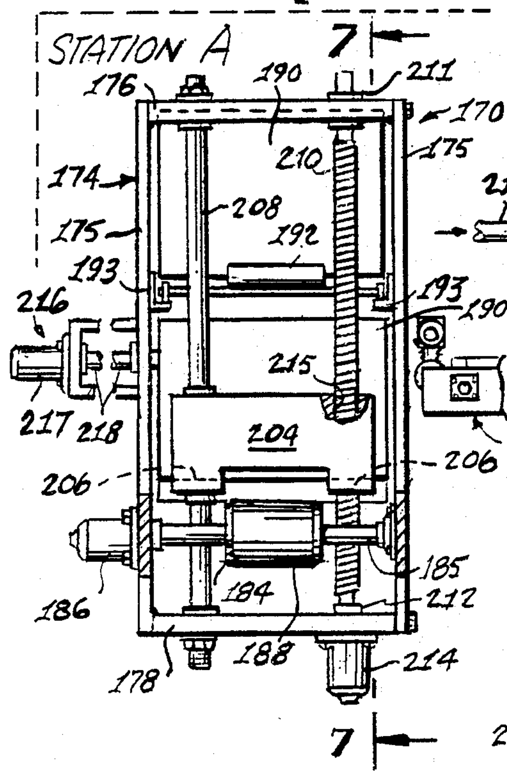
FIG. 6 is an end elevational view of a magazine transport and unloading sub-system by which the workpieces shown in FIG. 2 are brought into the system in magazines and are unloaded from the magazines.

FIGS. 6 and 7 show the system input magazine transport and unloading sub-system, which is indicated generally by the reference numeral 170, as being supported between the spaced structural elements 171 and 172 of the system frame 166. The magazine input sub-system 170 includes a substantially rectangular sub-frame 174 which is suitably mounted on the structural element 171 and includes a spaced-apart pair of vertical members 175 which are interconnected by a top cross beam 176 and a bottom cross beam 178. A bracket 180 is suitably mounted on the other structural element 172 and a roller 182 is rotatably carried on an axle 183 that is mounted on the bracket. A similar roller 184 is mounted fast on a drive shaft 185 which is journaled in bearings carried on the vertical members 175 of the rectangular sub-frame 174. The drive shaft 185, and thus the roller 184, is driven by an electric stepping motor 186 which is mounted on one of the vertical members 175. An endless conveyor belt 188 is arranged to extend between the rollers 182 and 184 and is movable by means of the motor 186 and the driven roller 184 in the counterclockwise direction as viewed in FIG. 7.

A plurality of workpiece input magazines 190 are carried by the conveyor belt 188 to the unloading position U where the leadframes 102 are removed therefrom in the manner to be described. When the magazines 190 are emptied, they are removed from station A by means of a wheeled carriage 192 which is carried at an elevated level on a spaced apart pair of tracks 193 which are attached on one end thereof to the rectangular sub-frame 174 and have their opposite ends supported in the elevated position by a pair of standards 194 (one shown) which extend upwardly from the bracket 180. The wheeled carriage 192 is reciprocally moved on the tracks 193 by means of a ram 196 which is connected between the carriage and a stringer 197 which extends between the standards 194.

Figure 9:
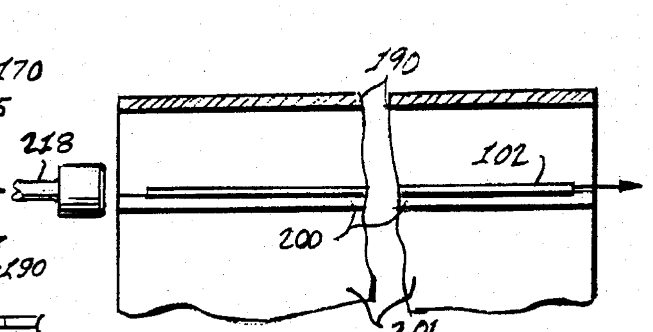
FIG. 9 is a fragmentary sectional view taken along the line 9—9 of FIG. 8.
Figure 8:
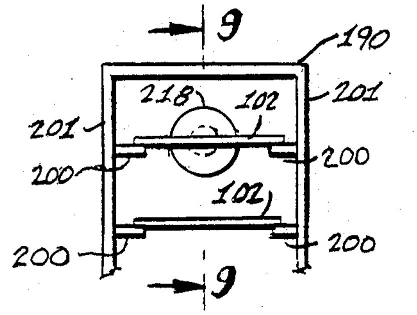
FIG. 8 is a fragmentary end view of a typical magazine in which the workpieces shown in FIG. 2 are brought into the system.

As seen best in FIGS. 8 and 9, each of the magazines 190 is an upstanding rectangular structure which is open at both of its opposite ends, and has a plurality of vertically spaced ledges 200 extending inwardly from its spaced apart sidewalls 201, and a leadframe 102 is supportingly carried between each aligned pair of the ledges 200.

When a magazine 190 to be unloaded arrives at the unloading position U, a vertically movable carriage 204 is moved upwardly to bring a spaced-apart pair of extending forks 206 into supporting engagement with the bottom surface of the magazine. The carriage 204 is vertically movable on a guide rod 208 which is fixedly carried so as to extend between the top and bottom cross beams 176 and 178 of the rectangular sub-frame 174. An elongated screw 210 is also mounted so as to extend vertically between the cross beams 176 and 178 and the screw is rotatably journaled in suitable bearings 211 and 212 carried in the cross beams. The screw 210 is rotatably drivable by means of a suitable reversibly drivable motor 214 which is carried on the bottom surface of the cross beam 178. The screw 210 extends through the carriage 204 which is provided with an internally screw threaded bore 215 which is in meshed engagement with the screw 210, for raising the carriage 204 when the screw is rotated in one direction and lowering the carriage when the screw is rotated in the opposite direction.

The carriage 204 is operated in the up direction to sequentially bring each of the leadframes 102 carried in the magazine 190 that is being raised by the carriage into alignment with an unloading device 216. The unloading device may be in the form of the ram cylinder 217 having an extensible pusher rod 218. In this manner, the top leadframe 102 is pushed from the magazine 190 first, and the magazine is moved up and the second leadframe 102 is offloaded. When the lowest leadframe 102 is pushed from the magazine, the carriage 204 continues to move upwardly so that the wheeled carriage 192 can be moved under the now empty magazine to carry it out of the molding system 100. The carriage 204 is then returned to its lowermost position to pick-up the next magazine 190 which is to be unloaded.

The second operation which is accomplished in station A is that of receiving the leadframes 102 which are offloaded from the magazines 190 and arranging them in a side-by-side position for subsequent transporting into station B, wherein they are loaded into the bottom mold 110. The leadframe receiving and arranging is accomplished by a receiving and arranging mechanism which is identified generally by the reference numeral 220, and is illustrated in FIGS. 10, 11, 12, 13, 14 and 15 of the drawings.

Figure 10:
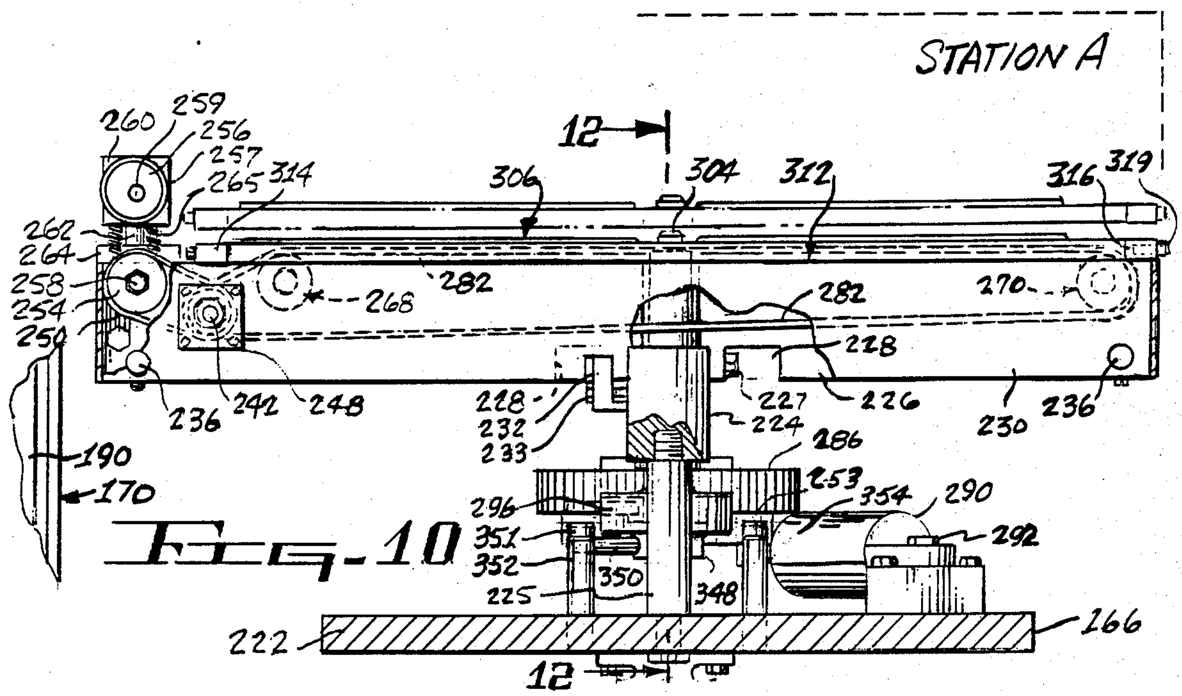
FIG. 10 is a side elevational view which is partially broken away to show the various features of a receiving and arranging mechanism for receiving the workpieces from the magazine transport and unloading sub-system and arranging them in a side-by-side relationship for subsequent placement in the bottom mold.

The receiving and arranging mechanism 220 is disposed in juxtaposed relationship with respect to the input magazine transport and unloading sub-system 170 as indicated in FIGS. 6 and 10.

Figure 12:
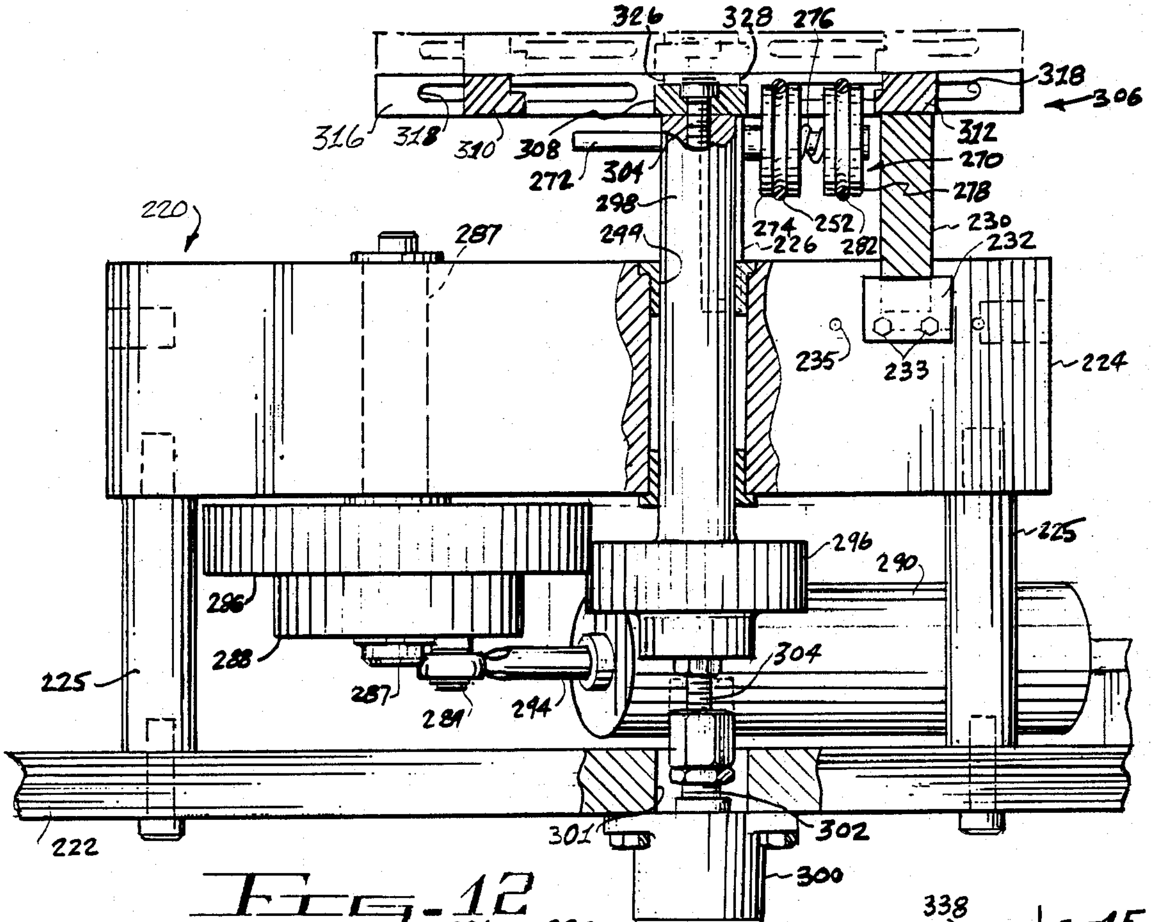
FIG. 12 is an enlarged sectional view taken along the line 12—12 of FIG. 11.

The arranging mechanism 220 is mounted on a cross member 222 of the system frame 166 and includes a beam 224 which is fixedly supported on a spaced pair of columns 225 in a position above the cross member 222. A first cross plate 226 is fixedly attached intermediate its opposite ends to the beam 224 by bolts 227 (one shown in FIG. 10) which are located in notches 228 provided in the first cross plate 226 for that purpose. A second cross plate 230 is adjustably attached intermediate its opposite ends to the beam 224 by a bracket 232 which has bolts 233 which may be selectively mounted in any pair of an array of internally threaded bolt holes 235, as seen in FIG. 12, to adjustably vary the spacing between the first and second cross plates 226 and 230 for reasons which will hereinafter be described in detail. In addition to the above described mounting of the first and second cross plates 226 and 230 to the beam 224, a pair of guide rods 236 are mounted on opposite ends of the first cross plate 226 and extend normally therefrom through suitable bores which are aligningly formed in opposite ends of the second cross plate 230. The guide rods 236 are employed to maintain parallelism between the two cross plates 226 and 230.

Figure 13:
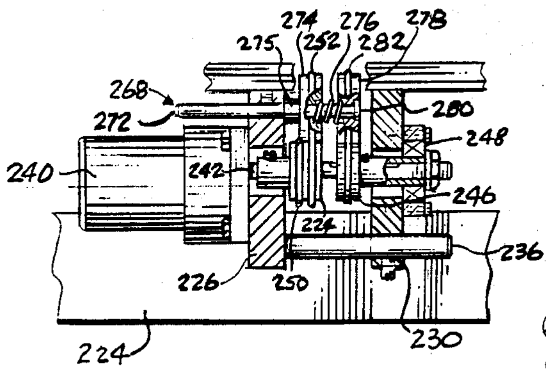
FIG. 13 is an enlarged fragmentary sectional view taken along the line 13—13 of FIG. 11.

An electric motor 240 is mounted on the first cross plate 226, as seen best in FIG. 13, and the motor has an output shaft 242 which extends therefrom through aligned apertures formed in the cross plates 226 and 230. A first pulley 244 and a second pulley 246 are axially slidably positionable on the output shaft 242 and both are provided with suitable set screws by which they are adjustably attached to the output shaft 242 for rotation therewith. The extending end of the output shaft 242 is rotatably journaled in a suitable bearing 248 which is mounted on the second cross plate 230.

The first pulley 244 is employed to drive a pair of O-ring type belts 250 and 252. The first belt 250 is employed to transmit rotary motion to a pulley 254 which is vertically disposed below a pinch roller 256 which has an O-ring 257 on its peripheral surface. The driven pulley 254 is journaled for rotation about a stub axle 258 which is carried on the first cross plate 226. The pinch roller 256 is journaled for rotation about a stub axle 259 which is carried by a right angle plate 260 which is in turn carried on the upper end of a plunger 262 of a suitable solenoid 264, that is mounted on the first cross plate 226. The right angle plate 260 is biased to its normal upper position, shown in FIG. 10, by a pair of springs 265, and when the solenoid is energized, the plunger 262 will pull the right angle plate 260, and thus the pinch roller 256, downwardly toward the pulley 244. When a leadframe 102 (FIG. 2) is offloaded from a magazine 190 in the manner hereinbefore described, it will be received tangentially above the driven pulley 254. The solenoid 264 is then energized to move the pinch roller 256 downwardly. The belt 250, which drives the pulley 254, and the O-ring 257 on the pinch roller will frictionally grip the opposite surfaces of the leadframe and move to the right as viewed in FIG. 10.

Figure 11:
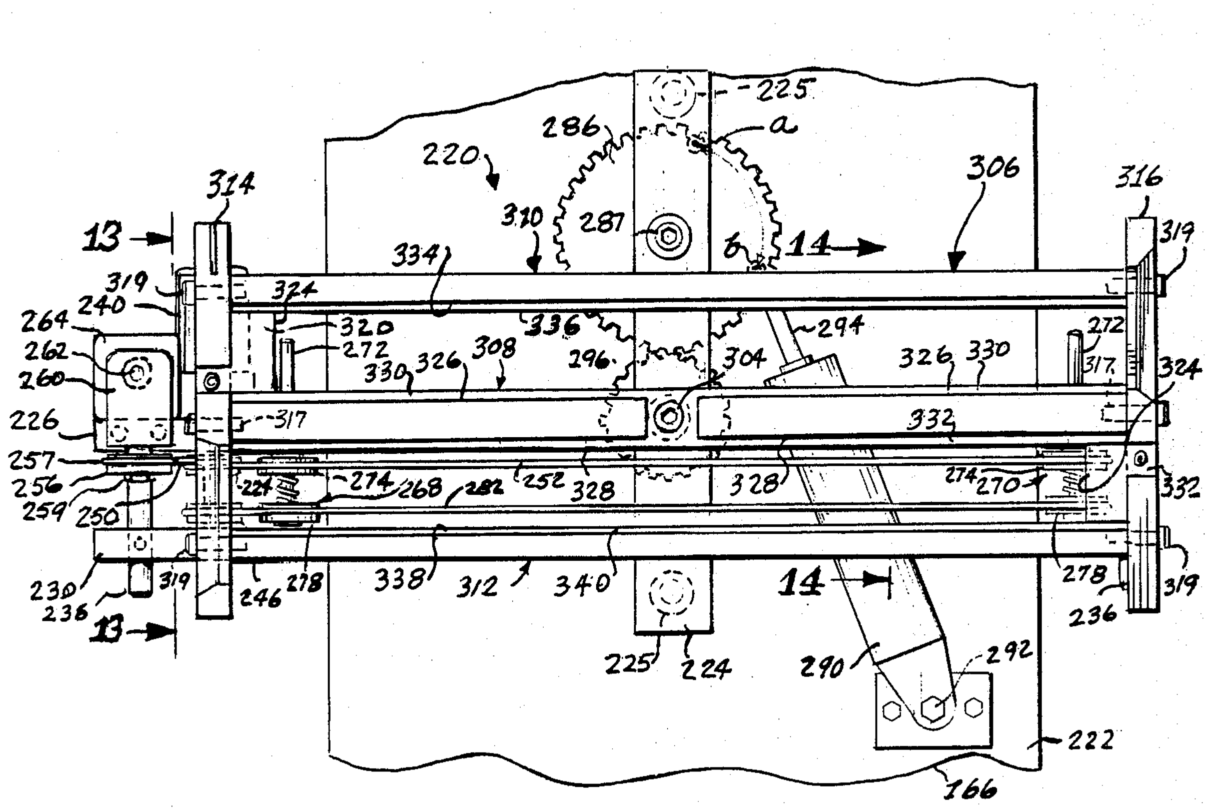
FIG. 11 is a plan view of the receiving and arranging mechanism of FIG. 10.

As seen in FIGS. 10 and 11, a pair of roller assemblies 268 and 270 are mounted on opposite ends of the first cross plate 226. These roller assemblies are identically configured in a manner best seen in FIG. 13. Since the roller assemblies 268 and 270 are identical, the following description of the assembly 268 will be understood to also apply to the roller assembly 270.

The roller assembly 268 includes an axle shaft 272 which is transverse with respect to the cross plate 226 and is slidably movable in an aperture formed therethrough. A suitable set screw is provided in the cross plate 226 to lock the axle shaft in the desired position. A first roller 274 is mounted for rotation about the axle shaft 272 with this roller 274 also being axially slidable thereon. The roller 274 is provided with an axially extending hub 275 which is held in abutting engagement with the cross plate 226 by means of a spring 276. The spring 276 is disposed between the first roller 274 and a second roller 278 which is also mounted for rotation about the axle shaft 272 adjacent the extending end thereof. The axle shaft 272 is provided with an enlarged head 280 on its extending end to hold the second roller 278 in place on the end of the axle shaft. The spring 276 holds the second roller 278 against axial movement in the direction away from the head 280 and also holds the first roller 274 so that its hub 275 is in bearing engagement with the first cross plate 226. In this manner, the spacing between the two rollers 274 and 278 can be adjusted by simply loosening the set screw of the axle shaft and slidably moving the axle shaft in the aperture provided in the cross plate 226.

The first pulley 224, which is carried on the output shaft 242 of the drive motor 240, drives the second endless O-ring type belt 252 as hereinbefore mentioned. This second belt 252 is looped over the first roller 274 of the first roller assembly 268 and around the first roller 274 of the second roller assembly 270. The second pulley 246 which is carried on the output shaft 242 of the motor 240 drives another endless O-ring type belt 282 which is looped over the second roller 278 of the first roller assembly 268 and around the second roller 278 of the second roller assembly 270.

From the above, it will be seen that the first and second roller assemblies 268 and 270 along with the endless belts 252 and 282, form a conveyor which is driven by the two pulleys 224 and 226 which are carried on the output shaft of the motor 240. Further, as hereinbefore described, the spacing between the two cross plates 226 and 230, the two pulleys 224 and 226 and the spacing between the two rollers 274 and 278 of each of the roller assemblies 268 and 270 may be adjusted. Thus, the distance between the two endless belts 252 and 282 may be varied to suit the width dimension of the leadframe, or any other workpiece for that matter, which is being subjected to the molding process in the system 100.

As seen best in FIG. 12, a gear 286 is carried on the depending end of an axle shaft 287 which is vertically carried in the beam 224, and, the gear 286 is suitably journaled for rotation about the axis of the axle shaft 287. A cylindrical boss 288 extends axially from the bottom surface of the gear 286 and is fast for rotation therewith. A pin 287 extends from the boss 288 with the pin being disposed adjacent the periphery of the boss. A ram means 290 has one of its ends pivotably attached to the cross member 222 as at 292 in FIGS. 10 and 11. The extensible plunger 294 of the ram 290 has its extending end pivotably attached to the depending pin 289, and the ram is employed to rotatably and reciprocally move the gear 286 through approximately 90° of rotational movement between two positions identified as a and b in FIG. 11.

A second gear 296 is fixedly carried on a shaft 298 which is journaled for rotation and axially movable in a bore 299 formed vertically through the beam 224. The gear 296 is in meshing engagement with the gear 286 and is configured to provide a 2 to 1 gear ratio so that the gear 296 is driven by the gear 286 through approximately 180° of rotation when the gear 286 is rotated by the ram 290 in the manner described above. The shaft 298, and thus the gear 296, are axially movable in the bore 299 of the beam, with such movement being accomplished by a linear actuator means 300 which is mounted below the cross member 222. The cross member 222 is provided with an aperture 301 through which the plunger 302 of the linear actuator 300 is axially reciprocally movable, with the plunger 302 being connected to the gear 296 by an elongated threaded bolt 304 about which the gear 296 and the shaft 298 are rotatably movable.

Figure 14:
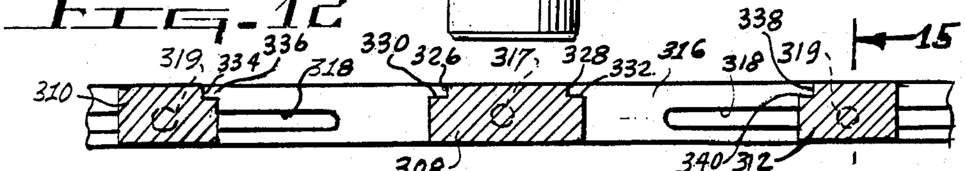
FIG. 14 is an enlarged fragmentary sectional view taken along the line 14—14 of FIG. 11.
Figure 15:
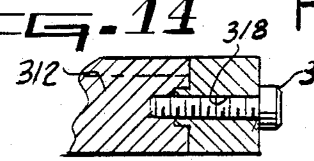
FIG. 15 is an enlarged fragmentary sectional view taken along the line 15—15 of FIG. 14.

A turntable means 306 is fixedly attached to the uppermost end of the shaft 298 for rotation and axial movement therewith by means of the above mentioned threaded bolt 304. The turntable includes a center rail 308 which is attached intermediate its opposite ends to the upper end of the shaft 298, and an identical pair of side rails 310 and 312 which are parallel and disposed on opposite sides of the center rail 308. The aligned opposite ends of the center rails 308 and the opposite side rails 310 and 312 are connected to each other by end rails 314 and 316. The end rails 314 and 316 are connected between their opposite ends to the center rail 308 by suitable bolts 317. As shown in FIGS. 12, 14 and 15, the end rails 314 and 316 are provided with elongated slots 318 in which the bolts 319, which attach the opposite ends of the side rails 310 and 312 to the end rails 314 and 316, are slidably relocatable so that the spacing between the center rail 308 and the side rails 310 and 312 may be adjusted. This adjustment is provided so that the turntable 306 may be set to handle leadframes, or other workpieces, of various width dimensions as will become apparent as this description progresses.

Figure 15A:
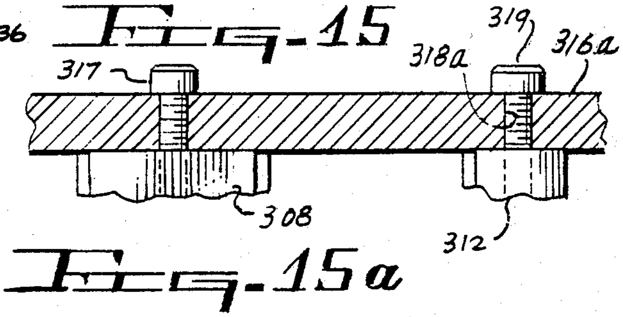
FIG. 15*a* is a fragmentary plan view, partially in section to show the various features of a modification of the workpiece receiving and arranging mechanism.

An alternative to the adjustably positionable side rails 310 and 312, FIG. 15*a* shows a modified form of the turntable wherein the end rails are provided with apertures 318*a* (one shown), instead of the elongated slots 318, as shown in the modified end rail 316*a*. The center rail 308 is mounted in the hereinbefore described manner by means of the bolts 317 (one shown) and the side rails 310 and 312 (only 312 is shown in FIG. 15*a*) are fixedly but demountably mounted by means of the bolts 319 (one shown). With this modified form of the turntable, the spacing between the center and side rails may be adjusted by replacing a given set of the rails with another set having different width dimensions. A given set of the workpiece receiving and supporting rails is defined as including the center rail 308 and both of the side rails 310 and 312, or only the center rail 308, or only the two side rails 310 and 312, as needed to achieve the desired spacing.

The end rail 314 has a spacer block 320 removably attached thereto so as to be positioned between the center rail 308 and the side rail 310. The end rail 316 is provided with a similar spacer block 322 which is removably attached thereto so as to be disposed between the center rail 308 and the opposite side rail 312. These spacer blocks 320 and 322 are identical to each other and are employed to insure that the spaces between the center rail 308 and the opposite side rails 310 and 312 are identical. Additionally, the spacer blocks 320 and 322 have stop surfaces 324 which serve to precisely locate the leadframes, or other workpieces, longitudinally on the turntable 306. The spacer blocks 320 and 322 shown in the drawings are demountably attached to their respective end rails 314 and 316, as indicated above, and may be replaced with spacer blocks (not shown) which have different dimensions to position the side rails 310 and 312 at appropriate positions to suit the width dimensions of the leadframes or other workpieces, and to locate the stop surfaces as needed to suit the length dimensions of the leadframes or other workpieces.

As seen best in FIGS. 11 and 14, the center rail 308 is configured to provide longitudinally extending right angle notches 326 and 328 in the opposite edges of the top surface of the center rail, with these notches forming recessed horizontal ledges 330 and 332, respectively. The side rail 310 is provided with a similar longitudinally extending right angle notch 334 in the edge of the top surface thereof which is nearest to the center rail 308, with this notch 334 forming a recessed horizontal ledge 336. Likewise, the other side rail 312 is formed with a longitudinally extending right angle notch 338 in the edge of the top surface thereof which is nearest to the center rail 308 with this notch 338 providing a recessed horizontal ledge 340. All of the ledges 330, 332, 336 and 340 lie in the same horizontal plane and serve a purpose which will hereinafter be described in detail.

When a first one of the leadframes 102 (FIG. 2) is ejected from the magazine 190 (FIG. 6) and is received between the pulley 254 and the pinch roller 256, it will be propelled onto the conveyor belts 252 and 282, the upper runs of which, as seen best in FIG. 11, are located in the space between the center rail 308 and the side rail 312. Thus, the conveyor belts 252 and 282 will propell this first leadframe into that space on the near side of the center rail 308 as viewed in FIG. 11. The leading edge of the leadframe will move into engagement with the stop surface 324 of the spacer block 322, and the first leadframe will be restingly supported on the recessed horizontal ledge 332 of the center rail 308 and the recessed horizontal ledge 340, of the side rail 312. Thus, the longitudinal position of the leadframe is accurately determined by the spacer block 322 and the lateral position is precisely determined by the vertical side surfaces of the right angle notches 328 and 338 of the center rail 308 and the side rail 312, respectively.

The turntable means 306 is then raised, to the position shown in phantom lines in FIG. 10, to clear the conveyor belts 252 and 282, and then the turntable means 306 is rotated through 180°, and the turntable is then lowered to its solid line position. When turned end for end in this manner, the space between the center rail 308 and the side rail 312 in which the first leadframe is disposed as described above, will swap places with the empty space between the center rail 308 and the other side rail 310. The turntable means is then disposed to receive a second leadframe which is deposited in the space between the center rail 308 and the other side rail 310 in the manner hereinbefore described.

As seen in FIG. 10, an axial boss 348 depends from the gear 296 and a pin 350 extends radially therefrom. A pair of spaced posts 351 and 352 are mounted on the cross member 222 so as to extend upwardly therefrom on one side of the boss 348. An identical pair of spaced posts 353 and 354 are provided on the diametrically opposed side of the boss 348. These pairs of posts 351, 352 and 353, 354 are employed to precisely limit rotational movement of the turntable mechanism 306 to 180° of rotation. When the turntable 306 is elevated, as it is during rotation, the radial pin 350 will rotate to a position between the pins 351 and 352 in one direction of rotation, and a position between the pins 353 and 354 in the opposite rotational direction.

With a pair of the leadframes 102 (FIG. 2) arranged on the turntable mechanism 306 in side-by-side relationship in the above described manner, they are now ready to be moved from station A to station B, and this movement is accomplished by a conveyor means 360 which is shown in FIGS. 16, 17, 18 and 19.

The conveyor means 360 is mounted between a spaced pair of support members 361 and 362, which extend transversely of suitable frame elements 363 (one shown) of the system frame 166. The conveyor means 360 includes a beam 364 the opposite ends of which are attached to the support members 361 and 362 so as to extend therebetween. A first housing 366 is dependingly mounted on the end of the beam which is proximate the support member 361, with that end being hereinafter referred to as the workpiece pick-up end of the conveyor means 360. Another, or second housing 368 is similarly mounted on the opposite end of the beam 364 which will hereinafter be referred to as the workpiece delivery end of the conveyor means 360.

Figure 16:
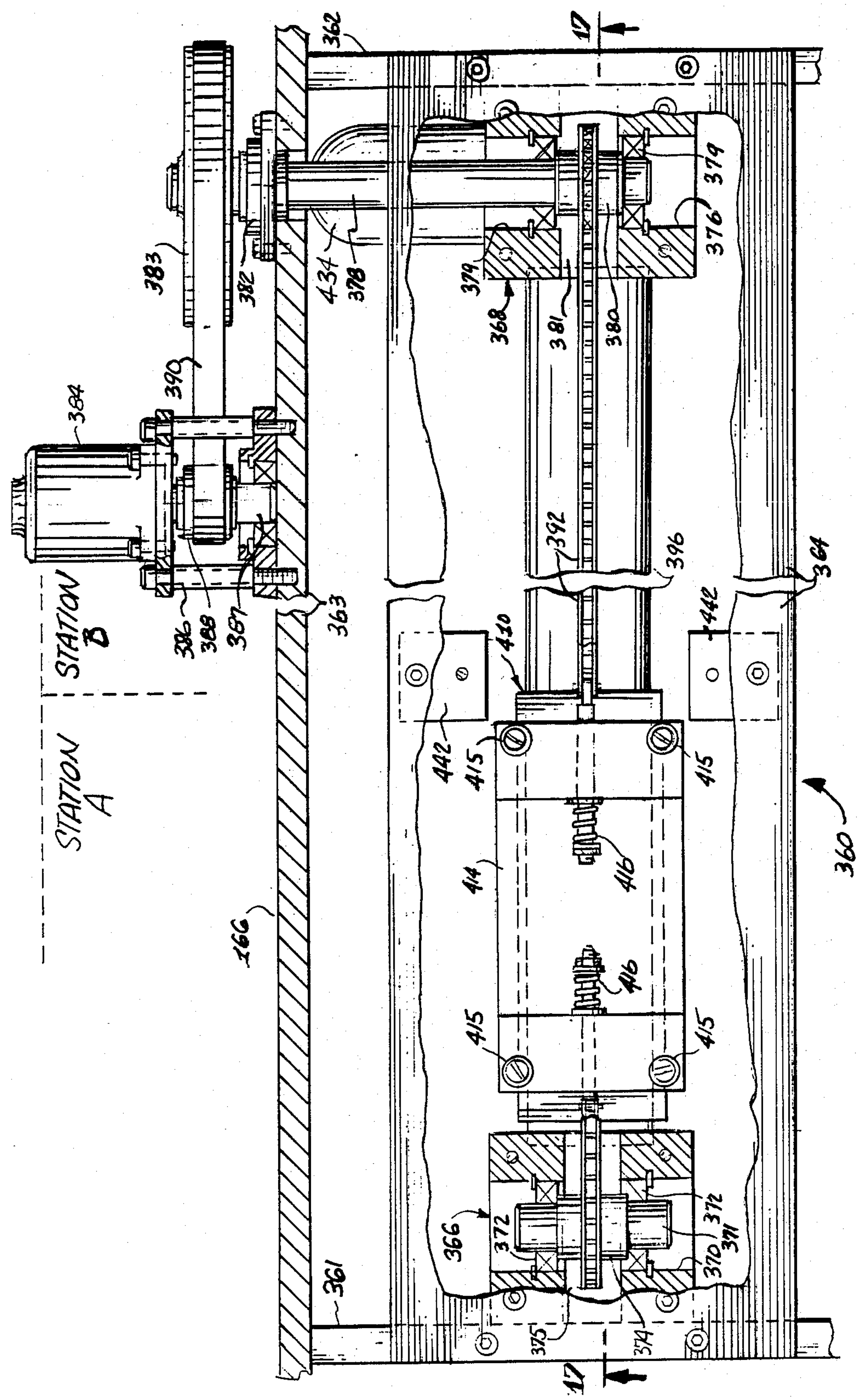
FIG. 16 is a fragmentary and partially broken away plan view of a conveyor mechanism which is disposed between stations A and B of the system to move the workpieces from the receiving and arranging mechanism to the bottom mold loading station B.

The first housing 366 has a bore 370 formed therein, as seen in FIG. 16, with a shaft 371 being journaled for rotation therein on suitable bearings 372. A driven sprocket 374 is fixed on the shaft 371 for rotation in a cross-slot 375 which opens toward the second housing 368. The second housing 368 is similary provided with a bore 376 in which a drive shaft 378 is journaled in the bearings 379. A drive sprocket 380 is mounted fast on the drive shaft 378 for rotation in the transverse slot 381 provided in the second housing 368 with the slot 381 opening toward and in alignment with the slot 375 of the first housing 366. The drive shaft 378 extends from the bore 376 and is journaled in a bearing assembly 382 which is carried on the frame element 362 and has a driven pulley 383 mounted on the extending end thereof. A reversibly drivable electric motor 384 is mounted on a motor mount assembly 386 which is carried on the frame element 362 and the electric motor 384 has an output shaft 387 upon which a drive pulley 388 is fixedly mounted. An endless belt 390 passes around the two pulleys 383 and 388 for rotational driving of the drive sprocket 380. A chain 392 is carried on the two sprockets 383 and 388 as will hereinafter be described in detail.

Figure 17:
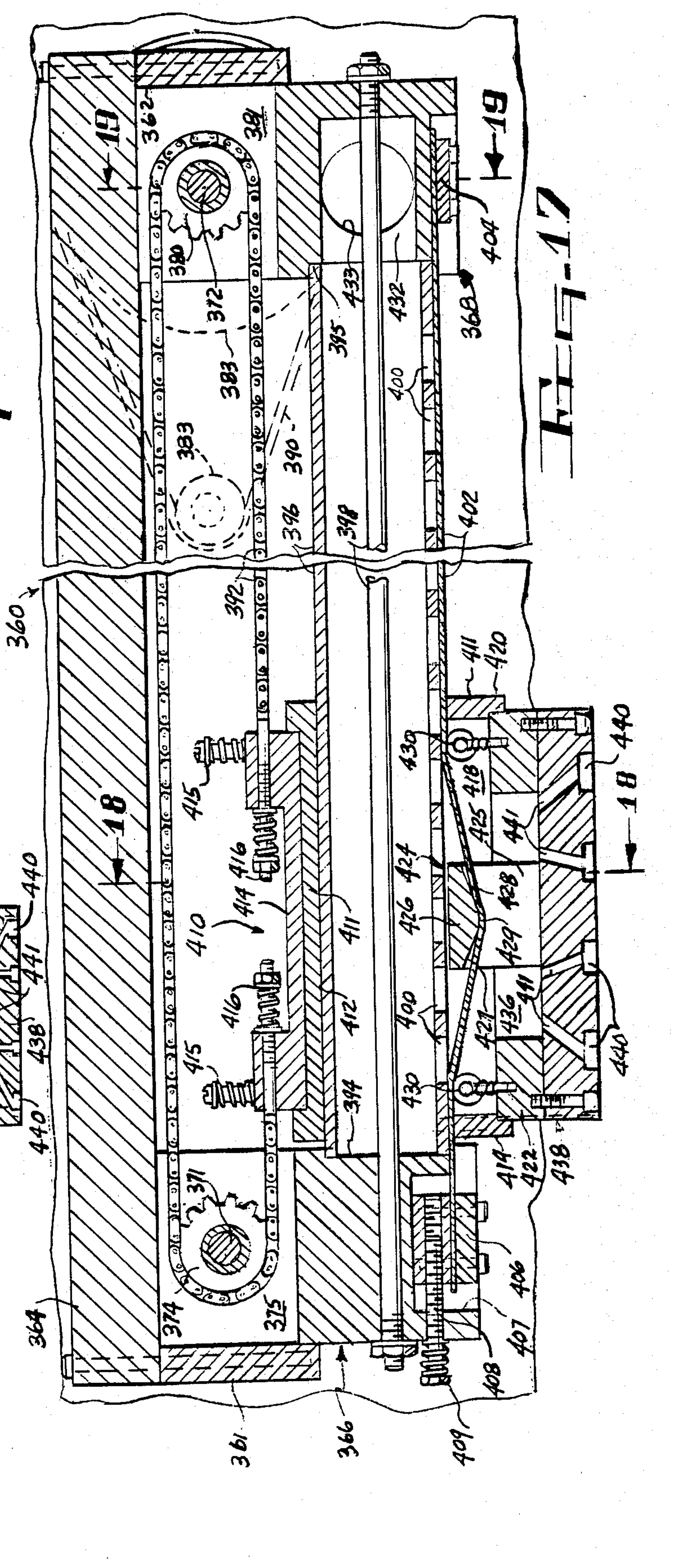
FIG. 17 is a fragmentary sectional view taken along the line 17—17 of FIG. 16.

As seen in FIG. 17, the first housing 366 is formed with a recess 394 below the cross-slot 377 and the second housing 368 is similarly provided with a recess 395. The recesses 394 and 395 of the housings 366 and 368, respectively, are aligned and open toward each other, and the opposite ends of a tube 396 are disposed in the recesses so that the tube extends between the pick-up and delivery ends of the conveyor means 360. An elongated rod 398 having threaded ends extends axially through the tube and oppositely through the two housings 366 and 368, with suitable nuts carried thereon to hold the tube in place between the two housings.

The tube 396 is preferably of square cross section and has a plurality of ports 400 formed through the bottom wall of the tube with the ports being formed in spaced increments along the length of the tube. An elongated deflectable band 402, preferably formed of thin gage steel, is disposed in coextending contiguous engagement with the downwardly facing surface of the bottom wall of the tube 396 for selectively opening and closing the ports 400 as will hereinafter be described in detail. One end of the band 402 is fixedly attached to the second housing 368 by means of the mounting block 404, and the opposite end of the band is captively retained in the draw block 406 which is mounted in a downwardly opening cavity 407 provided in the first housing 366. The draw block 406 is mounted on a bolt 408 which passes freely through an aperture provided in the housing 366 with a spring 409 being interposed between the head of the bolt 408 and the housing 366 so as to bias the bolt, and thus the draw block 406 to the left in FIG. 17. In this manner, the band 402 is drawn taught to normally close the ports 400 of the tube 396, and yet allow the draw block 406 to move to the right when the band is deflected for selective port opening as will be described.

A carriage 410 is supported on the tube 396 and is movable along the length of the tube between the pick-up and delivery ends of the conveyor means 360. The carriage 410 includes a two piece housing 411 which defines a bore 412 through which the tube 396 loosely extends so that the tube supports the carriage and allows it to freely slide along the tube. A bracket 414 is mounted atop the housing 411 by means of the shock absorbing spring-screw arrangement shown at 415. The opposite ends of the hereinbefore mentioned chain 392 are mounted on the shock absorbing spring-stud devices shown at 416 to opposite ends of the bracket 414. Thus, the hereinbefore described sprocket-chain assembly will move the carriage 410 back and forth along the tube 396 by operation of the reversibly drivable motor 384.

Figure 18:
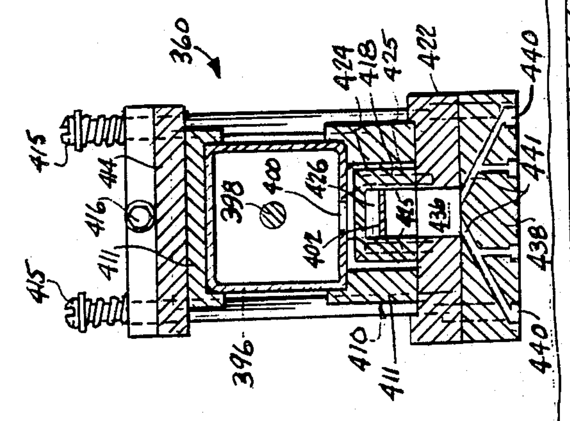
FIG. 18 is a fragmentary sectional view taken along the line 18—18 of FIG. 17.

The carriage housing 411 is provided with a longitudinally extending chamber 418 therein which is closed on its opposite ends by the housing end walls 419 and 420, on its lower end by a plate 422 and opens upwardly into the bore 412 in which the tube 396 is disposed. As shown in FIG. 18, the spring-screw devices 415 which mount the hereinbefore described bracket 414 on the housing also secure the bottom plate 422 thereto. The plate 422 is provided with an upstanding band deflection member 424 which is of inverted U-shape as seen best in FIG. 18. The band 402 passes between the spaced legs 425 of the deflection member 424 below the bight portion 426 thereof. The downwardly facing surface of the bight portion 426 is formed with inclined cam surfaces 427 and 428 which slope upwardly and oppositely from a central bearing surface or apex 429. The plate 422 also has a spaced pair of spring-loaded rollers 430 mounted on opposite sides of the deflection member 424 and upstanding from the plate 422 into bearing engagement with the band 402.

When the carriage 410 is moved along the tube 396, the rollers 430 will roll along the downwardly facing surface of the band 402 and the apex 429 and cam surfaces 427 and 428 of the deflection member 424 will slide along the upwardly facing surface of the band 402 thus deflecting the portion which is between the rollers 430 away from the tube 396 to open the ports 400 which lie between the rollers.

Figure 19:
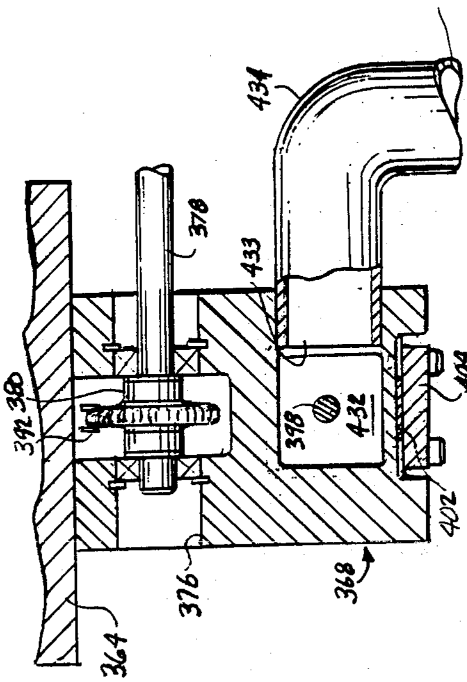
FIG. 19 is a fragmentary sectional view taken along the line 19—19 of FIG. 17.

As seen in FIG. 19, the second housing 368 is provided with a chamber 432 which opens into the recess 395 thereof and is thus in communication with the bore of the tube 396. The chamber 432 is provided with a lateral port 433 in which one end of a conduit means 434 is mounted. The other end (not shown) of the conduit means 434 is for connection to a suitable vacuum pump (not shown) or other suitable mechanism which may be located externally or internally of the system 100 as desired. Thus, a negative static pressure, or partial vacuum, is drawn in the tube 396 to cause air flow movement upwardly through a passage 436 provided in the plate 422, through the ports 400 which are opened by the deflector means 424 and into the tube.

A vacuum head 438 is interchangably mounted on the downwardly facing surface of the plate 422, and the head is provided with a suitable array of ports 440 and passages 441 which are designed to pick-up whatever workpieces are to be moved by the conveyor means 360. More specifically, the ports 440 in the illustrated vacuum head 438 are located so as to bear agains the side rails 106 of the leadframes 102 (FIG. 2) when the leadframes are being processed in the system 100.

The conveyor means 360 is disposed so that its workpiece pick-up end is in station A immediately above the turntable mechanism 306, and its product delivery end is in station B as will hereinafter be described. When the carriage 410 is in the workpiece pick-up position, the turntable mechanism 306 is elevated in the previously described manner to move the leadframes 102 (FIG. 2), which are arranged thereon in the side-by-side relationship upwardly into contact with the downwardly facing surface of the vacuum head 438 for demountable attachment of the leadframes thereto.

Figure 20:
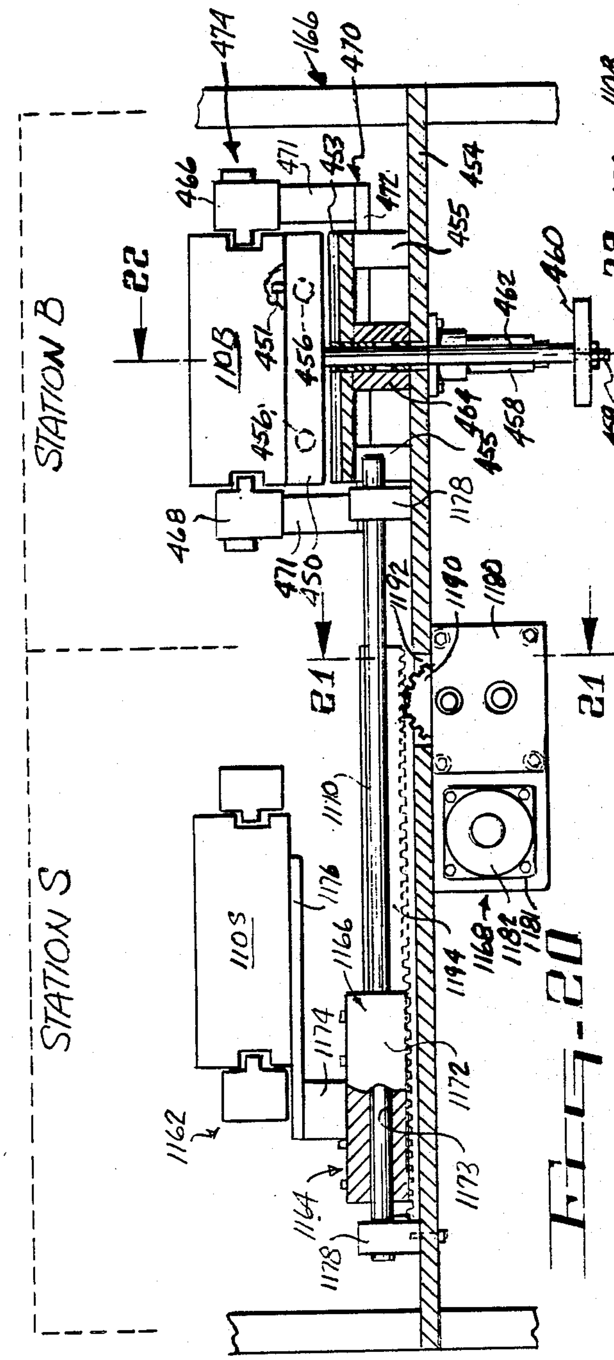
FIG. 20 is a fragmentary sectional view taken along a vertical plane through the molding system showing an end view of station B and station S.
Figure 22:
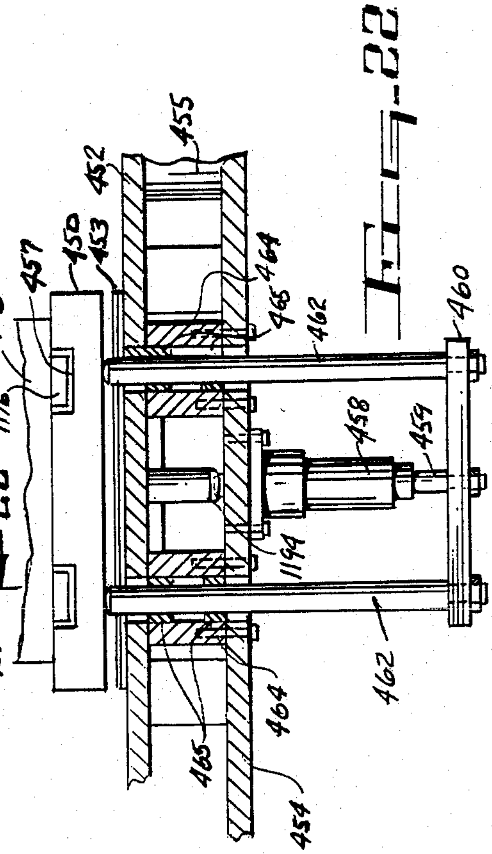
FIG. 22 is a fragmentary sectional view taken along the line 22—22 of FIG. 20.

Station B, which is the bottom mold loading station, is shown in the right hand side of FIG. 20 and in FIG. 22. As will hereinafter be described in detail, the bottom mold located in station B, which is referred to by the reference numeral 110B which denotes both the bottom mold and its location in the system, is received from station S. The bottom mold 110B is placed on a heating plate means 450 in a precise location thereon as determined by registration means 451 which, as shown, may be in the form of upstanding pins on the heating plate means 450 which cooperate with suitable sockets formed on the bottom mold 110B. The heating plate means 450, which maintains relatively high temperature of the mold needed for molding operations, is normally supported on a heater support plate 452 with suitable thermally insulative material 453 interposed therebetween. The heater support plate 452 is an elongated structure which extends through several stations as will become apparent as this description progresses. The heater support plate 452 is in turn supported in upwardly spaced relationship on a cross plate 454 by means of a plurality of support blocks 455. The cross plate 454 is part of the system frame 166 and as will become apparent, is quite extensive in size in that it extends through several stations and divides those stations into a relatively hot zone, or compartment, above the cross plate and a relatively cool zone, or compartment, below the cross plate 454. The various operating mechanism, such as the motors, rams, and the like, of a large part of the system 100 are physically located in the cool zone so that they will not be subjected to the high temperatures which are needed in the hot zone above the cross plate 454.

As seen in FIGS. 20 and 22, the heating plate means 450 is a block-like structure having suitable heating element means 456 therein which may, for example, be electric resistance type heating elements. A spaced apart pair of upwardly opening channels 457 are formed across the upper surface of the heating plate means 450 and the purpose for those channels 457 will be described with relationship to the description of station S.

As seen best in FIG. 22, a ram 458 is fixedly mounted on the downwardly facing surface of the cross plate 454, and its extensible plunger 459 is attached to a plate 460 intermediate its opposite ends. A pair of push rods 462 are mounted on the opposite ends of the plate 460 and extend upwardly therefrom through the cross plate 454, through a pair of sleeves 464, through the heater support plate 452, and through the insulation 453 into bearing engagement with the bottom surface of the heating plate means 450. When the ram 458 is extended, which is its normal position, the push rods 462 are downwardly disposed in relationship to the heating plate means 450 which is therefore normally resting on the insulation 453. When actuated, the plunger 459 of the ram 458 is retracted which moves the push rods 462 so that they slide axially upwardly in the bushings 465 provided in the bores of the sleeves 464 to raise the heating plate means 450, and thus the bottom mold 110B to either of a pair elevated positions, one of which is shown in FIGS. 20 and 22, with the purpose for these two elevated positions being hereinafter described.

As shown in FIG. 20, a spaced pair of walking beams 466 and 468 are disposed on opposite sides of the bottom mold 110B. The walking beams 466 and 468 are interconnected by yoke means 470 which includes a pair of blocks 471 each depending from a different one of the walking beams 466 and 468 with a cross bar 472 interconnecting the blocks 471 by extending between the depending ends thereof below the heater support plate 452. The walking beams 466 and 468 are part of a mold set transport means 474 which will hereinafter be described in detail.

As hereinbefore mentioned, the product delivery end of the conveyor means 360 is located in station B. Although not shown, the workpiece delivery end of the conveyor means 360 is located immediately above the bottom mold 110B in station B, and the workpieces, i.e., leadframes, are deposited, or loaded into the bottom mold 110B, which is raised to one of its above mentioned elevated positions, by simply turning off the source of vacuum so that the leadframes are released from the vacuum head 438. When this has been accomplished, the mold set transport means 474 is actuated, in a manner to be described, to move the bottom mold 110B to station C.

Figure 24:
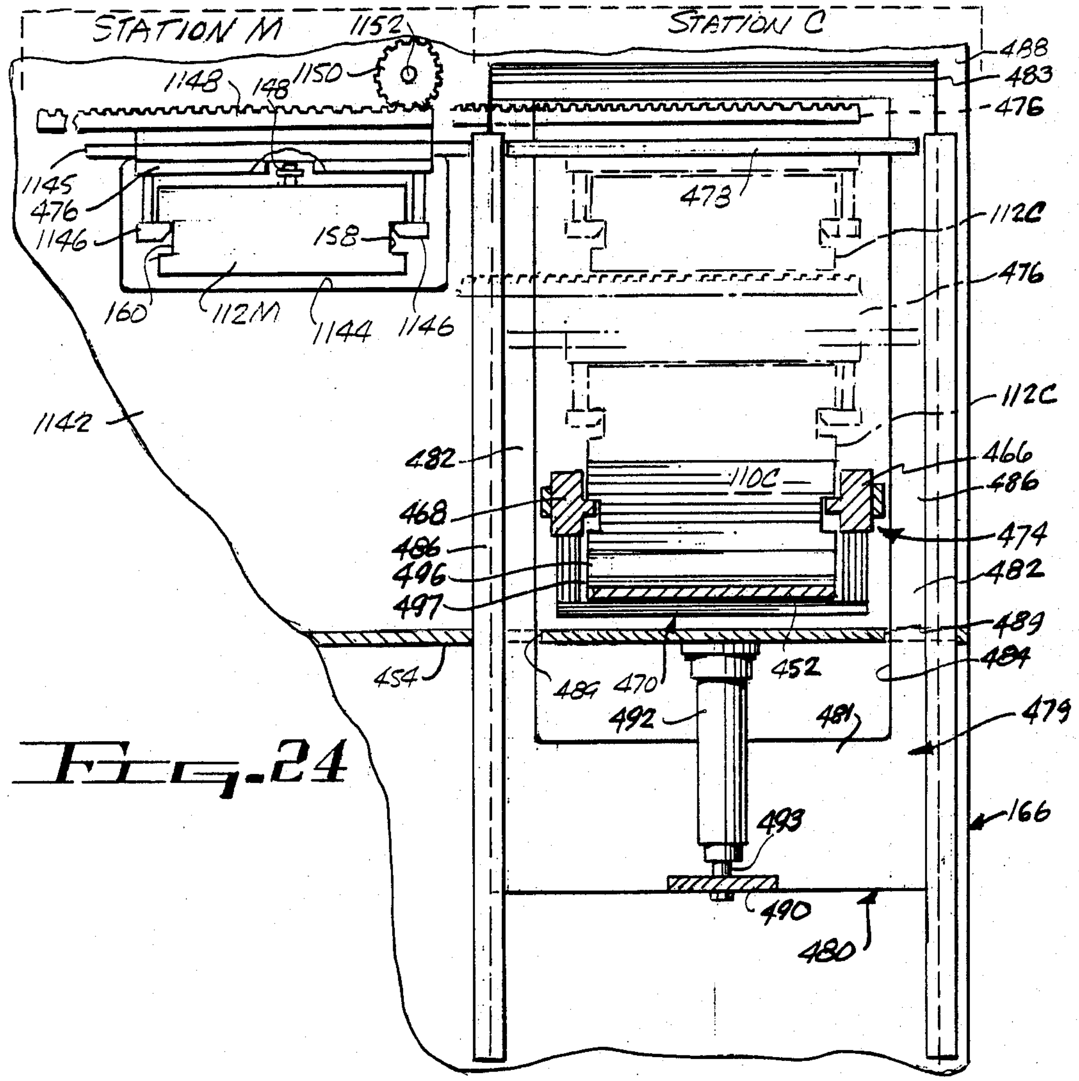
FIG. 24 is a fragmentary sectional view taken along the line 24—24 of FIG. 23.
Figure 23:
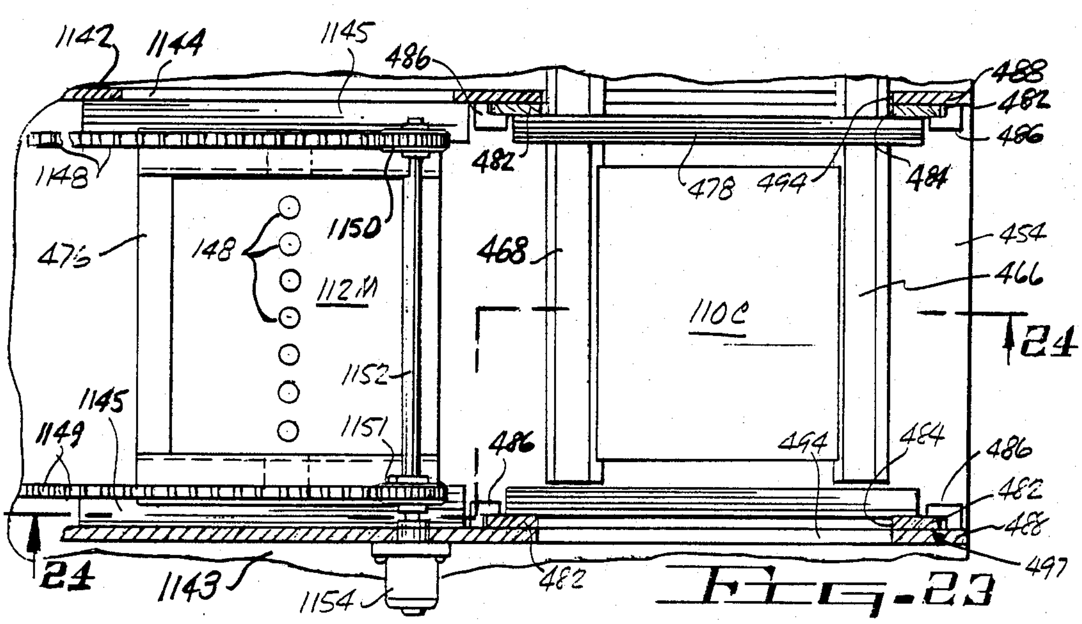
FIG. 23 is a plan view partially in section of stations M and C.

Station C, which is shown in the right hand portions of FIGS. 23 and 24, is the mold assembly station wherein one of the top molds 112 is placed on the bottom mold which was loaded with leadframes in station B and moved to station C. Since this bottom mold has been moved, it will now be referred to as bottom mold 110C to identify its new location. Similarly, the top mold is identified by the reference numeral 112M in its solid line position shown in FIG. 24, and when moved as indicated by its dash line positions in the same figure into station C, it will be identified by the reference numeral 112C.

In view of this, and as will hereinafter be described in detail, it will be seen that the top mold 112 is moved laterally from station M into station C and is moved downwardly into the assembled position atop the bottom mold 110C.

The top mold 112M is supportingly carried by a carriage 476, which forms part of the top mold lateral transport mechanism which will later be described in the description of station M. When moved into station C, the carriage 476 is received on a spaced apart pair of shelves 478 which are provided on an opposed pair of identical side plates 479 of an elevator structure 480. Each of the plates 479 includes a bottom cross member 481, an upstanding spaced apart pair of rail members 482 and a top cross member 483 which cooperatively define a central opening 484. The rail members 482 are held and vertically slidably movable in L-shaped tracks 486 which are carried on vertical plates 488 which are part of the system frame 166.

The bottom cross members 481 of the opposed side plates 479 are disposed in the relatively cool zone below the cross plate 454 and the rail members 482 extend upwardly through suitable slots 489 provided in the cross plate 454 so that the largest portions of the elevator structure 480 are located in the hot zone above the cross plate 454. The opposed side plates 479 of the elevator 480 are interconnected by means of a plate 490 which extends between the bottom cross members 481 thereof. A suitable ram 492 is fixedly mounted on the downwardly facing surface of the cross plate 454 so as to depend therefrom. The extensible plunger 493 of the ram 492 is connected to the plate 490 so that actuation of the ram will vertically move the elevator structure between an upper position for receiving the carriage 476, with the top mold 112C suspended therefrom, and a lower position wherein both the carriage 476 and the top mold 112C are immediately above the bottom mold 110C with the top mold 112C resting thereon.

The hereinbefore described heater support plate 452 extends thorugh openings 494 provided in the vertical plates 488 and another heating plate means 496 is supported thereon in station C with thermally insulative material 497 interposed therebetween. The bottom mold 110C is moved by the walking beams 466 and 468 of the mold of the mold set transport sub-system means 474 from station B into station C in the manner to hereinafter be described.

Figure 25:
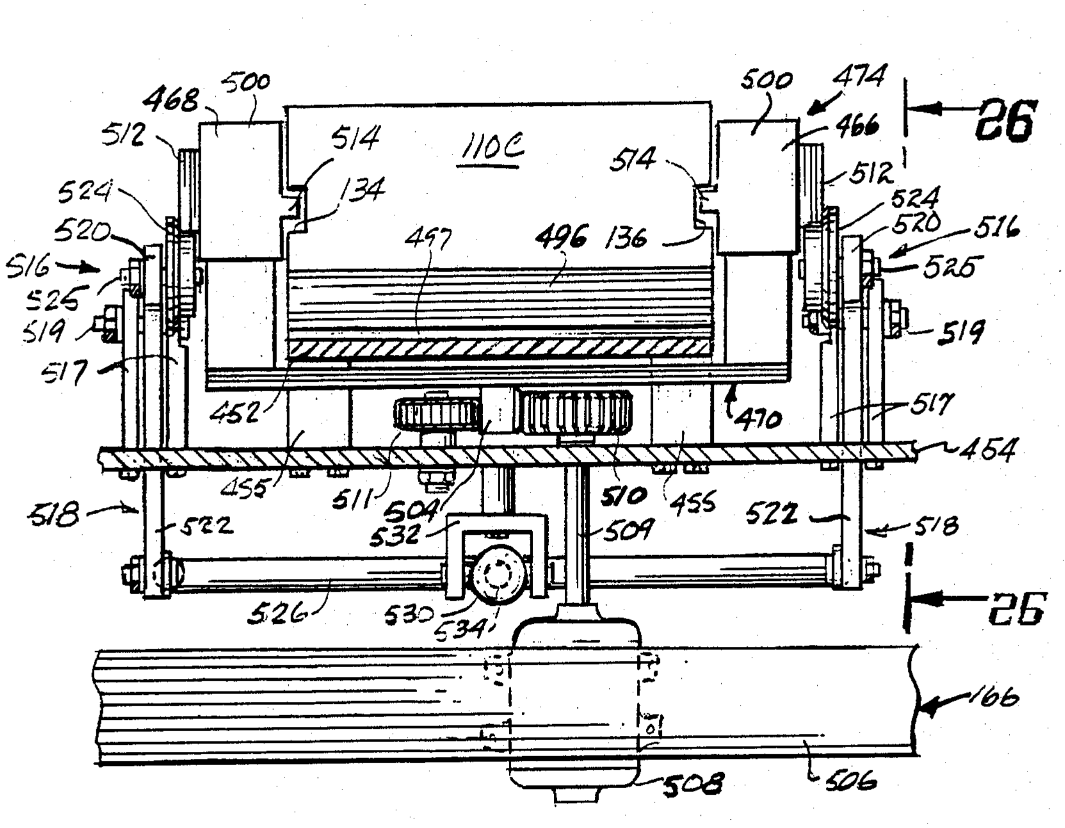
FIG. 25 is a fragmentary sectional view taken on a vertical plane in the system of the present invention to show an end view of the mold set transport sub-system means which is used to move the molds in stations B through G.
Figure 26:
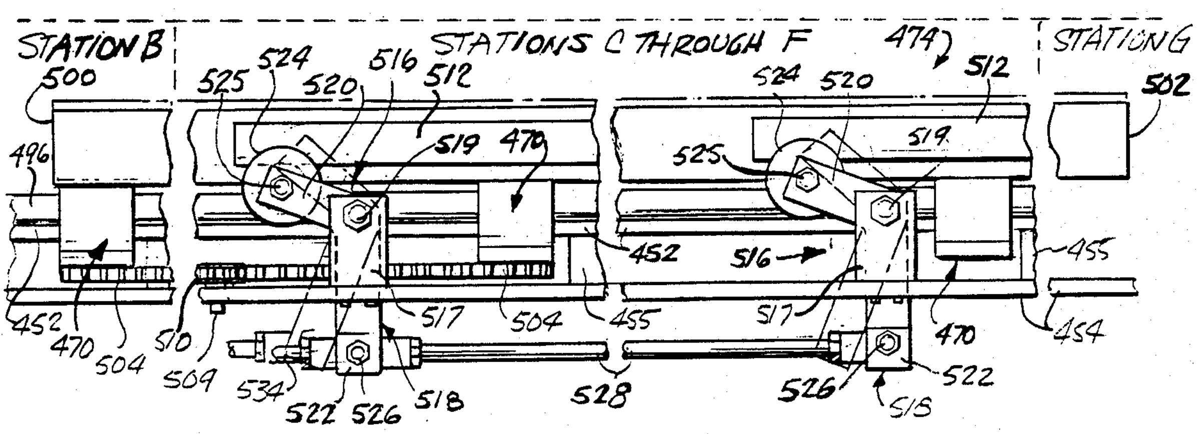
FIG. 26 is a fragmentary side elevational view on a reduced scale of the mold set transport sub-system means as viewed from the line 26—26 of FIG. 25.

FIGS. 25 and 26 show the mold set transport sub-system means 474 which moves the molds 110 and 112 sequentially through the various stations of the system 100 for product encapsulation purposes. As shown in FIG. 26, the walking beams 466 and 468 (one shown in FIG. 26) are elongated structures each having a front end 500 and a back end 502 and are interconnected by a plurality of the hereinbefore described yoke means 470 which are provided at spaced intervals along the length of the walking beams. An elongated rack gear 504 has its opposite ends attached to a spaced pair of the yoke means 470 so as to extend therebetween. A cross brace 506, which is part of the system frame 166, has a reversibly drivable motor 508 mounted thereon so that its drive shaft 509 extends upwardly through the cross plate 454. A suitable pinion gear 510 is mounted on the upper end of the motor drive shaft 509 for rotation therewith, and the pinion gear 510 is in meshed engagement with the rack gear 504. A roller wheel 511 is rotatably journaled on the upper surface of the cross plate 454 in alignment with the pinion gear 510 and in engagement with the opposite side of the rack gear 504 to hold the elongated rack gear in meshing engagement with the pinion gear.

When the motor 508 is driven, the walking beams 466 and 468 will reciprocally move in unison in a horizontal movement path in directions determined by the rotational driving of the motor. More specifically, when the walking beams 466 and 468 are moved to the left in FIG. 26, the front ends 500 thereof will move from station C into station B, and the back ends 502 of the walking beams will move out of station G into station F. When moved in the reverse direction, i.e., to the right in FIG. 26, the front ends 500 of the walking beams 266 and 268 will move out of station B back into station C and the back ends 502 thereof will move back into station G.

Each of the walking beams 466 and 468 are provided with a longitudinally extending and spaced apart pair of rail members 512 on their outwardly and oppositely facing vertical surfaces, and with ledges 514 on their inwardly facing vertical surfaces, with the ledges 514 extending the full length of their respective ones of the walking beams. Each of the walking beams 466 and 468 are supported on a plurality of identical roller elevating mechanisms 516 which total four in number, two for each walking beam. Each of the roller elevating mechanisms 516 include a pair of support plates 517 which are mounted on the cross plate 454 so as to extend upwardly therefrom in spaced apart relationships. A bell crank 518 is mounted between each pair of support plates 517 on suitable pivot pins 519 so that one arm 520 of each bell crank extends angularly upwardly toward the walking beams and the other arm 522 extends angularly downwardly through a suitable opening provided in the cross plate 454. Each of the bell cranks 518 has a roller wheel 524 journaled for rotation about a stub shaft 525 which is carried on the extending end of the one arm 520 thereof, and the roller wheels 524 are disposed so that they are in rolling engagement with the bottom surfaces of the rail members 512 of the walking beams 466 and 468. The depending ends of the other arms 522 of each pair of the bell cranks 518 are interconnected by rods 526, and the rods 526 are in turn interconnected by a drag link 528. A suitable ram 530 is suspendingly mounted to the downwardly facing surface of the cross plate 454 by means of a clevis member 532. The reciprocally extensible plunger 534 of the ram 530 is connected to one of the rods 526. Thus, when the ram 530 is actuated to move the plunger 534 to its extended position, the bell cranks 518 will be pivotably moved to the soled line position shown in FIG. 26, and when the ram 530 is operated to retract its plunger 534, the bell cranks 518 will be simultaneously moved to the dash line positions shown in the same figure.

When the bell cranks 518 are pivotably moved as described above, the roller wheels 524 thereof will move between an elevated position and a lowered position and this action raises and lowers the walking beams 466 and 468.

It will be understood that the bottom mold 110C and the heating plate means 496 shown in FIG. 25, are typical of all of the bottom molds and heating plate means provided in stations B–G which are serviced by the mold set transport sub-system means 474. Therefore, the following description of the relationships and operations performed by the mold set transport sub-system on the bottom mold 110C will be understood to also apply to the relationships and occurrences which occur simultaneously in the other stations D–G.

As shown in FIG. 25, the ledges 514 of the walking beams 466 and 468 extend into the longitudinal grooves 134 and 136 provided on the opposite sides of the bottom mold 110C. When the ram 530 is operated so that the roller wheels 524 are in the lowered position, the walking beams will also be in the lower position in which the bottom mold 110C is resting atop the heater plate means 496 as shown. When the ram 530 is actuated to raise the roller wheels 524 to move the walking beams 466 and 468 vertically, the bottom mold 110C will be lifted off of the heater plate means 496 by the ledges 514 so that the bottom mold 110C is suspended between the walking beams. When in this elevated position, the motor 508 is operated to move the walking beams 466 and 468 to the right as viewed in FIG. 26. This action will move the bottom mold 110C to station D and similarly and simultaneously move the molds in stations D through F into the next stations. When the molds have been so moved, the ram 530 is operated to lower the walking beams 466 and 468 and thus set the molds down in those stations in which they have been moved.

Station D is the molding station in which a multiplicity of operations are accomplished to achieve the workpiece encapsulation. Since a multiplicity of operations are accomplished in station D, all the mechanisms needed to accomplish those various operations are not shown in any single view of the drawings for clarity reasons, but are instead illustrated at the appropriate spots in FIGS. 27 through 36.

The bottom mold 110C and top mold 112C which were assembled in station C as described above, are moved in unison into station D where they are set down on the heating plate means 540 provided in station D, with those molds now being indicated by the reference numerals 110D and 112D, respectively.

It will be noted that the walking beams 466 and 468 of the mold set transport means 474 which accomplish the moving of the molds 110D and 112D are omitted from FIGS. 27 through 33 for clarity reasons.

Figure 28:
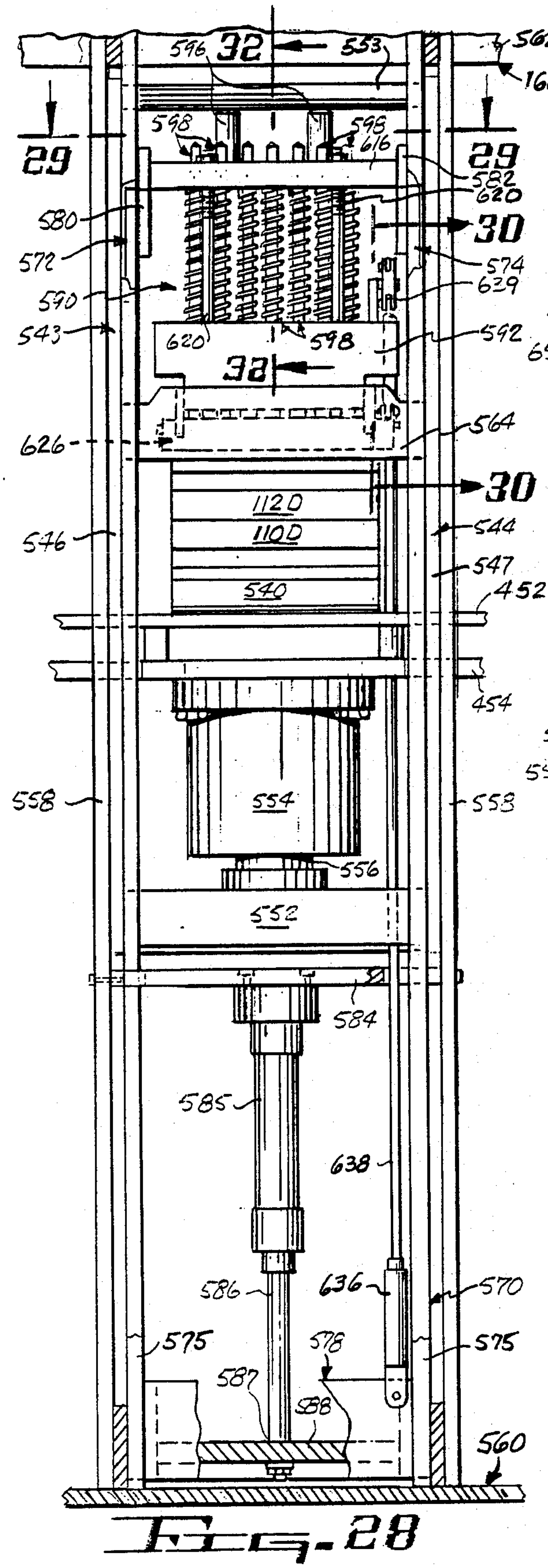
FIG. 28 is a side elevational view of the various mechanisms shown in FIG. 27.
Figure 27:
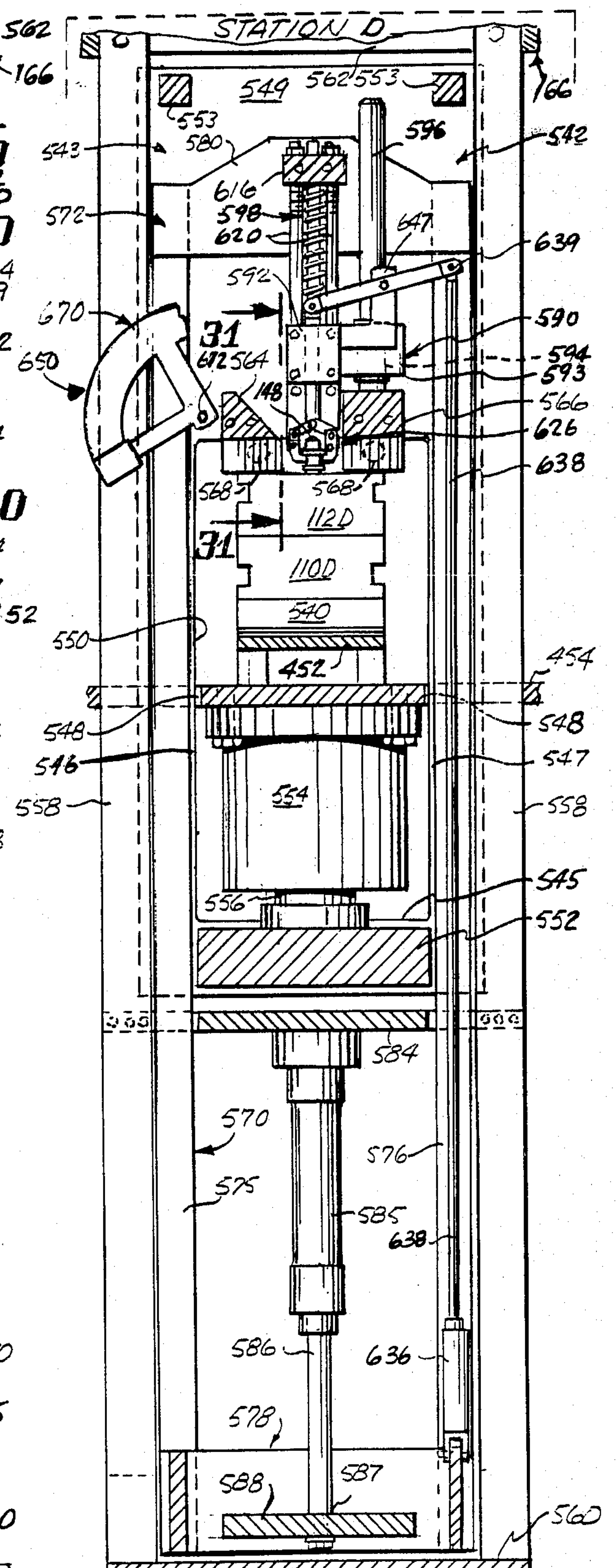
FIG. 27 is a sectional view taken in a vertical plane through the system to show the various features of station D.
Figure 29:
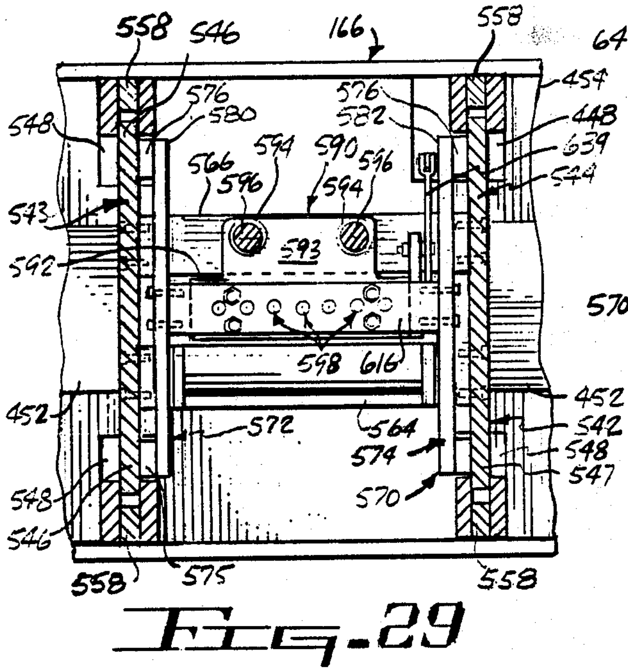
FIG. 29 is a fragmentary sectional view taken along the line 29—29 of FIG. 28.

The first operations to be accomplished in station D is that of applying a vertically exerted force on the top and bottom molds 110D and 112D to hold them in place during the molding operations. To accomplish this, a first vertically movable elevator structure 542 is provided in station D. The first elevator 542, as seen in FIGS. 27, 28 and 29, includes a spaced apart pair of identical end plates 543 and 544 each having a bottom cross member 545 which is located in the relatively cool zone below the cross plate 454 of the system frame 166. Each of the plates 543 and 544 have side rail portions 546 and 547 which extend upwardly from the bottom cross member 545 through suitable openings 548 provided in the cross plate 454, and the upper ends of the side rail portions 546 and 547 are interconnected by a top cross member 549. The spaced pair of end plates 543 and 544 each define a central opening 550 (one shown in FIG. 27) and are interconnected at their bottom ends by a central bar 552 and by spaced bars 553 at their top ends.

A suitable ram 554 is fixedly attached to the downwardly facing surface of the cross plate 454 so as to depend therefrom, and the ram 554 is provided with the usual reciprocally extensible plunger 556 which is connected centrally to the centrally located bar 552 which interconnects the lower ends of the end plates 543 and 544 of the first elevator 542. Thus, by operation of the ram 554, the first elevator 542 is vertically reciprocally movable. As seen best in FIG. 29, the outwardly facing edges of the side rails 546 and 547 are contained and slidably movable in inwardly opening channel members 558 which extend vertically between a base plate 560 and top supporting frame 562, both of which are part of the system frame 166.

The end plates 543 and 544 of the first elevator 542 have a horizontally spaced pair of force exerting blocks 564 and 566 extending therebetween, and disposed immediately above the top mold 112D. When the first elevator 542 is in its downwardly moved position, as shown, the force exerting blocks 564 and 566 will press down on the top mold 112D to exert, and hold, the required force on the assembled molds 112D and 110D. As indicated at 568 in FIG. 27, each of the force exerting blocks 564 and 566 have a heating element means therein which maintains the proper temperature of the top mold 112D during the molding operations which are accomplished in station D.

The next operation to be accomplished in station D is that of pulling the aligned plurality of plungers 148 upwardly and out of the top mold 112D to provide access to the bores 146 (FIG. 5) of the top mold so that the molding materials can be deposited therein as will hereinafter be described in detail. The mechanisms which are employed to pull the plungers 148 are also used to reinsert them and exert a downwardly applied force thereon as will become apparent as this description progresses.

The mechanism used for pulling, reinserting and applying the force on the plungers 148 includes a second elevator structure 570 having an identical pair of spaced apart end plates 572 and 574 each of which, as seen best in FIG. 27, is provided with a spaced pair of rail members 575 and 576. The lower ends of the rail members 575 and 576 of the end plates 572 and 574 are all interconnected by an interconnecting structure 578 which is located in the relatively cool zone below the cross plate 454. The rail members 575 and 576 extend upwardly through the openings 548 provided in the cross plate 454 with the upper ends of the rail members 575 and 576 of the end plate 572 being interconnected by a top cross member 580 and the upper ends of the rail members 575 and 576 of the other end plate 574 being similarly interconnected by an identical cross member 582.

A support plate 584 is suitably mounted on the channel members 558 below the cross plate 454. A ram 585 is fixedly attached to the downwardly facing surface of the support plate 584 so as to depend therefrom. The reciprocally extensible plunger 586 of the ram 585 has its depending end attached as at 587 to a cross bar 588 of the bottom interconnecting structure 578 of the second elevator 570. Therefore, actuation of the ram 585 will reciprocally move the second elevator 570 vertically between the lower position shown in FIGS. 27 and 28 and an elevated position (not shown).

As shown best in FIG. 29, the end plates 572 and 574 of the second elevator 570 are in sliding engagement with the inwardly facing surfaces of the end plates 543 and 544, respectively, of the first elevator structure 542. The end plates 572 and 574 of the second elevator 570 are disposed between the channel members 558. Thus, the second elevator structure 570 is supported and its movements are guided by the end plates 543 and 544 of the first elevator 542 and the channel members 558.

A head assembly 590 is mounted in a manner which will hereinafter be described, so as to be disposed between the top cross members 580 and 582 of the end plates 572 and 574, respectively, of the second elevator structure 570, so that the head assembly 590 is vertically reciprocally moved therewith.

The head assembly 590 includes a housing 592 which has an integral laterally extending portion 593 through which a spaced pair of vertical bores 594 are formed. The bores 594 have suitable bushings therein and a spaced pair of guide rods 596 are slidably movable in the bores 594. The guide rods 596 are fixedly carried on the force exerting/heater block 566 of the previously described first elevator structure 542, and extend upwardly from the block 566. The guide rods 596 interact with the bores 594 of extending portion 593 of the housing 592 to guide the relative movements of the head assembly 590 and the force exerting/heater blocks 564 and 566, as they move independently of each other in the manner hereinbefore described.

A plurality of identical push rod assemblies 598 are mounted in the housing 592 with their being one push rod assembly 598 for each plunger 148 of the top mold 112D. A typical one of the push rod assemblies 598 is shown best in FIG. 32, with it being understood that the following description of the illustrated push rod assembly applies to each of those plural assemblies.

A bore 600 is formed vertically through the housing 592 and has an increased diameter counterbore 601 at its upper end. A special sleeve 602 is axially slidably carried in the bore 600 with the sleeve having an enlarged head 603 formed on its upper end. The sleeve is provided with an axial bore which is divided by means of an annular shelf 604 into an upper bore portion 605 and a lower bore portion 606, and a reduced diameter opening 607 is formed axially through the shelf 604. A push pin 608 is axially slidably mounted in the opening 607 of the shelf and is provided with an enlarged head 609 on one end of its shank 610. A spring 611 is mounted in the upper bore 605 with one end of the spring engaging the head 609 of the push pin 608 with the other end of the spring being in engagement with an adjustment screw 612 which is threadingly carried in the upper end of the upper bore 605 of the sleeve 602. Therefore, the spring 611 biases the push rod 608 downwardly, and may be adjusted to increase or decrease the bias as needed for reasons which will become apparent as this description progresses.

In addition to the biasing applied to the push pin 608, the sleeve 602 is also biased downwardly in the bore 600 formed in the housing 592. A rod 614 is disposed so that its lower end is in engagement with the enlarged head 603 of the sleeve 602. The rod 614 extends upwardly and passes freely through an aperture 615 formed through a retainer plate 616. The retainer plate 616 is disposed in upwardly spaced relationship with respect to the housing 592 and is carried in that position on a plurality of studs 620. The studs 620 are threadingly mounted on their lower ends 621 in the housing 592, and extend upwardly therefrom and pass freely through, the suitable apertures formed in the retainer plate 616. The upper ends of the studs are threaded as at 622 and suitable nuts 623 are carried thereon to adjustably position the retainer plate 616 in the upwardly spaced position relative to the housing 592. A compression spring 624 is coaxially disposed about the rod 614 with its upper end being in bearing engagement with the downwardly facing surface of the retainer plate 616 and its lower end in bearing engagement with the enlarged head 603 of the sleeve 602. The opposite ends of the retainer plate 616 are attached to the top cross members 580 and 582 of the second elevator structure 570 and in this manner, the head assembly 590 is movable with the elevator.

In addition to the push rod assemblies 598, the housing 592 of the head assembly 590 is provided with clamping means 626 for movement into and out of gripping engagement with the plungers 148 of the top mold 112D. As seen best in FIG. 31, a pair of identical plates 628 are attached to opposite ends of a reduced length depending portion 627 of the housing 592. A pair of elongated axle rods 629 have their opposite ends fixedly carried in the depending ends of the plates 628 with the rods 629 being laterally disposed on opposite sides of the lower ends of the sleeves 602 which extend downwardly from the housing 592. A pair of elongated L-shaped in cross section jaws 630 and 632 are rotatably carried on different ones of the axle rods 629 and are disposed on the rods so that the plunger gripping ledges 633 provided on the lower ends of each of the jaws extend inwardly toward each other.

Figure 30:
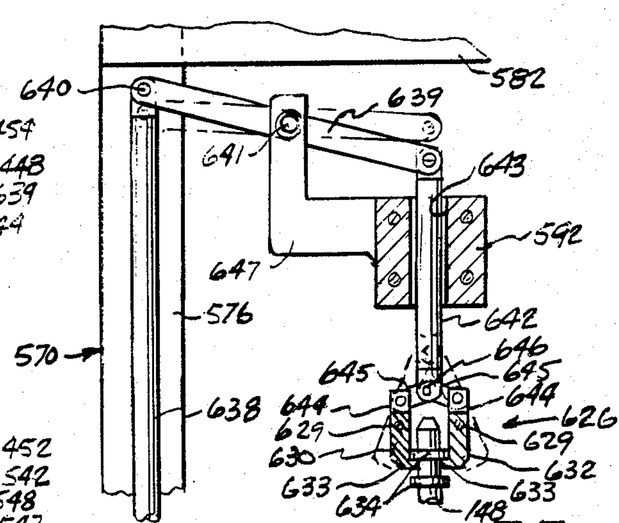
FIG. 30 is an enlarged fragmentary sectional view taken along the line 30—30 of FIG. 28.
Figure 31:
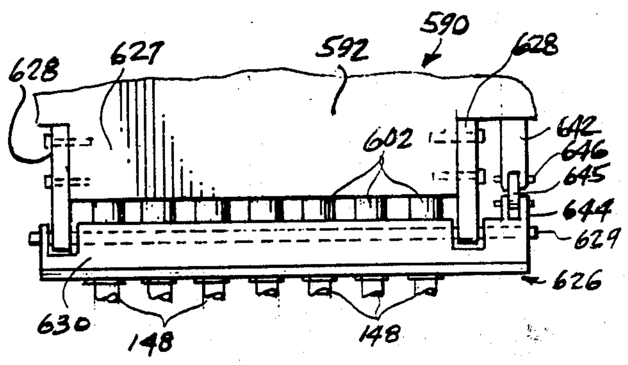
FIG. 31 is a fragmentary sectional view taken along the line 31—31 of FIG. 27.
Figure 32:
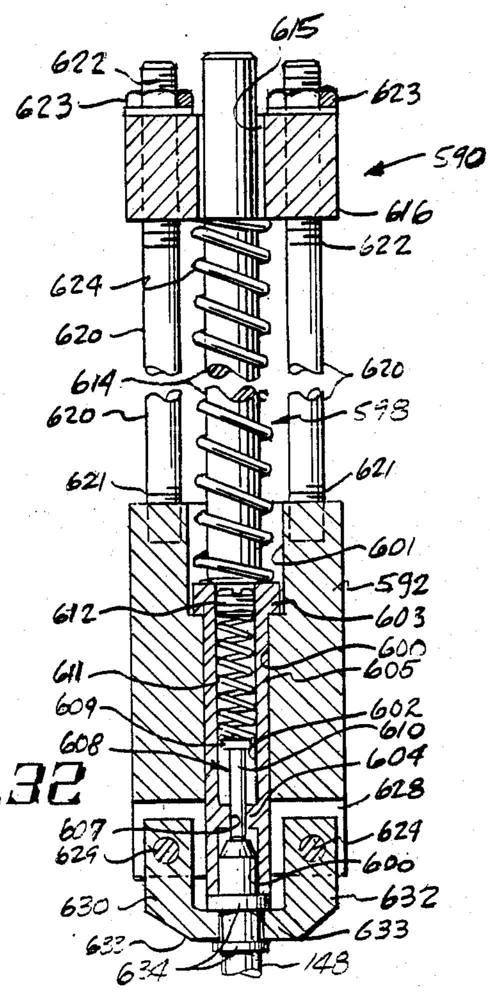
FIG. 32 is an enlarged fragmentary sectional view taken along the line 32—32 of FIG. 28.

As seen best in FIGS. 30 and 32, the plungers 148 have a spaced apart pair of annular flanges 634 adjacent their upper ends and the jaws 630 and 632 are movable into and out of the space between the flanges for selective gripping of the plungers.

Movement of the jaws 630 and 632 of the clamping means 626 is accomplished by means of a ram 636 which, as shown in FIGS. 27 and 28, is mounted on the interconnecting structure 578 of the second elevator structure 570. An elongated rod 638 extends upwardly from the ram 636 and has its upper end connected to one end of a lever 639 by means of a pivot pin 640. The lever 639 is pivotably mounted intermediate its opposite ends by a suitable bolt 641 which fixedly attaches the lever at that point to a bracket 647 which is suitably attached to the housing 592 of the head assembly 590. A rod 642 is pivotably attached to the other end of the lever 639 and depends therefrom through a vertical passage 643 formed through the housing 592 of the head assembly 590. Each of the jaws 630 and 632 has a clevis 644 formed on one end thereof and the lower ends of a pair of links 645 are pivotably mounted in different ones of the clevises. The upper ends of the links 645 are connected by means of a pivot pin 646 to the lower end of the rod 642.

When the ram 636 is operated to extend the elongated rod 638, the lever 639, rod 642 and the links 645 are positioned to clampingly engage the plungers 148 as shown in solid lines in FIG. 30. And, when the ram 636 is operated to retract the rod 638, the lever 639 pulls the rod 642 upwardly which pivotably moves the jaws 630 and 632 about their respective axle rods 629 by causing the lower ends of the links 645 to move toward each other as shown in dashed lines in FIG. 30.

The second operation accomplished in station D, i.e., pulling the plungers 148 from the top mold 112D, is accomplished by moving the second elevator structure 570 downwardly which moves the head assembly 590 downwardly in between the spaced apart force exerting blocks 564 and 566 which were previously moved onto the top mold 112D in the hereinbefore described first operation of station D. When the head assembly is lowered, the upper ends of each of the plungers 148 will enter into the lower bore portion 606 of the sleeves 602 of their respectively aligned push rod assemblies 598. Then, the clamping means 626 is operated to move the jaws 630 and 632 into gripping engagement with the plungers 148 and then the second elevator structure 570 is raised to move the head assembly 590 and the plungers 148 to an elevated position above the top mold 112D.

Figure 33:
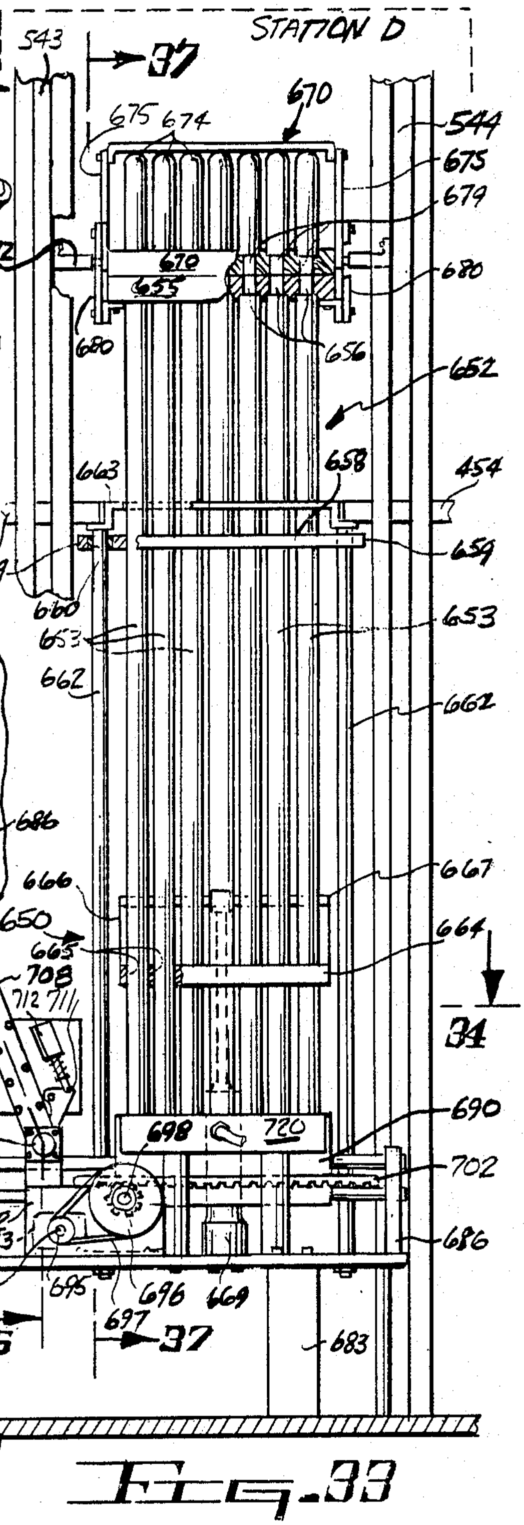
FIG. 33 is a side elevational view of the molding material input sub-system which was indicated as being in station D in FIG. 27, but was for the most part not shown in that figure or in FIG. 28 for clarity reasons.

The next operation accomplished in station D is that of depositing molding materials in the molds 110D and 112D, and that operation is accomplished by the materials handling means 650 shown in FIGS. 27, 33, 34, 35, 36 and 37. FIG. 27 indicates the physical location of the handling means 650 relative to the hereinbefore described elevator structures 542 and 570 and their associated mechanisms, and FIG. 33 shows the handling means 650 with the elevators 542 and 570 and their associated mechanisms not being shown in FIG. 33 for clarity.

Figure 37:
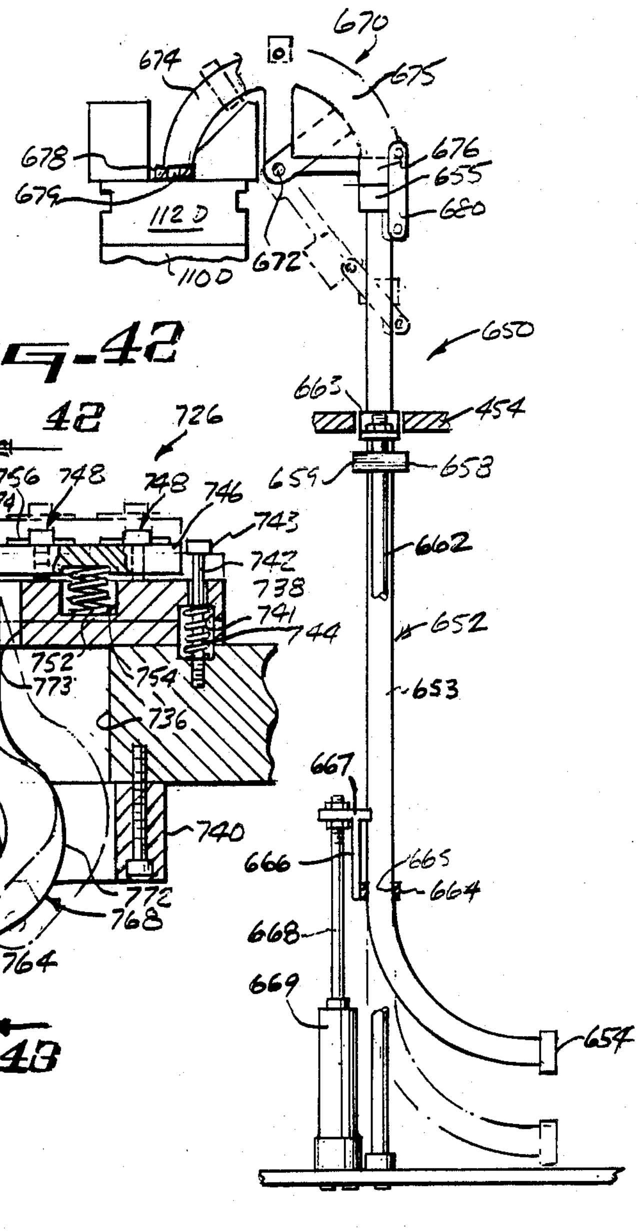
FIG. 37 is a fragmentary sectional view taken along the line 37—37 of FIG. 33.

As shown in FIGS. 33 and 37, the molding materials handling means 650 includes a conduit, assembly 652 which includes a plurality of conduits 653, one for each of the material receiving cavities 116 (FIG. 5) defined by the assembled bottom and top molds 110D and 112D, respectively. The plurality of conduits 653 are fixedly interconnected at their aligned lower ends by an input manifold 654 and are similarly interconnected on their upper ends by an output manifold 655. The manifolds 654 and 655 are in the form of elongated plates which have a plurality of openings 656 formed therethrough in spaced increments along their lengths with the openings being disposed so as to align with the bores of the conduits 653. The conduits are also interconnected by a guide plate 658 which is suitably fixed, such as be welding, to the individual conduits. The guide plate 658 is provided with laterally and oppositely extending portions 659 through which bores 660 are formed with suitable bushings being disposed in the bores.

As will hereinafter be described, the conduit assembly 652 is vertically movable and the above described guite plate 658 is vertically movable with the conduits along the pair of guide rods 662 which pass through the bores 660 of the guide plate. The upper ends of the guide rods are attached to a bracket 663 which is, in turn, attached to the cross plate 454 of the system frame 166 so as to span a suitable opening provided in the cross plate 454. A lifting plate 664 is provided below the guide plate 658 and the lifting plate is provided with a plurality of openings 665, one for each conduit 653. As shown best in FIG. 37, the lifting plate 664 has a vertical plate 666 affixed to one end thereof and a transverse plate 667 is carried on the upper end of the vertical plate 666. One edge of the transverse plate 667 extends toward the conduits 653 with the other edge extending away therefrom. The upper end of a reciprocally extensible plunger 668 of a suitable ram 669 is attached to the other extending edge of the transverse plate. When the ram 669 is in the retracted position, the conduits 653 are freely movable through the openings 665 thereof. However, when the ram 669 is operated to extend the plunger 668 to the extended position shown in FIG. 37, the force exerted thereby will deflect the vertical plate 666 thus moving the one edge of the transverse plate 667 toward the conduits 653 so that the plate is in bearing engagement with the conduits. This same deflection of the vertical plate 666 will tilt the lifting plate 664 to move the openings 665 thereof into binding engagement with the conduits 653. Thus, when the ram 669 is in the retracted position, the conduits may be vertically moved relative to the lifting plate 664 and when the ram is operated, the lifting plate will bindingly engage the conduits 653 and cause them to move upwardly.

A delivery head 670 is pivotably mounted on suitable pivot pins 672 between the end plates 543 and 544 of the first elevator structure 542. The delivery head 670 includes a plurality of arcuate conduits 674, one for each of the conduits 653 of the conduit assembly 652, with each of the arcuate conduits 674 being disposed to align with a different one of the conduits 653. The arcuate conduits are carried between a spaced pair of end plates 675 to which the pivot pins 672 are connected, and an input manifold 676 and an output manifold 678 are fixed on opposite ends of the arcuate conduits 674. The input and output manifolds 676 and 678 of the delivery head 670 are, as is the case in the previously described manifolds 654 and 655 of the conduit assembly 652, in the form of elongated plates having plural openings 679 formed therethrough with the openings aligning with different ones of the arcuate conduits.

The input manifold 676 of the delivery head 670 is connected to the output manifold 655 of the conduit assembly 652 by a pair of links 680 which are pivotably connected on their opposite ends to the manifolds 676 and 655.

As hereinbefore mentioned, the delivery head 670 is carried on the first elevator structure 542 and is therefore vertically movable therewith. When the first elevator 542 is moved upwardly, the delivery head 670 will pivot about the pins 672 to the dash line position shown in FIG. 37 and when reaching this position, the delivery head 670 will lift the conduit assembly 652 with it due to the interconnecting links 680. When the elevator structure is subsequently lowered, the delivery head 670 and the conduit assembly 652 will move downward with the elevator to the dash line positions thereof as shown in FIG. 37. All of this takes place prior to the pulling of the plungers 148 from the top mold 112D. When the plungers are pulled in the manner hereinbefore described, the ram 669 is actuated to extend the plunger 668 thereof which lifts the conduit assembly 652 to the solid line position of FIG. 37, and, by virtue of the links 680, the delivery head 670 is pivotably moved to the solid line position wherein each of the openings 679 of the outlet manifold 678 are aligned with and disposed immediately above a different one of the bores 146 of the top mold 112D (FIG. 5). When so positioned, the conduit assembly 652 and the delivery head 670 are in position to delivery the molding materials to the molds.

A platform 682 is mounted in upwardly spaced relationship above the base plate 560 of the system frame 166 on suitable posts 683, and a means 684 for supplying and moving the molding materials through the conduit assembly 652 and the delivery head 670, is mounted on the platform. A pair of upstanding end plates 685 and 686 are mounted at opposite ends of the platform 682 and a spaced pair of rails 688 extend horizontally between the end plates. A carriage 690 is reciprocally movable along the rails 688 between a materials receiving position at the left in FIGS. 33 and 34, to a materials delivery position at the right in those same figures. A vertically upstanding plate 692 is provided on the platform 682 and a reversibly drivable motor 693 is mounted on the plate. The output shaft 694 of the motor has a drive pulley 695 mounted thereon which drives a driven pulley 696 by means of a suitable belt 697. The driven pulley is carried on one end of a stub shaft 698 which is journaled for rotation in suitable bearings carried on the vertical plate 692, and a pinion gear 700 is mounted on the other end of the stub shaft 698. The pinion gear 700 is in meshing engagement with a rack gear 702 which is mounted on the carriage 690. As seen best in FIG. 34, the carriage 690 is an elongated plate-like structure having a plurality of transverse passages 704 formed therethrough at predetermined spaced intervals along its length.

Figure 36:
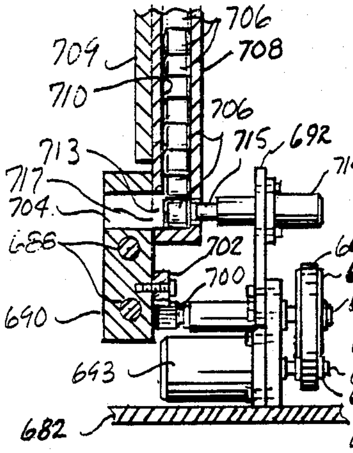
FIG. 36 is a fragmentary sectional view taken along the line 36—36 of FIG. 33.
Figure 35:
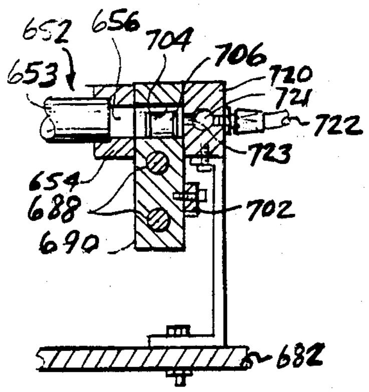
FIG. 35 is a fragmentary sectional view taken along the line 35—35 of FIG. 34.

The molding materials, such as epoxy, are preferably in pellet form such as is indicated at 706 in FIGS. 35 and 36. The pellets 706 are supplied to a magazine 708 from any suitable supplying mechanism (not shown) which may be an external device or a device which is an integral part of the system 100 as desired. The magazine 708 is mounted on a suitable mounting plate 709 which is attached to the platform 682 and the magazine extends angularly upwardly from the plate 709. The magazine has an internal passage 710 in which the pellets 706 are stackingly arranged and slidably movable. A latch 711 which is operated by a solenoid 712 is mounted on the plate 709 adjacent the lower end of the magazine 708 and each time the solenoid is operated, the latch is moved to allow one pellet to move downwardly from the passage into a discharge compartment 713 at the lower end of the magazine. A ram 714 is mounted on the vertical plate 692 with its reciprocally extensible plunger 715 being disposed so that each time the ram is operated, the plunger 715 will move transversely into the discharge compartment 713 of the magazine to push one of the pellets 706 out of the compartment through an outlet opening 717 formed on the magazine for that purpose.

In this manner, the plural passages 704 of the carriage 690 are each supplied with one of the pellets 706 when the carriage is located at the materials receiving position thereof and is moved in steps so that each passage 704 of the carriage is moved sequentially into alignment with the discharge compartment 713 of the magazine 708.

Figure 36A:
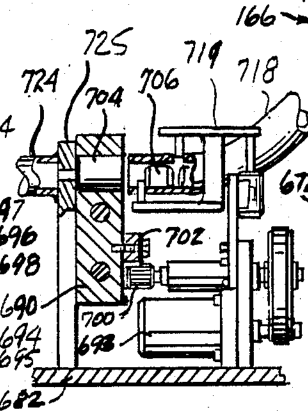
FIG. 36*a* is a fragmentary sectional view similar to FIG. 36 but showing a modification of the molding material input sub-system.
Figure 34:
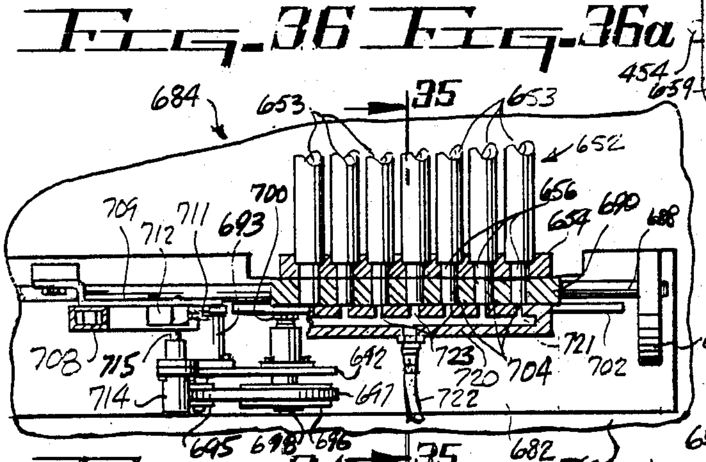
FIG. 34 is a fragmentary sectional view taken along the line 34—34 of FIG. 33.

FIG. 36*a* shows an alternate mechanism which may be used in place of the above described pellet magazine 708, the ram 714, and the solenoid operated latch 711 to supply the pellets 706 to the plural passages 704 of the carriage 690. In this embodiment, the pellets 706 are stackingly arranged in a tube 718 and are free to slidingly move down that magazine tube. A solenoid operated double pin mechanism 719 is associated with the outlet end of the magazine tube 718 so that when actuated in one direction (down in FIG. 36*a*) one of the pins will be retracted from the bore of the tube to free the first pellet 706 so that it can be moved out of the tube into one of the passages 704 of the carriage in a manner to hereinafter be described. The same downward actuation of the solenoid operated double pin mechanism 719 will cause a second and oppositely facing pin of that mechanism to move into the bore of the tube 718 immediately behind the released first pellet 706 and thus prevent the movement of the second pellet and the ones stackingly arranged behind the second pellet. The first pellet 706, when released, will be drawn into the aligned passage 704 of the carriage 690 by means of a vacuum tube 724 which is mounted on an orifice plate 725 which is mounted on the platform 682 and is disposed on the opposite side of the carriage so that the vacuum tube 724 and the orifice are in alignment with the passage 704 into which the pellet is to be moved. The source of negative static pressure, or partial vacuum, may be any suitable mechanism (not shown) which may be located either within or remote from the system 100.

When the carriage 690 has a pellet 706 in each of its passages 704, it is moved along the rails 688 to its materials delivery position in the manner hereinbefore described. When in the delivery position, as shown best in FIG. 34, the carriage 690 is interposed between the input manifold 654 of the conduit assembly 652 and a charging manifold 720. The charging manifold 720 has an internal chamber 721 which is supplied with high pressure air from a suitable source (not shown) by means of a hose 722. A plurality of high pressure outlets 723 are provided along the length of the charging manifold 720. When the carriage 690 is in the delivery position, the high pressure outlets 723 of the charging manifold, will each align with a different one of the transverse passages 704 of the carriage 690, and the passages 704 each align with a different one of the openings 656 of the input manifold 654 of the conduit assembly 652. Therefore, when high pressure air is supplied to the charging manifold 720, the pellets 706 in the carriage will be propelled into the conduit assembly 652 and will move therethrough and through the delivery head 670 and will be deposited into the materials receiving cavities 116 (FIG. 5) of the molds 110D and 112D.

When the assembled molds 110D and 112D have been charged with the molding material pellets 706 in the manner described above, the ram 669 is operated to lower the conduit assembly 652 and pivotably move the delivery head 670 to the dash line position shown in FIG. 37. The second elevator structure 570 is then lowered to reinsert the plungers 148 into the top mold 112D. Upon reinsertion, the clamping means 626 is operated to move the jaws 630 and 632 out of gripping engagement with the plungers 148. When this has been accomplished, an adjustably predetermined amount of force is applied on the plungers 148 by means of the sleeves 602 and the compression springs 624 of the push rod assemblies 598 as hereinbefore described with particular reference to FIG. 32.

As is well known in the molding arts, the combination of pressure and temperature will cause liquification of the molding material pellets 706 and the liquified materials will flow from the cavities 116 (FIG. 5) through the runners 117 (FIG. 4) into the recesses 118 of the bottom mold 110D and the recesses 144 of the top mold 112D to encapsulate the circuit chip 105 of the leadframe 102 (FIG. 2) or appropiately encapsulate whatever other type of workpiece is being processed in the system 100.

After completion of the above described flow of the liquified molding materials, the second elevator structure 570 is again operated to move it upwardly. When this upward movement occurs, the plungers 148 will be left in place within the top mold 112D by virtue of the spring loaded push pins 608 (FIG. 32) and the lower bore portion 606 of the sleeve 602 will move upwardly out of engagement with the plungers 148.

The plural operations of station D have now been described in detail and the mold set including the assembled molds 110D and 112D are ready to be moved to station E with the exception that the clamping forces that are being applied to the assembled molds by the force exerting/heater blocks 564 and 566 of the first elevator structure 542 are still being applied to the mold set. The clamping force which is applied to the assembled molds must be maintained for a predetermined length of time which is determined by the time required to cool, i.e., solidify, the encapsulating materials. Rather than leaving the molds in station D for cooling, the function of applying the clamping forces on the mold set is taken over by a transport clamping means 726 which is shown in FIGS. 38, 39, 41, 42 and 43.

The advantages of moving the assembled molds from station D to station E for curing, is that such moving will not disrupt the mold movements and other operations which are continuously occurring in timed intervals in the various stations of the system 100. If the molds were allowed to remain in station D, all functions of the entire system 100 would have to wait until the mold cooling operation was completed and until the equipment in station D were brought back up to proper molding temperatures.

Figure 39:
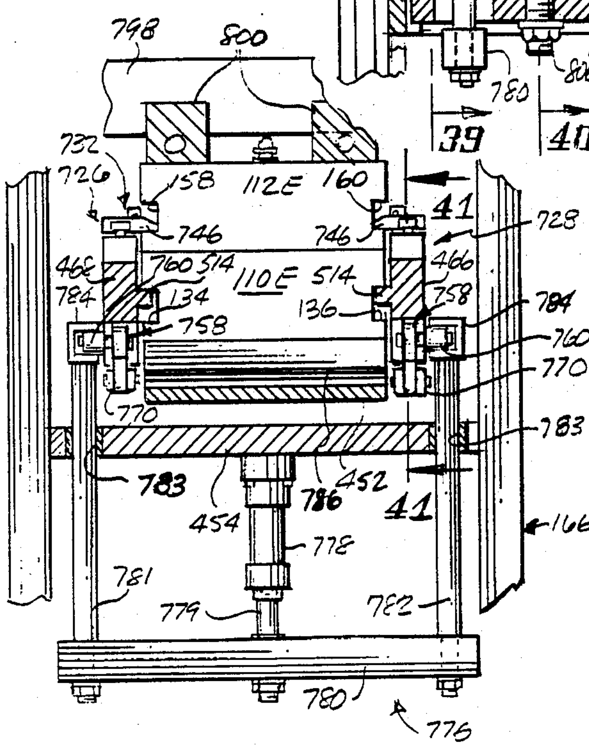
FIG. 39 is a fragmentary sectional view taken along the line 39—39 of FIG. 38.
Figure 40:
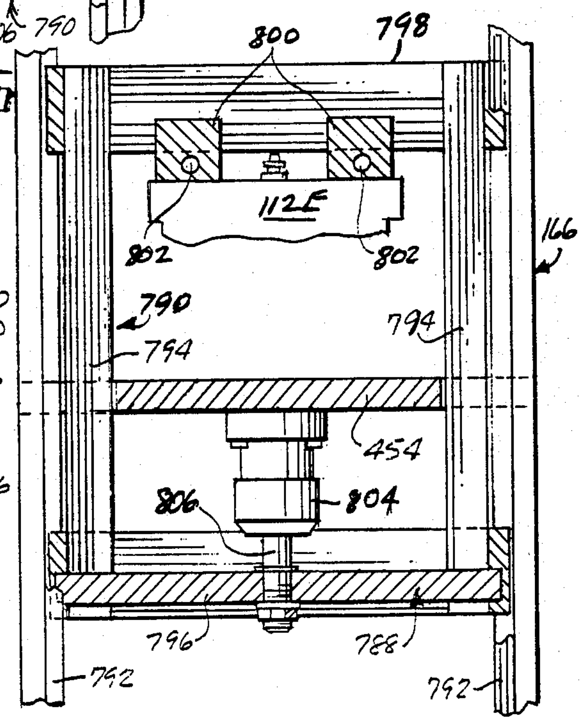
FIG. 40 is a fragmentary sectional view taken along the line 40—40 of FIG. 38.

As hereinbefore described in detail, the mold set transport sub-system means 474 (FIG. 26) includes the pair of walking beams 466 and 468 which are reciprocally operable in a back-and-forth motion between stations B through G. The portions of the walking beams 466 and 468 which pass through and are reciprocally movable in stations D, E and F, are shown in FIGS. 39 and 40 to have the transport clamping means 726 associated therewith.

The walking beam 466 is provided with a first clamping head 728 and a spaced second clamping head 730, and the other walking beam 468 is similarly provided with a first clamping head 732 and a spaced second clamping head 734. The clamping heads 728, 730, 732 and 734 are identical, thus, the following detailed description of the clamping head 730 will be understood to also apply to the other clamping heads.

Figure 42:
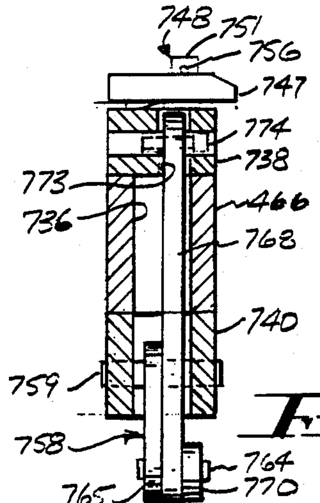
FIG. 42 is a fragmentary sectional view taken along the line 42—42 of FIG. 41.
Figure 41:
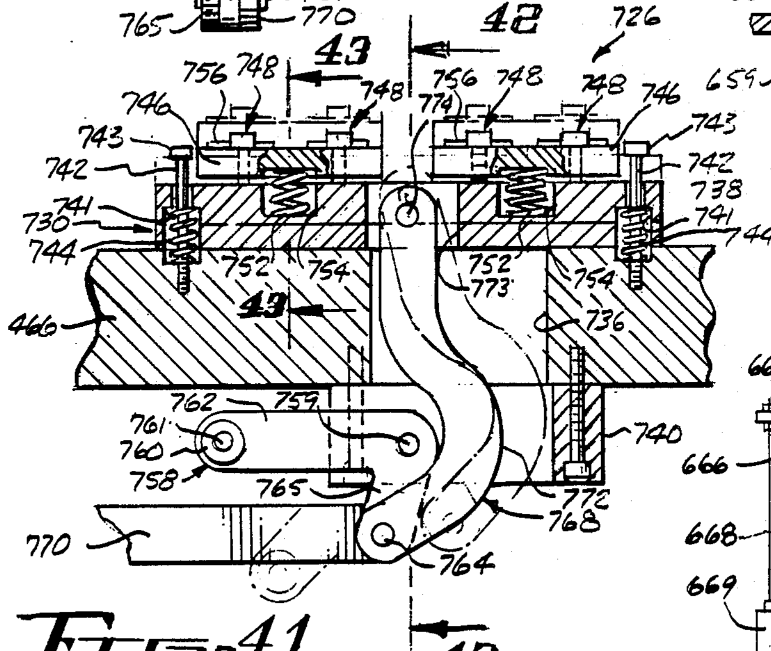
FIG. 41 is an enlarged fragmentary sectional view taken along the line 41—41 of FIG. 39.
Figure 43:
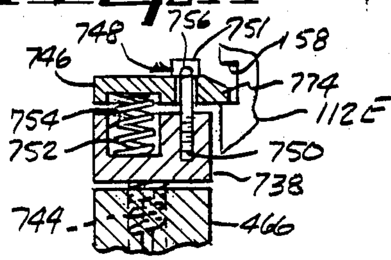
FIG. 43 is a fragmentary sectional view taken along the line 43—43 of FIG. 41.

As shown in FIGS. 41 and 42, the walking beam 466 is provided with a vertical opening 736 formed therethrough with a clamping head housing 738 mounted on the upper surface of the walking beam over the opening 736 and an extension housing 740 dependingly mounted on the bottom surface of the walking beam below the opening 736 thereof.

The clamping head housing 738 is vertically movable relative to the walking beam as will be described and is of elongated barshaped configuration having countersunk bores 741 formed vertically through its opposite ends. The housing 738 is attached to the walking beam 466 by means of relatively long bolts 742 having their bottom threaded ends attached to the walking beam with their shanks passing through the countersunk bores 741 to position their heads 743 in upwardly spaced relationship with respect to the housing. The heads 743 of the bolts 742 serve as stops to limit the vertical movement of the housing relative to the walking beam 466. The housing 738 is normally biased upwardly, to the dashed line position shown in FIG. 41, by means of the compression springs 744 which are located in the countersunk bores 741 so as to be interposed between the housing 738 and the walking beam 466 and thereby bias the housing upwardly.

A longitudinally spaced pair of clamping plates 746 each having an inwardly extending portion 747, are carried on the upper surface of the housing 738. Each of the plates 746 are attached to the housing 738 by a spaced pair of special bolts 748 which pass downwardly and freely through suitable apertures formed through the plates and are threadingly attached to the housing in the manner indicated at 750 in FIG. 43. Each of the bolts 748 has its head 751 spaced upwardly from the housing 738 a distance which is greater than the thickness dimension of the plates, and the plates 746 are biased upwardly into engagement with the heads 751 of the bolts 748 by compression springs 752 which are interposed between the housing 738 and the plates 746 and are contained in pockets 754 that are cooperatively formed in the housing and the plates. A cross-pin 756 is mounted transversely through the enlarged head 751 of each of the special bolts 748 so as to lie on the upper surfaces of the plates 746.

As hereinbefore described, the bottom molds are carried on the inwardly facing ledges 514 provided on the walking beams 466 and 468 by virtue of those ledges extending into the longitudinally extending grooves 134 and 136 provided in the opposite sides of the bottom molds. In addition to this relationship being shown in prior figures of the drawings, it is shown again in FIG. 39 wherein the top mold is identified as 112E and the bottom mold as 110E to indicate their positions in station E.

When the clamping heads 728, 730, 732 and 734 are in their non-clamping positions, as will be described, the housings 738 of each head will be upwardly disposed due to the biasing springs 744, and the inwardly extending portions 747 of the clamping plates 746 will be loosely disposed in the longitudinally extending grooves 158 and 160 formed in the opposite sides of the top mold 112E. When the clamping heads are operated to move them downwardly into their clamping positions, the housings 738 will move downwardly to the solid line position shown in FIG. 41, and the clamping plates 746 will move down with the housing 738. The inwardly extending portions 747 of the clamping plates 746 will bear downwardly on the bottom surfaces of the grooves 158 and 160 in the manner best seen in FIG. 43. The clamping plates pivotably move about the cross-pins 756 of the special bolts against the upward bias applied to the opposite sides of the clamping plates 746 by virtue of the compression springs 752. Therefore, a predetermined amount of clamping force is applied to the assemblied molds.

Referring once again to FIG. 41 in particular, a bell crank 758 is mounted in the extension housing 740 on a pivot pin 759 which passes through the elbow of the bell crank. A roller 760 is journaled for rotation about a stub shaft 761 which is carried on the extending end of the effort arm 762 of the bell crank 758. Another pivot pin 764 is carried on the extending end of the load arm 765 of the bell crank 758 and the lower end of a clamping lever 768 is attached to the pivot pin 764. A drag link 770 has one of its ends connected to the pivot pin 764 on the load arm 765 of the bell crank 758 for reasons which will hereinafter be described. The clamping lever 768 is curved along its length as at 772 and extends upwardly through the extension housing 740 and passes through the opening 736 of the walking beam 466. The upper end of the clamping lever 768 is located in an opening 773 formed in the housing 738 and is carried on a pivot pin 774 which is mounted transversely in the housing so as to span the opening 773 as seen best in FIG. 42.

The above described bell crank 758 and clamping lever 768 are employed to move the clamping head 730 between its previously mentioned non-clamping and clamping positions. When the clamping head 730 is in the upwardly spaced non-clamping position, dash lines in FIG. 41, the bell crank and clamping lever 758 and 768, respectively, will be in the dash line positions thereof as shown in the same figure. When in the non-clamping position, the clamping lever 768 is moved up by the position of the bell crank 758 and the bias applied to the housing 738 by the compression springs 744. When the bell crank 758 is pivotably moved to the solid line position of FIG. 41, it will pull the clamping lever 768 down, and housing 738 will in turn be pulled down by the clamping lever. When this movement of the bell crank and clamping lever is accomplished, the pivot pin 764 will move past center, i.e., beyond an imaginary line passing through pins 759 and 774, and will therefore inherently remain latched in this clamping position in the absence of a positive force being applied on the bell crank 758 to move it to the dash line position thereof.

Referring once again to FIG. 38, it will be noted that the clamping heads 728 and 732 of the walking beams 466 and 468, respectively, are located in station E and the other clamping heads 730 and 734 are located in station F. This may be considered as the forward position of the mold set transport sub-system means 474 in its back-and-forth movements which move the molds from station B through station G. Therefore, when the mold set transport moves back, the clamping heads 728 and 732 will move into station D and the clamping heads 730 and 734 will move into station E. From this it will be seen that a pair of the clamping heads will be in station E at each end of the back-and-forth motion of the mold set transport sub-system means 474. Therefore, station E, as shown in FIGS. 38 and 39, is provided with means 776 for operating the clamping heads 728, 730, 732 and 734 between their clamping and non-clamping positions.

The clamping head operating means 776 includes a ram 778 which is fixedly attached to the downwardly facing surface of the cross plate 454 of the system frame 166. The reciprocally extensible plunger 779 of the downwardly extending ram 778 is suitably connected to a bar 780 intermediate the ends thereof. A pair of upstanding standards 781 and 782 are attached to the opposite ends of the bar 780 and extend upwardly through suitable holes 783 formed through the cross plate 454. Each of the standards 781 and 782 has a channel member 784 mounted fast on its uppermost end. The channel members 784 are of C-shape in cross section and are disposed so that they open inwardly toward each other.

Figure 38:
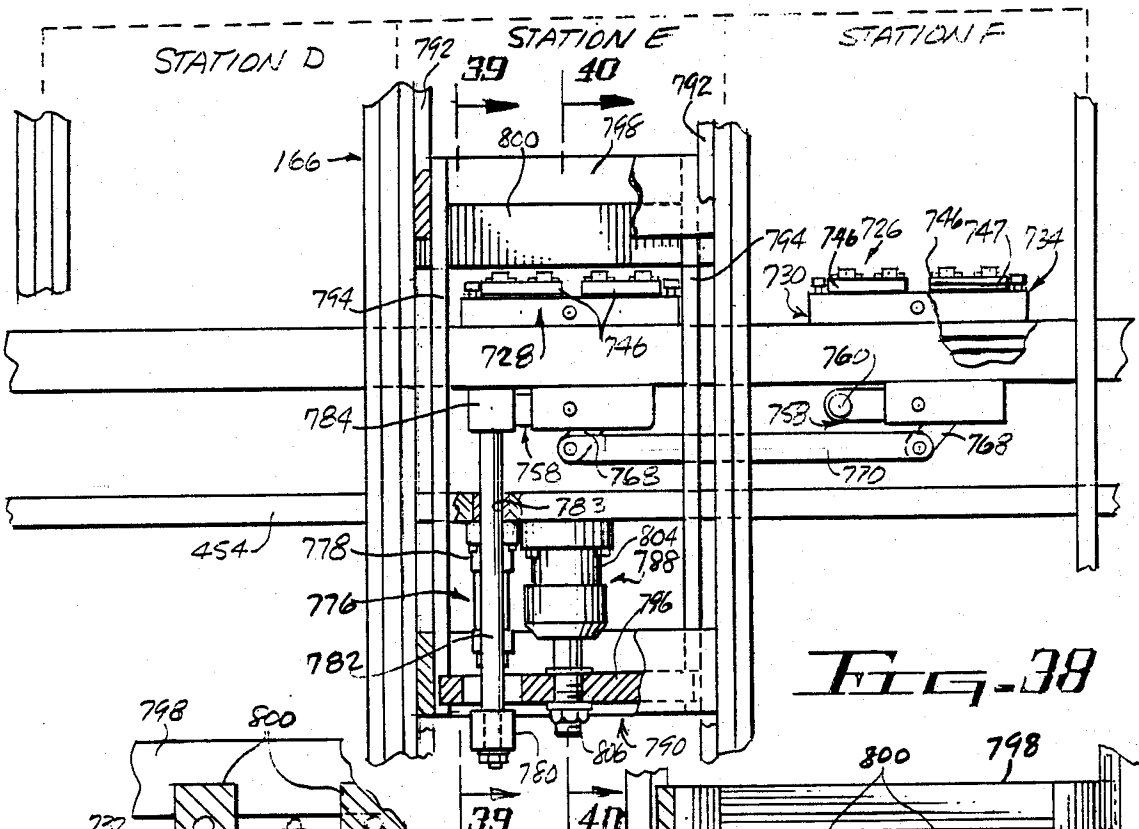
FIG. 38 is a side elevational view showing stations D, E and F, to show the various features of station E and additional features provided on the mold set transport sub-system which is employed to move the mold sets through stations D, E and F.

When the mold set transport sub-system means 474 is in the forward position, as illustrated in FIG. 38, the rollers 760 on the bell cranks 758 of the clamping heads 728 and 732 will be disposed in the channel members 784 of the operating means 776. Therefore, vertical movements of the channel members 784, as a result of the operation of the ram 778, will move the bell cranks 758 of those clamping heads 728 and 732, and by virtue of the previously mentioned drag links 770, will simultaneously move the bell cranks 758 of the other two clamping heads 730 and 734. One of the drag links 770 interconnects the bell cranks 758 of the heads 728 and 730 while the other drag link 770 similarly interconnects the bell cranks 758 of the clamping heads 732 and 734.

When the mold set transport sub-system means 474 is moved to its back position, the rollers 760 on the bell cranks 758 of the clamping heads 730 and 734 will move into the channels 784 of the operating means 776. Therefore, clamping heads 728, 730, 732 and 734 of the transport clamping means 726 are operable at each end of the back-and-forth movement of the mold set transport sub-system means 474.

When the transport clamping means 726 has been opertated to exert clamping pressure on the molds 110D and 112D (FIGS. 27 and 28), the first elevator structure 542 of station D is raised, as hereinbefore described, and the force exerting/heater blocks 564 and 566 will move upwardly with the elevator. Then, the mold set transport sub-system means 474 is operated to move the assembled molds from station D into station E.

Station E is the curing station, as hereinbefore mentioned. The molds 110E and 112E in station E are supported on a heating plate means 786 which is carried on the heater support plate 452 in the manner hereinbefore described. The heating plate means 786 is kept at a temperature which is lower than the previously described heating plates of stations B, C, and D to allow the encapsulated leadframes 102*a* (FIG. 3) to cure.

As hereinbefore mentioned, clamping pressure must be continuously applied to the molds during the curing operation. Therefore, station E is provided with a clamping force exerting means 788 which takes over the force exerting operation from the transport clamping means 726 when the molds 110E and 112E are moved into station E.

An elevator structure 790 is vertically movably supported in suitable guide rails 792 which are attached to the system frame 166. The elevator structure includes vertically extending corner posts 794 which are interconnected at their bottom ends by a suitably framed bottom plate 796, and at their top ends by a framing structure 798. A spaced pair of force exerting/heater blocks 800 are mounted in the top framing structure 798 of the elevator 790, and are movable with the elevator into and out of bearing engagement with the top mold 112E. The blocks 800 are similar to the previously described force exerting/heater blocks 564 and 566 provided in station D, but they are kept at a suitable, and lower, curing temperature by the heating elements 802 provided therein.

Movements of the elevator structure 790 is accomplished by a ram 804 which is dependingly mounted on the bottom surface of the cross plate 454 and has its reciprocally extensible plunger 806 attached to the bottom plate 796 of the elevator.

As will hereinafter be described, the molds are steppingly moved through the various stations of the system 100 in predetermined and precisely controlled time intervals. The workpiece curing operation starts in station D, continues through station E and is completed in the first part of the time period that the molds are residing in station F. Therefore, the previously described clamping heads 730 and 734 are employed to exert the needed clamping force on the molds when they are transported from station E into station F.

Figures 44, 45, 46:
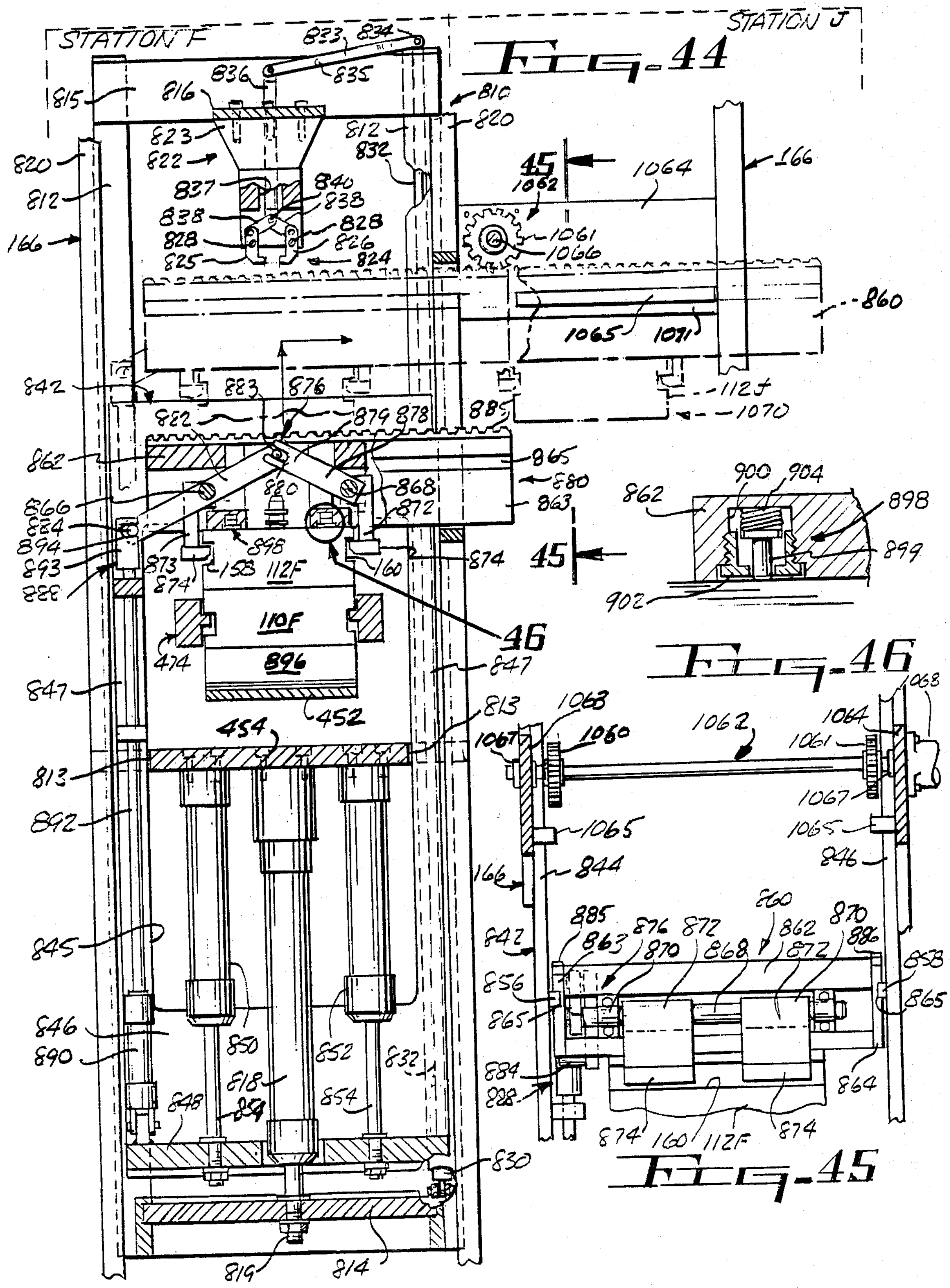
FIG. 44 is a sectional view taken on a vertical plane through the system to show the various features of stations F and J.
FIG. 45 is a fragmentary sectional view taken along the line 45—45 of FIG. 44.
FIG. 46 is an enlarged sectional view of the encircled portion of the mechanisms shown in FIG. 44.

Station F, as hereinbefore mentioned, is the mold disassembly station wherein the top mold 112F is moved upwardly away from the bottom mold 110F as shown in FIGS. 44 and 45. Station F includes a first elevator structure 810 having four corner rails 812 (two shown) which extend vertically through suitable openings 813 provided in the cross plate 454. The corner rails 812 are interconnected on their bottom ends by a suitable bottom plate 814 and on their upper ends by a suitable framing structure 815 with a spanner plate 816 extending thereacross. A ram 818 is fixedly mounted on the cross plate 454 so as to depend therefrom, and the reciprocally extensible plunger 819 of the ram is connected centrally to the bottom plate 814. The ram 818 is employed to reciprocally move the first elevator structure 810 vertically, with the elevator being supported by and vertically movable in track members 820 which are suitably attached to the system frame 166.

A means 822 for pulling and reinserting the plungers 148 of the top mold 112F is mounted on the spanner plate 816 provided at the upper end of the first elevator structure 810. The plunger pulling means 822 includes a housing 823 which depends from the spanner plate 816 and a plunger clamping means 824 is mounted on the housing 823. The plunger clamping means 824 is similar in both structure and function to the hereinbefore fully described clamping means 626 provided in station D. Thus, the clamping means 824 includes an opposed pair of elongated jaws 825 and 826 which are each pivotably mounted on a different one of an elongated spaced pair of axle rods 828 which are carried in the housing 823.

The clamping means 824 is operated by a ram 830 which is suitably mounted on the exterior face of one of the corner rails 812 of the first elevator structure 810 proximate the bottom plate 814 thereof. An elongated rod 832 extends upwardly from the ram 830 and has its upper end connected to one end of a lever 833 by a pivot pin 834. The lever 833 is pivotably mounted intermediate its opposite ends to the top framing structure 815 of the elevator 810 by means of a suitable pivot pin 835. A rod 836 is pivotably attached to the opposite end of the lever 833 and depends therefrom through a suitable passage 837 formed vertically through the housing 823. The lower ends of a pair of links 838 are pivotably connected to the upper ends of the jaws 825 and 826 and the links converge upwardly and have their upper ends connected to the depending end of the rod 836 by means of a common pin 840.

In view of the above, it will be seen that the clamping means 824 is virtually identical with the hereinbefore described clamping means 626. Therefore, repeating the description of operation is deemed as being unnecessary.

The first operation accomplished in station F is to pull the plural plungers 148 from the top mold 112F, and the purpose for this is to break the bottom ends of the plungers loose from the culls 108, (FIG. 3) which are formed during the molding operations in station D. The plungers are fully removed from the top molds 112F for inspection purposes and cleaning if necessary. When completed, the plungers 148 are reinserted in the top molds 112F, the clamping means 824 is operated to release the plungers, and the first elevator structure is moved to its uppermost position, as shown in FIG. 44, to provide clearance for the further operations of station F.

The other operation of station F, as previously mentioned, is that of disassemblying the molds 110F and 112F. A second elevator structure 842 is provided in station F and includes a spaced pair of end plates 844 and 846 each of which define a central opening 845 (one shown). The end plates each have a spaced pair of vertical rails 847 which are vertically movable through the openings 813 provided in the cross plate 454. The end plates 844 and 846 are interconnected at their bottom ends by a bottom plate 848, and are not interconnected at their top ends for reasons which will become apparent as this description progresses. A pair of rams 850 and 852 are mounted so as to depend from the cross plate 454 and their reciprocally extensible plungers 854 are connected to the bottom plate 848 of the second elevator structure 842. The second elevator 842 is disposed within the first elevator structure 810 so that its end plates 844 and 846 are supported by the corner rails 812 thereof and by the tracks 820 in which the first elevator is movable. The second elevator 842 is provided with inwardly facing ledges 856 and 858 on the end plates 844 and 846, respectively, and those ledges are provided for demountably supporting a carriage assembly 860.

The carriage assembly includes a housing 862 having opposed side plates 863 and 864 each of which has a longitudinally extending groove 865 formed therein. The ledge 856 of the second elevator 842 is disposed in the groove 865 of the side plate 863 and the other ledge 858 is disposed in the groove 865 of the other side plate 864 of the carriage. The fit between the ledges 856 and 858 and their respective grooves 865 is loose so that the carriage assembly 860 is slidably movable on the ledges as will hereinafter be described in detail. The carriage housing 862 has a spaced pair of axles 866 and 868 mounted for rotation thereon such as in the pillow blocks 870 shown in FIG. 45. A pair of dogs 872 are fixedly attached in spaced relationship along the length of the axle 868 for rotation therewith, and an identical, but oppositely facing pair of dogs 873 (one shown) are similarly mounted on the other axle 866. Each of the dogs 872 and 873 have a lug 874 mounted transversely on its extending end. A slip-linkage assembly 876 is provided, as will hereinafter be described, to simultaneously rotate the axles 866 and 868 in opposite directions and thereby rotatably move the dogs 872 and 873 toward and away from each other. In the top mold engaging rotational position of the dogs 872 and 873 shown in FIG. 44, the dogs depend from the carriage housing 862 on opposite sides of the top mold 112F and the lugs 874 are disposed within the longitudinal grooves 158 and 160 provided on the opposite sides of the top mold 112F. The slip-linkage assembly 876 is operable to rotate the dogs 872 and 873 away from each other to the top mold releasing position wherein the lugs 874 are moved out of the grooves 158 and 160 of the top mold 112F.

The slip-linkage assembly 876 includes a first lever 878 having one of its ends fixedly attached to the axle 868 so as to extend angularly and upwardly toward the other axle 866 and has a bifurcated extending end 879 which defines a slot 880. A second lever 882 is fixed intermediate its ends to the axle 866. The second lever 882 has an angular attitude so that a first pin 883, which extends normally from one of its ends, is disposed and slidably movable in the slot 880 of the bifurcated end 879 of the first lever 878. A second pin 884 is provided on the opposite end of the second lever 882 and extends normally therefrom for reasons which will become apparent as this description progresses.

The carriage assembly 860 further includes a pair of rack gears 885 and 886 which are mounted on the upper edges of the side plates 863 and 864, respectively, of the carriage housing 862.

As hereinbefore described, the carriage assembly 860 is laterally movable between station F and station J for transporting the top mold 112F from station F to station J. When the carriage assembly 860 is disposed in station F, it is supportingly carried on the ledges 856 and 858 of the second elevator structure 842, and the second elevator structure is provided with means 888 for operation of the slip-linkage assembly 876 for rotation of the dogs 872 and 873 into and out of engagement with the top mold 112F. A ram 890 is suitably attached ot the bottom plate 848 of the second elevator structure 842 for operation of an elongated reciprocally extensible rod 892. A head 893 having an inwardly opening lateral slot 894 formed therein is provided on the upper end of the rod 892, and the second pin 884 of the lever 882 of the slip-linkage assembly 876 is disposed in the slot when the carriage assembly is in station F.

Subsequent to the raising of the first elevator structure 810 in station F, upon completion of the pulling and reinsertion of the plungers 148 of the top mold 112F, as hereinbefore described, the second elevator structure 842 is raised to its elevated position. The carriage assembly 860 is then moved laterally from station J, by a mechanism which will be described later, into station F. When the carriage assembly is received in station F, it will be supported by the ledges 856 and 858 of the second elevator 842, as previously mentioned. Also, the second pin 884 of the lever 882 of the slip-linkage assembly 876 will move into the slot 894 of the head 893 provided on the linkage operating means 888. The ram 890 is then operated to rotate the dogs 872 and 873 to their spread, or non-mold engaging positions. The second elevator structure is then lowered to a position shown in FIG. 44, and the ram 890 is again operated to rotate the dogs 872 and 873 to their closed, or mold-engaging positions. Then the second elevator structure 842 is once again raised to its elevated position so that the carriage assembly will lift the top mold 112F off of the bottom mold 110F. The bottom mold 110F is left in its position of being restingly supported on the heater plate means 896 of station F. With the carriage assembly 860 in the elevated position and the top mold 112F being suspendingly carried thereby, the mechanisms of station J, which will hereinafter be described, are operated to move the carriage assembly and the top mold 112F out of station F.

During the encapsulation molding process which takes place in the assembled molds, the encapsulated leadframes almost invariably stick to both the top and bottom molds as an inherent result of the process. Therefore, the carriage assembly 860 is provided with at least a pair of actuator means 898 which operated the ejector plate 152 provided in the top mold. As shown in FIG. 5, and hereinbefore described, openings 155 are formed in the retainer plates 156 of the top molds 112, and a downwardly exerted force applied to the ejector plate 152 during the top mold lifing operation will move the ejector plate of the top mold down to release the leadframes therefrom.

The actuator means 898 provided in the carriage assembly 860 are identical and as seen best in FIG. 46, each actuator means includes a pin 899 which is mounted in a suitable downwardly opening pocket 900 formed in the bottom surface of the carriage housing 862. The pin 899 is retained in the pocket 900 by means of a threaded plug 902 having an axial opening through which the shank of the pin extends so as to depend from the carriage housing. A spring 904 is mounted in the pocket 900 to biasingly urge the pin to its extending position. As soon as the lifting movement of the top mold 112F begins, the ejector plate 152 of the top mold will become free to move down, and the pins 899 of the actuator means 898 will move downwardly, under the influence of their biasing springs, in the openings 155 and thus push the ejector plate 152 downwardly in the top mold.

The bottom mold 110F, which contains the cured encapsulated leadframes, is transported from station F to station G by the hereinbefore fully described mold set transport sub-system means 474. The bottom mold, which is identified in FIG. 47 by the reference numeral 110G, is placed on the heater plate means 906 which is carried on the terminal end of the previously described heater support plate 452. The heater plate means is provided with a spaced pair of upwardly opening grooves 907 for reasons which will hereinafter be described.

As hereinbefore mentioned, station G is where the encapsulated leadframes 102*a* (FIG. 3) are unloaded from the bottom mold 110G, and the unloading operation requires, among other things, that the bottom mold 110G be raised off of the heater plate means 906 for reasons which will become apparent as this description progresses.

The mechanism which raises the bottom mold 110G includes a ram 908 which is mounted on the downwardly facing surface of the cross plate 454 of the system frame 166, so as to depend from the cross plate. The reciprocally extensible plunger 910 of the ram 908 is connected to a plate 912 intermediate the opposite ends of the plate. A pair of push rods 914 are mounted on the opposite ends of the plate 912 and extend upwardly therefrom. The push rods 914 pass through and are slidably movable in bores 916 which are formed through the cross plate 454, a guide plate 918 that is mounted on the cross plate, and through the insulation materials 919 and the heater plate means 906. The upper ends of the push rods 914 are therefore proximate the bottom surface of the bottom mold-110G.

As shown in FIG. 5, and as hereinbefore described, the bottom molds 110 are provided with ejector plates 122 and ejector pins 124, and an upwardly exerted force on the pins will move the ejector plates 122 to breakaway, or release, the encapsulated leadframes from the bottom molds.

The push rods 914 of the lifting mechanism provided in station G, will push upwardly on a pair of the ejector pins 124 (FIG. 5), of the bottom mold 110G, and thus release the leadframes 112*a* from the bottom mold when the ram 908 is actuated. The movement of the ejector plate 122 and ejector pins 124 (FIG. 5) of the bottom mold 110G is inherently limited by the mold structure itself. Therefore, when the upper limit of the movement of the ejector plate is reached, continued upward movement of the push rods 914 will rais the entire bottom mold 110G.

Raising of the entire bottom mold 110G will bring the encapsulated leadframes 102*a* (FIG. 3) that are in the bottom mold 110G into contact with a special vaccum head 920 of a conveyor means 922 which is operated to move the leadframes from station G into station H. The conveyor means 922 is structurally similar and functionally identical to the hereinbefore fully described conveyor means 360. In view of this, the conveyor means 992 will only be briefly described in that a complete description would be redundant and is deemed as being unnecessary.

Figure 47:
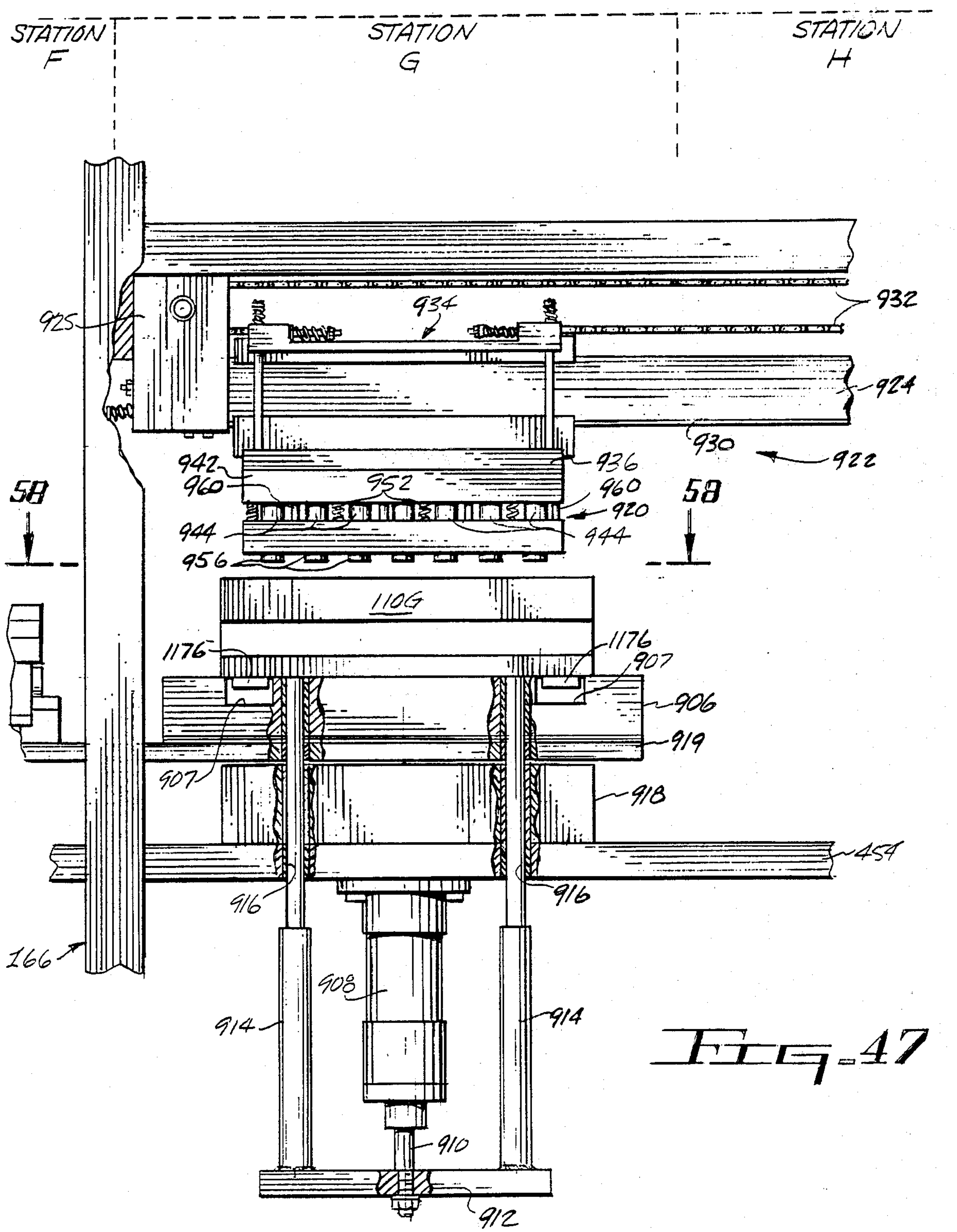
FIG. 47 is a side elevational view which is partially broken away to show the various features of station G.

Since the conveyor means 922 is employed to move the lead-frames from station G to station H, the workpiece pick-up end thereof is illustrated in FIG. 47 and the workpiece delivery end is illustrated in FIG. 48. The conveyor means 922 includes a tubular beam 924 the opposite ends of which are attached to a first housing 925 and a spaced second housing 926. A negative static pressure is pulled within the tubular beam 924 from a suitable external source (not shown) through a conduit means 928. The tubular beam 924, as in the previously described transport means 360, is provided with a plurality of ports (not shown) in its bottom surface, and a deflectable band 930. The first and second housings 925 and 926 have sprockets (not shown) mounted therein for reversibly driving a chain 932 by means of a suitable motor (not shown). The opposite ends of the chain 932 are connected to a carriage 934 which is reciprocally moved between the opposite ends of the beam 924 by the motor driven chain 932.

The carriage 934, which is shown in FIG. 47 at the workpiece pick-up end of the conveyor means 922, and is shown again at the workpiece delivery end thereof in FIG. 48, for ease of description, is identical to the carriage 410 of the conveyor means 360 but has the special vacuum head 920 mounted on its bottom plate 936.

Therefore, the vacuum conveyor means 922 will carry the encapsulated leadframes, 102*a* to station H which, as hereinbefore mentioned, is the degating station wherein the two simultaneously processed leadframes 102*a* are separated by removal of the leadframe interconnecting culls 108 and gates 109. The special vacuum head 920 of the conveyor means 922 in addition to carrying the leadframes 102a to station H, cooperates with the mechanisms of station H for accomplishing the degating operation.

The bottom plate 936 of the carriage 934, as seen in FIG. 49, is provided with a vertical port by which negative static pressure is drawn in a downwardly opening central chamber 938. A plurality (two shown) of lateral passages 939 extend from a central chamber 938 so that the negative static pressure is also drawn in a plurality (two shown) of vertical pockets 940. The vertical pockets 940 are cooperatively formed by downwardly opening cavities formed in the bottom plate 936 and aligned upwardly opening cavities formed in the housing 942 of the special vacuum head 920 which is demountably attached to the bottom plate 936 of the carriage 934.

A plurality of cylinders 944 are mounted on the bottom surface of the housing 942 and are disposed to extend centrally along the length of the housing in spaced increments. The number of cylinders 944 provided is equal to the number of culls 108 which are formed in the encapsulating process of the system 100 as will hereinafter be described. Each of the cylinders 944, as shown in FIG. 49, have an axial bore extending therethrough with an enlarged counterbore 945 formed in the depending end of the axial bore. A special bolt 946 is disposed axially in the cylinder and the bolt is provided with an axial bore 947 which extends therethrough. The threaded upper end of the special bolt 946 is threadingly carried in a vertical bore 948 which extends centrally through the housing 942 and is thus open on its upper end into the central chamber 938 of the bottom plate 936 of the carriage 934. Therefore, the negative static pressure drawn in the carriage 934, in the manner hereinbefore fully described, will also be drawn in the enlarged counterbores 945 provided on the depending end of each of the cylinders 944.

The plurality of pockets 940, which are cooperatively formed by the bottom plate 936 and the housing 942, are alternately arranged on opposite sides of the centrally located cylinders 944 so that no two pockets 940 are transversely aligned in the housing. Instead, each of the plural pockets 940 is in transverse alignment with a different bore 950 of a plurality of such bores which are alternately provided between adjacent pairs of the pockets 940 on each side of the central cylinders 944. A plurality of compression springs 952 are each disposed in different ones of the bores 950, so that their upper ends are in bearing engagement with the downwardly facing surface of the bottom plate 936 of the carriage and their depending ends are nestingly contained in aligned blind bores 953 provided in the upwardly facing surface of a deflection plate 954.

The deflection plate 954 is of elongated configuration and is provided with a plurality of bores 955 (one shown) which extend centrally along the length of the plate 954 and are disposed so that a different one of the cylinders 944 is axially disposed in each of the bores 955. A sleeve 956 is fixedly carried in each of the bores 955 and the deflection plate 954 is vertically movable toward and away from the housing 942, as will hereinafter be described, so that each sleeve 956 is axially slidable along its respective one of the cylinders 944. As shown, the sleeves 956 have an axial length which is greater than the thickness dimension of the deflection plate 954 and is thus provided with an upwardly extending end 957 and a depending end 958.

Each of the plural pockets 940 provided in the housing 942 has the head 959 of one of a plurality of special bolts 960 disposed therein. The special bolts 960 have axial bores 961 extending therethrough and their shanks extend downwardly through reduced diameter axial bores formed in the bottom of their respective pockets 940 and each bolt has its lower end threadingly attached to the deflection plate 954. As hereinbefore mentioned, the deflection plate 954 is vertically movable toward and away from the housing 942. The deflection plate 954 is biased to the downwardly extended position shown in FIG. 49, by the compression springs 954 and the downward movement is limited by the heads 959 of the special bolts 960 which are seated in the bottom of the pockets 940 when the deflection plate 954 is in its downwardly biased position, with the heads 959 moving upwardly in the pockets 940 when the deflection plate 954 is vertically moved toward the housing 942.

The lower ends of the special bolts 960, as hereinbefore mentioned, are threadingly attached to the deflection plate 954, and the internally threaded bores 963 in which the bolts are mounted each open downwardly into a different recess 964, with the recesses 964 being arranged in spaced increments along the downwardly facing surface of the deflection plate. Thus, a negative static pressure will also be drawn in each of the recesses.

When the carriage 934 is in the workpiece pick-up position of the conveyor means 922, as shown in FIG. 49, and the bottom mold 110G is moved upwardly in the manner previously described, the leadframe interconnecting culls 108 will become attached to the depending ends 958 of the sleeves 956 provided in the deflection plate 954 due to the negative static pressure. And, the encapsulating bodies 107 of the leadframes 102a will become similarly attached to the bottom surface of the deflection plate 954 by virtue of the negative static pressure provided in the recesses 964 thereof.

The carriage 934 is then moved to the workpiece delivery end of the conveyor means 922 and the attached pair of interconnected leadframes 102a are carried with the carriage to a position in station H above a mechanism 966 which is a turntable and degating mechanism.

The turntable/degating mechanism 966 includes a bearing housing 968 having an axial bore 969 with the housing 968 being mounted in the cross plate 454 of the system frame 166 so that the bore 969 thereof opens above and below the cross plate. A shaft 970 is mounted in the bore 969 of the bearing housing 968 and is axially and rotatably movable therein, and the shaft 970 has an axial bore 971 formed therethrough. A gear 972 is fixedly carried on the lower end of the shaft 970 and that gear 972 is in meshed engagement with a drive gear 974 which is carried on an output shaft 975 of a suitable motor 976 which is mounted so as to extend vertically upwardly from a plate 978 which is part of the system frame 166. Thus, the motor 976 is employed to rotatably drive the shaft 970 for reasons which will hereinafter be described in detail.

A suitable ram 980 is also mounted on the plate 978 so as to be upstanding therefrom. The ram 980 is operable to reciprocally move a rod 982 which extends through the axial bore 971 of the shaft 970. Suitable bushings 983 (one shown) are provided in the bore 971 of the shaft 970 so that the rod 982 is axially movable therein and so that the shaft 970 is rotatable about the rod 982.

A flat plate 984 is integrally formed on the upwardly extending end of the shaft 970, and a spaced pair of upstanding plates 986 are mounted on the flat plate 984. An elongated housing 988 is suitably mounted fast on the upper ends of the upstanding plates 986 so as to lie in a plane which is transverse to the upstanding plates. The housing 988 is provided with a plurality of suitable bores arranged in spaced increments centrally along the length of the housing and each of these bores has a piston 990 mounted therein for axial movement. For reasons which will become apparent as this description progresses, the number of pistons 990 provided in the housing 988 is equal to the number of cylinders 944 dependingly carried on the housing 942 of the above described vacuum head 920, with the pistons 990 each being in vertical alignment with a different one of the cylinders 944 when the carriage 934 is in the workpiece delivery end of the conveyor means 922.

The plural pistons 990 are normally disposed so that they extend downwardly from the housing 998 and each piston has the threaded upper end of a bolt 991 attached thereto so that the bolts 991 depend axially from their respective pistons. The bolts 991 each have an enlarged head 992 which is disposed below the downwardly facing surface of plate 993 so that the shanks of the bolts each pass freely upwardly through suitable apertures formed in the plate 993. A coil spring 994 is concentrically disposed on the shank of each of the bolts 991 with the opposite ends of the springs 994 being in bearing engagement with the downwardly facing surfaces of the pistons 990 and the upwardly facing surface of the plate 993, so that the pistons 990 and the plates 993 are biased away from each other. The plate 993 is carried on the upwardly extending ends of the upstanding arms of an upwardly opening U-shaped in cross section channel member 996 which is disposed between the spaced pair of upstanding plates 986 that are carried on the flat plate 984 formed on the upper end of the shaft 970. The channel member 996 is provided with a downwardly opening blind bore 997 in which a reduced diameter upper end 998, formed on the reciprocally extensible rod 982 is nestingly disposed.

A spaced pair of brackets 1000 are suitably mounted on each side edge of the housing 988 and axle shafts 1002 and 1004 are carried in each longitudinally aligned pair of the brackets 1000. In this manner, the axle shafts 1002 and 1004 extend longitudinally of the housing 988 and are each disposed in upwardly spaced relationship above a different longitudinally extending side edge of the housing 988. An inwardly extending elongated plate-like flange 1006 is pivotably carried on the axle shaft 1002 and an identical inwardly extending plate-like flange 1008 is pivotably carried on the other axle shaft 1004. The flanges 1006 and 1008 are yieldably biased in the horizontal positions shown in FIG. 49 by means of push pins 1010 which are carried in the housing 988 and are spring loaded upwardly by the springs 1011 in the manner shown. Each of the pivotably mounted plate-like flanges 1006 and 1008 have a plurality of recesses 1012 (one shown in each flange) formed in longitudinally spaced increments along its upwardly facing surface.

To accomplish a degating operation, the ram 980 is operated to push the rod 982 up which results in the pitons 990 moving upwardly into bearing engagement with the bottom of the culls 108. This results in each of the culls 108 being captively held between the downwardly extending ends 958 of the sleeves 956 and the pistons 990. Continued upward movement of the rod 982 will push the deflection plate 954 upwardly against the bias applied thereon by the springs 952 and a flange 1014 provided on the rod 982 will move into bearing engagement with the downwardly facing surface of the gear 972 which results in upward movement of the shaft 970. This movement of the shaft 970 elevates the housing 988 which moves the inwardly extending flanges 1006 and 1008 into engagement with the encapsulating bodies 107 of the leadframes **102*a*, with each encapsulating body 107 being nestingly received in a different one of the recesses 1012 provided in the flanges. When the limit of the upward movement of the sleeves 956 of the deflection plate 954 is reached by virtue of the upper ends 957 of the sleeves 956 moving into engagement with the downwardly facing surface of the housing 942, the deflection plate 954 will continue up until the downwardly applied biasing force of the springs 952 becomes greater than the upwardly applied biasing forces applied to the pivot flanges 1006 and 1008 by the spring loaded push pins 1010. When this occurs, the flanges 1006 and 1008 will be pivotably moved into the downwardly converging attitudes shown in FIG. 50, and the leadframes 102*a* will be similarly moved relative to the captively held culls 108. This action will break the culls 108 and the gates 109 (FIG. 3) away from the leadframes 102*a* at the points where the gates 109** are attached to the leadframes.

After the degating operation is completed in the above described manner, the degating mechanism is lowered by reversed operation of the ram 980. The culls 108 with the gates 109 attached will fall down between the pivot flanges 1006 and 1008 and may be removed by any suitable means for disposal thereof. The separated leadframes **102*a* will be restingly supported on the pivot flanges 1006 and 1008** which return to their normal horizonal positions during lowering of the degating mechanism.

The separated leadframes **102*a* are now ready to be transported into station I, and the turntable function of the mechanism 966** is accomplished as part of the transferring operation and will thus be described in conjunction with the description of station I.

Figure 51:
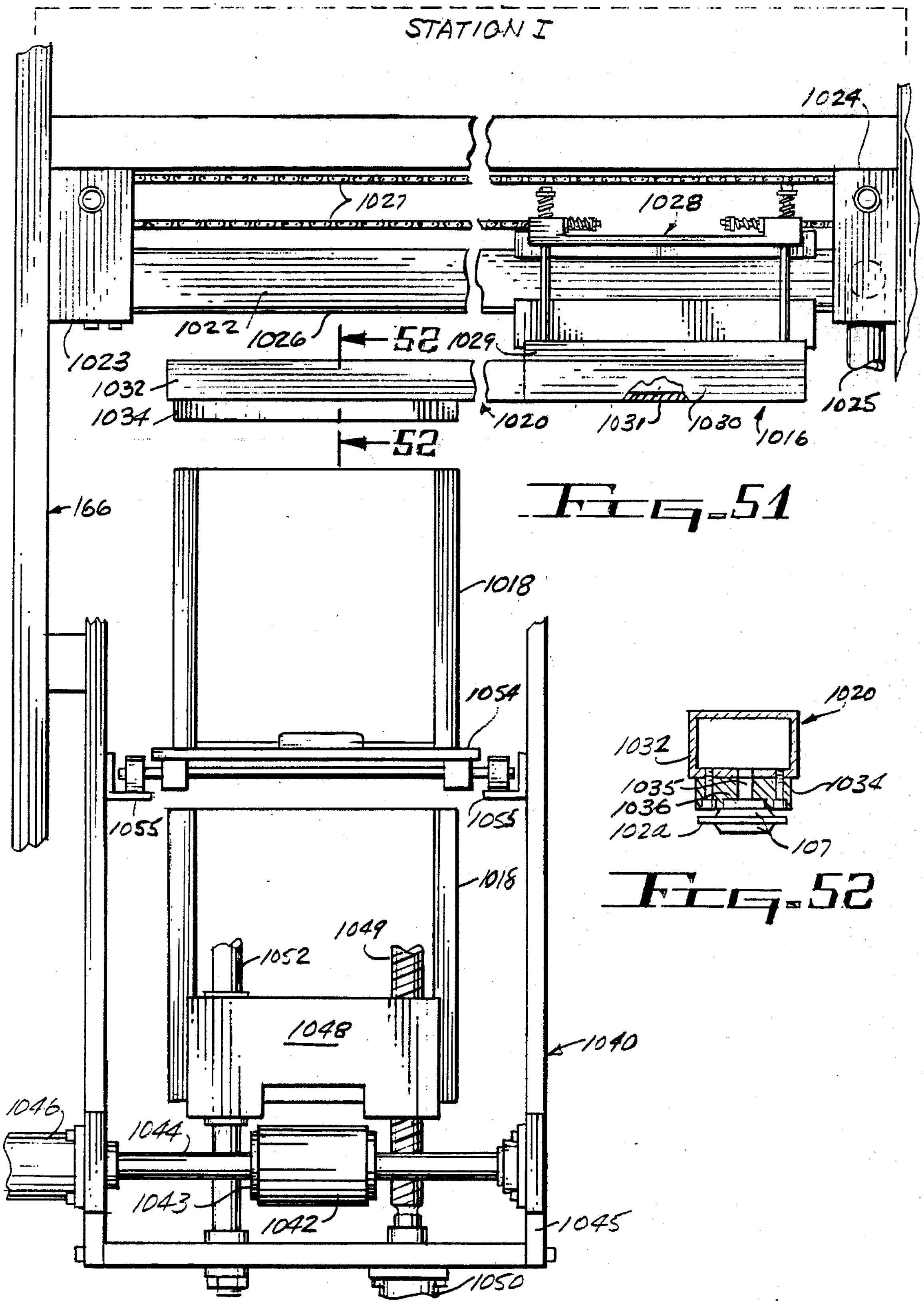
FIG. 51 is a fragmentary side elevational view showing the various features of the mechanims of station I.
Figure 52:
FIG. 52 is an enlarged fragmentary sectional view taken along the line 52—52 of FIG. 51.

Station I which is shown in FIGS. 51 and 52, includes a conveyor means 1016 which moves the leadframes **102*a*, which were disconnected from each other in station H, and moves them into station I and deposits them into finished product magazines 1018** as will hereinafter be described.

The conveyor means 1016 is similar to the hereinbefore described conveyor means 360 and 922, with the single exception being the vacuum head 1020 thereof. Since the conveyor means 1016 is the same as those previously described, it is deemed to be unnecessary to fully repeat the description. Therefore, the conveyor means 1016 will now be described only to the extent felt necessary to insure understanding of the structure and function thereof.

The conveyor means 1016 includes a tubular beam 1022 the opposite ends of which are attached to a first housing 1023 and a spaced second housing 1024. A negative static pressure is drawn in the beam 1022 by operation of a suitable remote structure (not shown) through a conduit means 1025. The tubular beam 1022, as in the previously described conveyor means 360, is provided with a plurality of ports (not shown) in its bottom surface and a deflectable band 1026 which selectively opens those ports as previously described. The first and second housings 1023 and 1024 have sprockets (not shown) mounted therein for reversibly moving a chain 1027 by means of a suitable drive motor (not shown). The opposite ends of the chain 1027 are connected to a carriage 1028 for reciprocally moving the carriage along the length of the tubular beam 1022.

The carriage 1028 is identical to the hereinbefore described carriage 410 of the conveyor means 360 and therefore provides negative static pressure to the bottom plate 1029 of the carriage and thus into the vacuum head 1020 which is suitably mounted on the bottom plate 1029 of the carriage.

The vacuum head 1020 includes a housing 1030 having an internal chamber 1031 with a conduit 1032 extending laterally therefrom. A pick-up head 1034 is mounted on the bottom surface of the conduit proximate the closed extending end of the conduit. The pick-up head 1034 is in the form of an elongated flat plate having a plurality of ports 1035 (one shown) which extend in spaced increments along the length thereof. Each of the ports 1035 are open on their upper ends into the conduit 1032 and on their lower ends into a transversely extending recess 1036 which opens downwardly onto the bottom surface of the pick-up head 1034. Therefore it will be seen from the above description of the pick-up head 1034 and from FIG. 52, that the pick-up head 1034 is adapted to pick-up a single one of the encapsulated leadframes 102*a* when the head is disposed so that each recess 1036 thereof is disposed above a different one of the encapsulating bodies 107 (one shown) of the leadframe 102*a*.

When the carriage 1028 is located at the workpiece pick-up end of the conveyor means 1016, i.e., to the left in FIG. 51, the pick-up head 1034 will be located immediately above the turntable/degating mechanism 966 of station H due to the laterally extending conduit 1032. Such positioning of the pick-up head 1034 of the conveyor means 1016 can, of course, only be accomplished when the carriage 934 of the conveyor means 922 is moved from its workpiece delivery position shown in FIG. 48 to its workpiece pick-up position shown in FIG. 47.

When the carriage 1028 of the conveyor means 1016 is located above the turntable/degating mechanism 966, the mechanism 966 is raised as hereinbefore described to move one of the encapsulated leadframes 102*a* into contact with the pick-up head 1034 thereof. The turntable/degating mechanism 966 is then lowered and the conveyor means 1016 is then operated to move the carriage 1028, with the leadframe 102*a* attached thereto, into station I for depositing that leadframe in the magzine 1018 as will hereinafter be described. While the delivery of the first leadframe 102*a* is taking place, the turntable/degating mechanism 966 is rotated 180° by actuation of the motor 976. This places the remaining leadframe 102*a* in the proper position for being picked-up by the pick-up head 1034 when the above described pick-up and delivery operation of the conveyor means 1016 is repeated for the remaining leadframe 102*a*.

Rotational operation of the turntable/degating mechanism 966 will turn the second leadframe 102*a* end for end so that it is oriented exactly as it was when it was brought into the system 100 in the product input magazines 190 prior to its being turned end for end by the receiving and arranging mechanism 220 in station A. The incoming leadframes 102 (FIG. 2) are arranged as previously described in station A for processing purposes in the system 100 and are returned to their original sequential and orientational arrangement for batch control purposes and to facilitate further processing subsequent to the molding encapsulation process of the system 100.

Referring once again to FIG. 51 of station I, the finished product magazines 1018 are brought empty into the system 100 and after loading, are removed from the system by a magazine transport sub-system 1040 which is similar to the hereinbefore described input magazine transport and unloading sub-system 170. The only difference between the two magazine transport sub-systems 170 and 1040 is that the sub-system 1040 does not require the ram cylinder 217 (FIG. 6) and the extensible push rod 218 for pushing the leadframes 102 out of the input magazines 190. Since the magazine transport sub-systems 170 and 1040 are otherwise identical, the following description of the sub-system 1040 will be brief in that repeating the detailed structural and operation description is deemed as being unnecessary.

The empty magazines 1018 are brought into the system 100 by an endless conveyor belt 1042 which is carried on a spaced pair of rollers 1043 (one shown) the illustrated roller is mounted on a drive shaft 1044 which is journaled for rotation in the frame structure 1045. An electric stepping motor 1046 is coupled to rotatably drive the shaft 1044 and thus the roller 1043 and belt 1042. A carriage 1048 is employed to raise the incoming empty magazines 1018 one at a time to an elevated loading position. The carriage 1048 is reciprocally moved vertically by an elongated screw 1049 which is driven by a reversible motor 1050 carried on the frame 1045, with the carriage being slidably movable on a guide rod 1052.

When one of the magazines is elevated as described to the loading position, it is located immediately below the pick-up head 1034 of the conveyor means 1016 and the leadframes 102*a* are simply dropped into the magazine which, as shown are bin-like structures which are open on the top and on one side.

When the magazines are filled, they are removed from the system 100 by means of a wheeled carriage 1054 which is movable on a spaced apart pair of tracks 1055 which are mounted on the frame 1045 at the elevated loading level. The carriage 1054 is reciprocally movable by any suitable means (not shown) such as the ram 196 (FIG. 7) which is used to move the carriage 192 of the input magazine sub-system 170.

Referring once again to FIGS. 44 and 45 wherein the top mold 112F was raised off of the bottom mold 110F in preparation for transferring the top mold from station F to station J. The carriage assembly 860 having the top mold 112F suspendingly mounted on the pivotably movable dogs 872 and 873 thereof is, as hereinbefore described, carried on the ledges 856 and 858 of the second elevator structure 842. When the second elevator structure 842 is moved to its uppermost position, the rack gears 885 and 886 of the carriage 860 will be moved into meshing engagement with a pair of pinion gears 1060 and 1061 which form part of a top mold lateral transport mechanism 1062. The transport mechanism 1062 is operable to move the carriage 860 and the top mold 112F as an entity from station F to station J and subsequently return the carriage to station F when the top mold has been removed therefrom as will hereinafter be described.

A spaced apart pair of plates 1063 and 1064 are suitably attached to system frame 166 so as to laterally extend from station F into station J. Each of the plates is provided with an inwardly facing ledge 1065 and those ledges are disposed to be in alignment with the ledges 856 and 858 of the second elevator structure 842 when the elevator is in its upper position. The above mentioned pinion gears 1060 and 1062 are carried on an axle 1066 which extends between the plates 1063 and 1064 and is journaled for rotation in suitable bearings 1067 mounted on the plates. A reversibly drivable motor 1068 is mounted on the plate 1064 and is employed to rotatably drive the axle 1066 so that the pinion gears 1060 and 1061 coact with the rack gears 885 and 886, respectively, to slidingly move the carriage assembly 860 from the ledges 856 and 858 of the second elevator 842 of station F onto the ledges 1065 of the plates 1063 and 1064 of station J. As shown in dashed lines at 1070 in FIG. 44, the top mold 112J is suspended from the carriage 860 so as to be below the lower edge 1071 of the plate 1064 and can therefore be moved under that plate into station K as will hereinafter be described.

Reference is now made to FIGS. 53 through 57 wherein a top mold longitudinal transport mechanism 1074 is shown for moving the top molds from station J, through stations K and L and into station M.

Figures 53, 54:
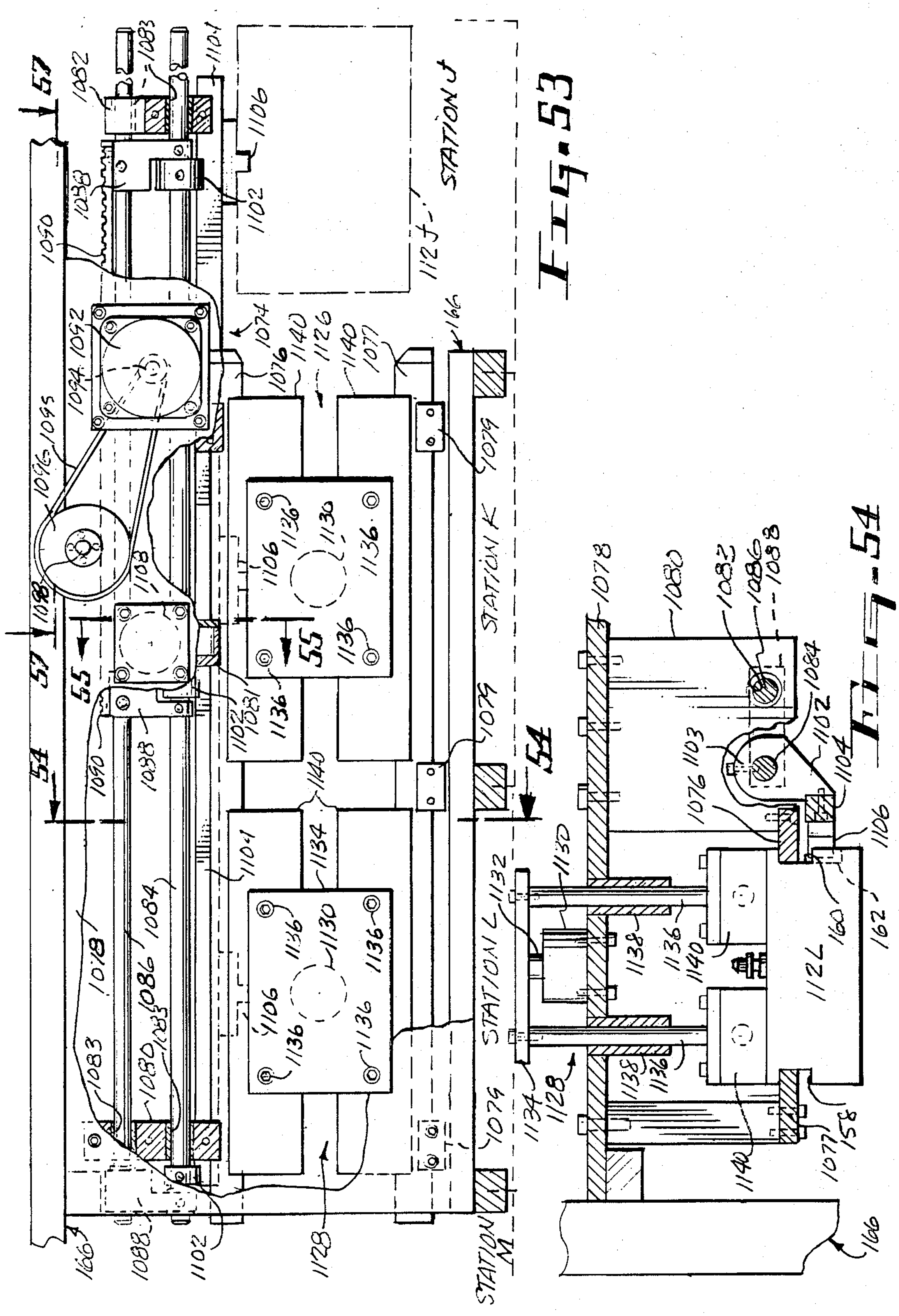
FIG. 53 is a fragmentary plan view which is partially broken away to show the various features of the mechanisms of stations K and L and the relationships of those stations with the equipment provided in stations J and M.
FIG. 54 is a fragmentary sectional view taken along the line 54—54 of FIG. 53.

When the top mold 112J, dashed lines in FIG. 53, is moved into station J as described above, it will be located so that the longitudinal grooves 158 and 160 (FIG. 4) formed in the opposite sides thereof will be laterally offset and in alignment with a spaced apart pair of rails 1076 and 1077 which are fixedly mounted on the system frame 166 so as to extend through stations K and L. The top mold longitudinal transport mechanism 1074 is operable, as will be described, to slidingly move the top mold 112J off of the dogs 872 and 873 (FIG. 44) of the carriage assembly 860 onto the rails 1076 and 1077 and slidingly move the top mold on those rails through stations K and L, and subsequently push the top mold off of the rails 1076 and 1077 into station M.

A roof plate 1078 is suitably mounted to the system frame 166 so as to overlay stations J, K and L, and a plurality of standards 1079 are dependingly mounted in spaced increments along the length of the roof plate 1078 approximate one edge thereof to supportingly carry the side rail 1077 which is fixedly attached thereto. Similarly, the other side rail 1076 is carried on special standards 1080, 1081 and 1082, which are dependingly mounted on the roof plate 1078 in spaced increments along the length of the roof plate proximate the opposite edge thereof. In addition to carrying the side rail 1076, the special standards 1080, 1081 and 1082 are each provided with a spaced apart pair of apertures 1083 which have suitable bushings therein, with a first elongated rod 1084 being disposed and slidably movable in a first aligned set of the apertures 1032 and a second elongated rod 1086 being similarly carried and movable in the outer set of aligned apertures.

The first and second rods 1084 and 1086 are interconnected by a plurality of longitudinally spaced and transversely extending brackets 1088 and a rack gear 1090 is mounted on an adjacent pair of those brackets 1088 as shown best in FIGS. 53 and 57. Those same two figures also show a reversibly operable motor 1092 which is mounted on standards 1093 above the roof plate 1078. The motor 1092 has a pulley 1094 on its output shaft and the pulley 1094 is coupled by a belt 1095 to drive a pulley 1096 which is mounted on the upper end of a stub shaft 1098. The stub shaft 1098 is rotatably journaled in a bearing housing 1099 which is mounted on the roof plate 1078 and disposed to extend downwardly therethrough. A pinion gear 1100 is fixedly mounted on the depending end of the stub shaft 1098 and is in meshing engagement with the rack gear 1090. Thus, the motor 1092 is seen to be used to reciprocally move the interconnected rods 1084 and 1086 for reasons which will become apparent as this description progresses.

A plurality of levers 1102 are fixedly attached to the first elongated rod 1084 for movement therewith with each lever being disposed adjacent a different one of the rod interconnecting brackets 1088. As seen best in FIG. 54 wherein a typical one of the levers 1102 is shown, each of the levers includes a collar-like body 1103 which extends downwardly from the rod 1084 and is attached to an elongated bar 1104. As seen in FIG. 53, the bar 1104 extends substantially through the stations J, K and L, and by virtue of the bar being mounted on the levers 1102, it is reciprocally movable with the rods 1084 and 1086. A plurality of T-shaped dogs 1106 are fixedly attached to the bar 1104 at predetermined spaced intervals, and are movable with the bar.

The above described reciprocally movable components of the top mold longitudinal transport mechanism 1074 are reciprocally movable in a back-and-forth motion which moves the top mold 112J in steps. In other words, one cycle of the reciprocally movable components will move the top mold 112J from station J into station K, the next cycle will move it from station K into station L and the next cycle will move it from station L into station M. These cyclic step movements are accomplished by selectively rotating the first rod 1084 to move the dogs 1106 into and out of engagement with the top molds.

As hereinbefore described, and as seen in FIGS. 5, 54 and 55, each of the top molds 112 are provided with a slot 162 which is disposed centrally in one of the sidewalls thereof so as to extend downwardly from the longitudinal groove 160 thereof. The dogs 1106 are rotated into and out of those slots 162 in the manner shown in FIG. 55, by the mechanism which is best seen in that same figure. A ram 1108 is dependingly mounted on a plate 1109 which is supported on suitable standards 1110 so as to be spaced above the roof plate 1078. The reciprocally extensible plunger 1112 of the ram extends through the roof plate and through a vertical bore 1113 formed in the special standard 1081. The bore 1113 opens on its lower end into a downwardly opening chamber 1114 which is formed in the standard 1081 with a clevis 1115, which is provided on the depending end of the plunger 1112, being disposed in the chamber 1114. A crank 1116 is located in the chamber 1114 and the clevis 1115 is connected to the extending end of the crank by a suitable pivot pin 1117. The crank 1116 has a bore 1118 in which the elongated rod 1084 is mounted with the rod being axially slidable in the bore 1118 of the crank. The crank 1116 is held captive against axial movement with the rod 1084 by means of one of the sidewalls 1119 of the special standard 1081 and an access cover 1120 which is demountably attached thereto. As seen best in FIG. 56, the elongated rod 1084 has an elongated keyway 1122 formed therein, and a key 1124 is fixedly mounted in the bore 1118 of the crank 1116 so as to extend into the keyway 1122 of the rod 1084. When the rod 1084 is axially moved in the bore of the crank 1116, the keyway will slide along the key 1124 and when the ram 1108 is operated, the crank 1116 will rotate the rod 1084 by virtue of interaction between the key and keyway. Rotation of the rod 1084 will pivotably move the levers 1102, bar 1104, and thus the dogs 1106 between the solid and dash line positions shown in FIG. 5.

As hereinbefore mentioned, the stations K and L are used for inspection of the top molds 112 and cleaning, if necessary, and for heating of the top molds to bring them back up to the proper temperature for reuse. The reheating of the top molds is accomplished by a vertically movable heater means 1126 located in station K and an identical heater means 1128 located in station L. Since the heater means 1126 and 1128 are identical, the following description of the heater means 1128, as seen best in FIG. 54, will be understood to also apply to the other heater means 1126.

The vertically movable heater means 1128 includes a ram 1130 which is mounted on the upper surface of the roof plate 1078 so as to extend upwardly therefrom. The reciprocally extensible plunger 1132 of the ram 1130 has its upper end connected centrally of a plate 1134 which has four shafts 1136 which are each dependingly mounted on a different corner of the plate. The shafts 1136 extend downwardly through the roof plate 1078 and guide sleeves 1138 that are mounted on the roof plate. Each longitudinally aligned pair of the shafts 1136 have a heater block 1140 attached to the depending ends thereof. Therefore, the pair of heater blocks 1140 which are laterally spaced from each other are movable into bearing engagement with the top mold 112L for maximum heat transfer when the mold is disposed in station L, and are vertically upwardly movable to allow the top mold to be moved to the next station in the manner described above.

Station M, as shown in FIGS. 23 and 24, has a pair of vertically disposed plates 1142 and 1143 which are suitably attached to the system frame 166. The plate 1142, which is disposed between stations L and M, is provided with an opening 1144 therein through which the hereinbefore described top mold longitudinal transport mechanism 1074 (FIG. 53) pushes the top mold out of station L onto a top mold lateral transport mechanism provided in station M.

Each of the plates 1142 and 1143 is provided with an inwardly extending shelf 1145 upon which the previously mentioned carriage 476 is supportingly carried with the carriage being slidable on those shelves. The carriage 476 has a spaced apart pair of dogs 1146 depending therefrom so that the top mold 112M will be suspended from those dogs. When the top mold is pushed into station M, the longitudinal grooves 158 and 160 of the top mold 112M will slide onto the dogs. A pair of rack gears 1148 and 1149 are mounted on the top surface of the carriage 476 proximate opposite side edges thereof and those rack gears are in meshing engagement with a pair of pinion gears 1150 and 1151, respectively. The pinion gears 1150 and 1151 are fixedly carried in spaced apart relationship on an axle 1152 and the axle is rotatably driven by a reversibly drivable motor 1154 that is mounted on the plate 1143. The motor 1154 is operated to drive the carriage 476 with the top mold 112M suspendingly carried thereby, from station M into station C in preparation for its being assembled to the bottom mold 110C in station C. When the carriage 476 is so driven, it will slide along the shelves 1145 onto the aligned shelves 478 of the elevator structure 480 of station C. When the elevator 480 is lowered, as hereinbefore described, and the top mold is removed from the carriage 476, it is returned to the elevated position by the elevator structure 480 and is moved back into station M by reverse operation of the motor 1154.

Figure 58:
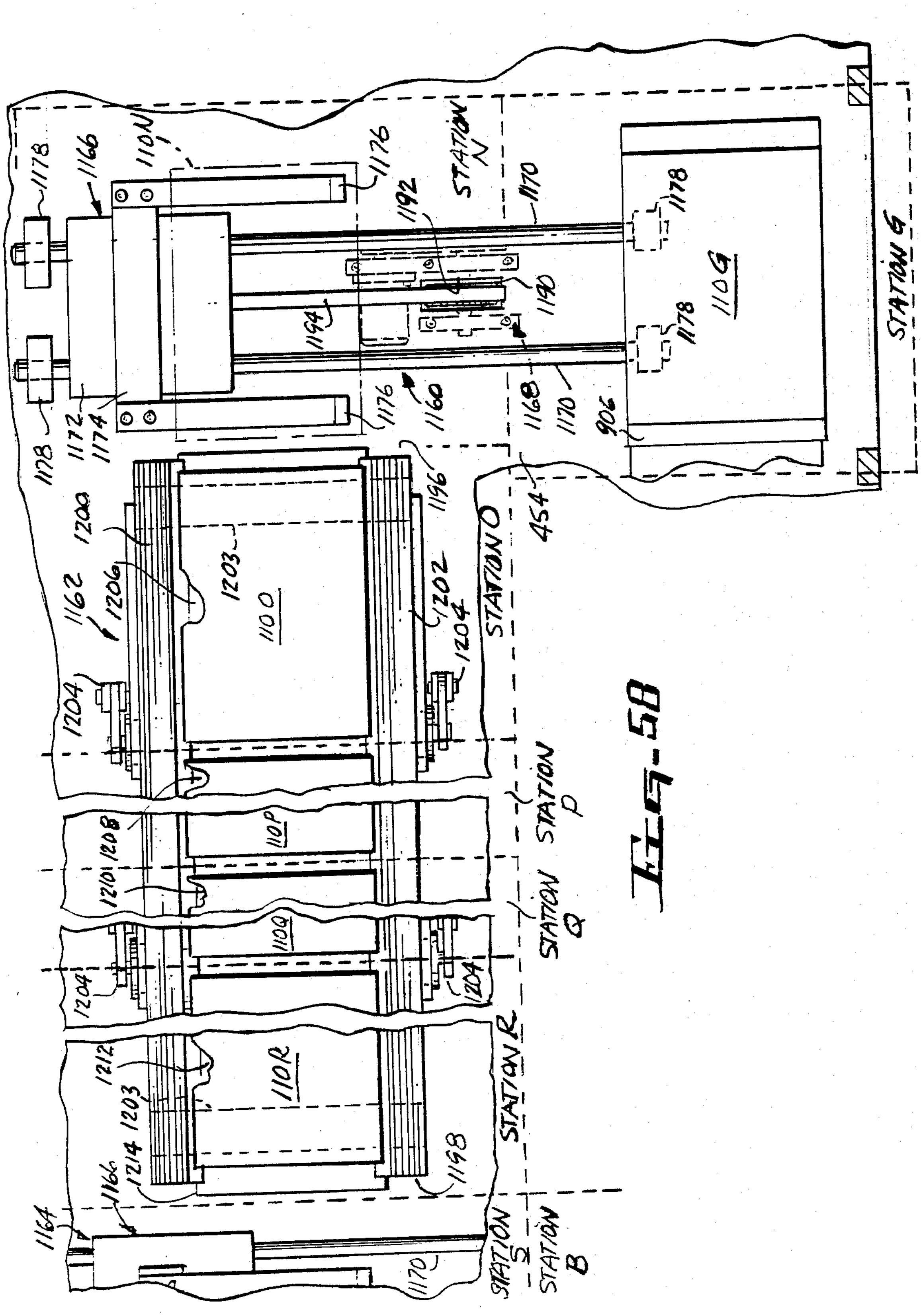
FIG. 58 is a fragmentary plan view taken generally along the line 58—58 of FIG. 47 to show the various mechanisms of stations N, O, P, Q and R, and the relationships of those stations with respect to stations G, S and B.

When the bottom mold 110G is unloaded in station G, as hereinbefore described, a bottom mold recirculation sub-system is employed to sequentially move the bottom mold from station G, move it through stations N, O, P, Q, R and S, and return it to station B for reuse. The bottom mold recirculation sub-system is seen in FIG. 58 to include a first bottom mold lateral transport mechanism 1160, a bottom mold longitudinal transport means 1162, and a second bottom mold lateral transport mechanism 1164.

The first and second lateral transport mechanisms 1160 and 1164 are identical, and as seen best in FIGS. 20, 21, 47 and 58, each include a carriage 1166 which is reciprocally movable by a drive means 1168 along a pair of guide rods 1170. As seen best in FIGS. 20 and 21, the carriages 1166 each include a housing 1172 having a suitably spaced pair of bores 1173 in which the guide rods 1170 are disposed so that the carriages are movable along their respective pair of the rods. An upstanding block 1174 is mounted on the upper surface of each of the housings 1172 so as to be transversely disposed with respect to the guide rods 1170 and a pair of forks 1176 are each mounted on different ends of each of the upstanding blocks. The forks 1176 are spaced above the guide rods 1170 and are coextensive therewith. The guide rods 1170 are fixedly mounted in suitable support blocks 1178 which are provided at opposite ends of the guide rods and the support blocks 1178 are mounted on the upper surface of the cross plate 454.

Figure 21:
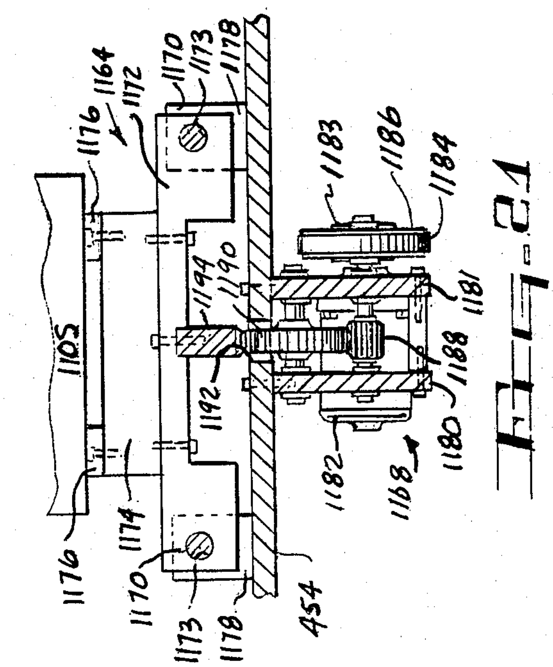
FIG. 21 is a fragmentary sectional view taken along the line 21—21 of FIG. 20.

The drive means 1168 for each of the bottom mold lateral transport mechanisms 1160 and 1164, as shown best in FIGS. 20 and 21, includes a spaced pair of plates 1180 and 1181 which are dependingly mounted on the cross plate 454. A suitable reversibly drivable motor 1182 is mounted on the plate 1181 and has a pulley 1183 mounted on its output shaft. A belt 1184 is connected between the pulley 1183 and a driven pulley 1186 which provides the rotational input to a reduction gear train 1188 which is mounted in the space between the depending plates 1180 and 1181. The output gear 1190 of the gear train 1188 extends upwardly through a slot 1192 provided in the cross plate 454 and is in meshing engagement with a rack gear 1194. The rack gear 1194 is mounted on the housing 1172 so as to be parallel and coextensive with the guide rods 1170.

The first bottom mold lateral transport mechanism 1160 is operated to move the bottom mold 110G out of station G by movement of the carriage 1166 toward that station. The forks 1176 will move into the slots 907 (FIG. 47) of the heater plate means 906 with the bottom mold 110G being elevated above the heater plate means by operation of the ram 908, prior to moving of the forks 1176 into the slots 907. When in position, the bottom mold 110G is lowered onto the forks 1176 and the carriage is operated to move back to the starting position shown in solid lines in FIG. 58.

To load the bottom mold 110S (FIG. 20) into station B, the bottom mold lateral transport mechanism 1164, which has received the bottom mold 110S on its forks 1176 from the bottom mold longitudinal transport mechanism 1162, as will be described, is moved toward station B. When the forks 1176 enter the slots 457 formed in the heating plate means 45, which was elevated to one of its two elevated positions, prior to entry of the forks into the slots, the ram 458 is operated to raise the heating plate means 450 a short distance which raises the bottom mold 110B off of the forks 1176. The carriage 1166 is then retracted back to its starting position and the ram 458 is operated to lower the heating plate means 450 and the bottom mold 110B into the proper operating position in station B.

The bottom mold longitudinal transport mechanism 1162 is the same as the hereinbefore fully described mold set transport mechanism 474 (FIG. 26) with the exception that the bottom mold longitudinal transport mechanism 1162 is not provided with the transport clamping means (FIG. 38). In view of the similarity, a detailed description of the mechanism 1162 is deemed as being unnecessary. Briefly, the bottom mold longitudinal transport mechanism 1162 has its bottom mold input end 1196 adjacent and laterally disposed of the bottom mold lateral transport mechanism 1160 and its output end 1198 adjacent and laterally disposed of the bottom mold lateral transport mechanism 1164. A pair of spaced walking beams 1200 and 1202 are interconnected by plural yoke means 1203. A drive mechanism (not shown), which is the same as that shown and described in the mold set transport mechanism 474, is located below the cross plate 454 and is coupled so as to reciprocally move the walking beams 1200 and 1202 in a step-like fashion. In addition, the mechanism 1162 includes roller elevator mechanisms 1204 which are operable to raise and lower the walking beams so that the bottom molds 110-O, 110P, 110Q and 110R will be raised off of and placed onto the heater plate means 1206 of station O, the heater plate means 1208 of station P, the heater plate means 1210 of station Q and the heater plate means 1212 of station R as they are steppingly moved therethrough by the transport mechanism 1162. As shown, the heater plate means 1206, 1208, 1210 and 1212 are each supported on an elongated heater support plate 1214 in the manner hereinbefore described.

In view of the foregoing, it will be seen that the system 100 may be operated so that the operations of each station will take place simultaneously and continuously. For example, the leadframes 102 may be being loaded into the bottom mold 110B in station B at the same time that the top mold 112C is being placed on top of the bottom mold 110C in station C. Therefore, it will be apparent that timing of the various operations of the system 100 is important. While many things must be considered in establishing operational timing in the system 100, the curing time of the encapsulating materials is of primary importance.

To insure a clear understanding of the operational timing of the system 100, the following example is presented. When an encapsulating material having a curing time of about 30 seconds is used in the system, an operational time base of 15 seconds may be used throughout the entire system. The time base of 15 seconds is broken down in this manner. All of the operations of the various stations can be completed in 10 seconds, and transporting operations between stations takes 5 seconds. In other words, the assembled molds 110D and 112D, for example, will arrive in station D at time zero, and the operations accomplished in that station will be finished 10 seconds later and transporting of the assembled molds 110D and 112D into station E will start at this 10 second mark and will be completed at the 15 second mark. This timing is used in each station of the system 100 and thus simultaneous operating in all the stations will occur and simultaneous transporting between stations will occur. With regard to curing of the encapsulating material given in this example, curing will start at about the 10 second mark in station D, thus, 5 seconds of curing time will have passed by the time the molds arrive in station E and a total of 15 seconds of curing time will have passed when movement of the molds into station F begins, and a total of 20 seconds will have passed upon arrival of the molds in station F. When the operations of station F are completed, another 10 seconds will have passed which, when added to the above total of 20 seconds, will result in the passing of the required total of about 30 seconds curing time.

While the principles of the invention have now been made clear in the illustrated embodiments, there will be immediately obvious to those skilled in the art, many modifications of structure, arrangements, proportions, the elements, materials, and components used in the practice of the invention, and otherwise, which are particularly adapted for specific environments and operation requirements without departing from those principles. The appended claims are therefore intended to cover and embrace any such modifications within the limits only of the true spirit and scope of the invention.

What we claim is:

1. A multi-station molding system for use with bottom and top molds that are assembleable into mold sets, said system comprising:

a means for placing at least one package which comprises a lead frame and a semiconductor chip into a cavity located within said bottom and top molds;

a means for inserting molding material into said cavity to encapsulate, in liquid form, said semiconductor chip of said package, said means for inserting being operably separate from said means for placing;

a means for curing said liquid molding material to form a solid encapsulation of said semiconductor chip during cycling and transporting away from said means for inserting of said bottom and top molds assembled together with said package located therein, said means for curing having clamp means coupled to a plurality of walking beams for holding together said bottom and top molds during said cycling and being operably separate from said means for placing and said means for inserting; and a means for positioning said package for removal therefrom.

2. A multi-station molding system for use with bottom and top molds that are assembleable into mold sets, said system comprising:

a means for placing at least one article into a cavity located within said bottom and top molds;

a means for inserting molding material into said cavity to encapsulate, in liquid form, at least a portion of said article, said means for inserting being operably separate from said means for placing;

a means for curing said liquid molding material to form a solid encapsulation of said at least a portion of said article during the cycling and transporting away from said means for inserting of said bottom and top molds assembled together with said article located therein, said means for curing having clamp means coupled to a plurality of walking beams for holding together said bottom and top molds during said cycling and being operably separate from said means for placing and said means for inserting; and a means for positioning said article for removal therefrom.

3. The molding system as in claim 1 wherein said means for placing, said means for inserting, and said means for curing are in-line with each other.

* * * * *